US011856059B2

(12) United States Patent
Barile et al.

(10) Patent No.: US 11,856,059 B2
(45) Date of Patent: Dec. 26, 2023

(54) LIGHTING FIXTURE WITH ENHANCED SECURITY

(71) Applicant: IDEAL Industries Lighting LLC, Sycamore, IL (US)

(72) Inventors: John Barile, Apex, NC (US); Keith Bryan, Raleigh, NC (US); Matthew Brian Deese, Raleigh, NC (US)

(73) Assignee: IDEAL Industries Lighting LLC, Sycamore, IL (US)

( * ) Notice: Subject to any disclaimer, the term of this patent is extended or adjusted under 35 U.S.C. 154(b) by 0 days.

(21) Appl. No.: 16/932,959

(22) Filed: Jul. 20, 2020

(65) Prior Publication Data

US 2020/0352011 A1 Nov. 5, 2020

Related U.S. Application Data

(62) Division of application No. 15/192,308, filed on Jun. 24, 2016, now abandoned.
(Continued)

(51) Int. Cl.
*H04L 67/12* (2022.01)
*G06T 7/20* (2017.01)
(Continued)

(52) U.S. Cl.
CPC ............. *H04L 67/12* (2013.01); *F21S 8/086* (2013.01); *F21S 9/026* (2013.01); *F21S 9/028* (2013.01);
(Continued)

(58) Field of Classification Search
CPC ..... H04L 63/00; H04L 63/0876; H05B 47/18; H05B 47/19; Y04S 40/18
See application file for complete search history.

(56) References Cited

U.S. PATENT DOCUMENTS 4,679,086 A 7/1987 May
6,185,444 B1 2/2001 Ackerman et al.
(Continued)

FOREIGN PATENT DOCUMENTS

CN 104782229 A 7/2015
CN 105874270 A 8/2016
(Continued)

OTHER PUBLICATIONS

International Preliminary Report on Patentability for PCT/US2019/016592, dated Aug. 20, 2020, 9 pages.
(Continued)

*Primary Examiner* — Raymond R Chai
(74) *Attorney, Agent, or Firm* — Withrow & Terranova, P.L.L.C.

(57) ABSTRACT

A lighting fixture includes a solid-state light source, communications circuitry, a memory, and processing circuitry. The memory stores common security credentials, wherein the common security credentials are pre-installed during a factory calibration process. The processing circuitry is coupled to the solid-state light source, the communications circuitry, and the memory. The processing circuitry is configured to cause the solid-state light source to provide a desired light output. Further, the processing circuitry is configured to join a common network using the common security credentials, wherein only devices with the common security credentials are permitted to join the network.

21 Claims, 56 Drawing Sheets

Related U.S. Application Data

(60) Provisional application No. 62/292,528, filed on Feb. 8, 2016.

(51) Int. Cl.

| | | |
|---|---|---|
| G06F 3/048 | (2013.01) | |
| H05B 47/19 | (2020.01) | |
| H05B 45/46 | (2020.01) | |
| H05B 47/11 | (2020.01) | |
| H05B 47/16 | (2020.01) | |
| H05B 47/18 | (2020.01) | |
| H05B 47/105 | (2020.01) | |
| H05B 47/175 | (2020.01) | |
| H04L 9/40 | (2022.01) | |
| H05B 45/3725 | (2020.01) | |
| G06V 10/50 | (2022.01) | |
| G06V 10/56 | (2022.01) | |
| G06V 10/94 | (2022.01) | |
| G06V 10/75 | (2022.01) | |
| G06V 20/52 | (2022.01) | |
| F21V 23/00 | (2015.01) | |
| F21S 9/02 | (2006.01) | |
| F21S 9/03 | (2006.01) | |
| H02J 7/35 | (2006.01) | |
| F21S 8/08 | (2006.01) | |
| F21V 5/04 | (2006.01) | |
| F21V 7/22 | (2018.01) | |
| G01C 3/08 | (2006.01) | |
| G01S 13/08 | (2006.01) | |
| G01S 15/08 | (2006.01) | |
| H02J 7/00 | (2006.01) | |
| H04L 12/28 | (2006.01) | |
| H05B 45/20 | (2020.01) | |
| H05B 45/395 | (2020.01) | |
| H05B 45/325 | (2020.01) | |
| G06V 20/40 | (2022.01) | |
| F21Y 115/10 | (2016.01) | |
| F21W 131/103 | (2006.01) | |
| F21Y 103/10 | (2016.01) | |

(52) U.S. Cl.
CPC .............. *F21S 9/03* (2013.01); *F21V 5/04* (2013.01); *F21V 7/22* (2013.01); *F21V 23/003* (2013.01); *F21V 23/005* (2013.01); *G01C 3/08* (2013.01); *G01S 13/08* (2013.01); *G01S 15/08* (2013.01); *G06F 3/048* (2013.01); *G06T 7/20* (2013.01); *G06V 10/50* (2022.01); *G06V 10/56* (2022.01); *G06V 10/751* (2022.01); *G06V 10/95* (2022.01); *G06V 20/52* (2022.01); *H02J 7/0068* (2013.01); *H02J 7/35* (2013.01); *H04L 12/282* (2013.01); *H04L 63/00* (2013.01); *H04L 63/0876* (2013.01); *H05B 45/3725* (2020.01); *H05B 45/46* (2020.01); *H05B 47/105* (2020.01); *H05B 47/11* (2020.01); *H05B 47/16* (2020.01); *H05B 47/175* (2020.01); *H05B 47/18* (2020.01); *H05B 47/19* (2020.01); *F21W 2131/103* (2013.01); *F21Y 2103/10* (2016.01); *F21Y 2115/10* (2016.08); *G06V 20/44* (2022.01); *H05B 45/20* (2020.01); *H05B 45/325* (2020.01); *H05B 45/395* (2020.01); *Y04S 40/18* (2018.05)

(56) References Cited

U.S. PATENT DOCUMENTS

| | | | |
|---|---|---|---|
| 6,470,453 B1 | 10/2002 | Vilhuber | |
| 6,647,426 B2 | 11/2003 | Mohammed | |
| 7,344,279 B2 | 3/2008 | Mueller et al. | |
| 8,035,320 B2 | 10/2011 | Sibert | |
| 8,084,963 B2 | 12/2011 | Chandler et al. | |
| 9,030,103 B2 | 5/2015 | Pickard | |
| 9,039,746 B2 | 5/2015 | van de Ven et al. | |
| 9,155,165 B2 | 10/2015 | Chobot | |
| 9,456,482 B1 | 9/2016 | Pope et al. | |
| 9,488,327 B2 | 11/2016 | Van Gheluwe et al. | |
| 9,681,510 B2 | 6/2017 | van de Ven | |
| 9,686,477 B2 | 6/2017 | Walters et al. | |
| 9,706,617 B2 | 7/2017 | Carrigan et al. | |
| 9,710,691 B1 | 7/2017 | Hatcher et al. | |
| 9,730,289 B1 | 8/2017 | Hu et al. | |
| 9,769,900 B2 | 9/2017 | Underwood et al. | |
| 9,826,598 B2 | 11/2017 | Roberts et al. | |
| 9,888,546 B2 | 2/2018 | Deese et al. | |
| 9,894,740 B1 | 2/2018 | Liszt et al. | |
| 10,203,103 B2 | 2/2019 | Bendtsen et al. | |
| 10,781,984 B2 | 9/2020 | Keller et al. | |
| 2005/0128751 A1 | 6/2005 | Roberge et al. | |
| 2006/0002110 A1 | 1/2006 | Dowling et al. | |
| 2006/0022214 A1 | 2/2006 | Morgan et al. | |
| 2006/0071780 A1 | 4/2006 | McFarland | |
| 2006/0074494 A1 | 4/2006 | McFarland | |
| 2006/0095170 A1 | 5/2006 | Yang et al. | |
| 2007/0061050 A1 | 3/2007 | Hoffknecht | |
| 2008/0125161 A1 | 5/2008 | Ergen et al. | |
| 2008/0218334 A1 | 9/2008 | Pitchers et al. | |
| 2008/0273754 A1 | 11/2008 | Hick et al. | |
| 2009/0010178 A1* | 1/2009 | Tekippe | H04W 40/10 370/254 |
| 2009/0045971 A1 | 2/2009 | Simons et al. | |
| 2009/0066473 A1 | 3/2009 | Simons | |
| 2009/0129067 A1 | 5/2009 | Fan et al. | |
| 2009/0262189 A1 | 10/2009 | Marman | |
| 2009/0290765 A1 | 11/2009 | Ishii et al. | |
| 2010/0182294 A1 | 7/2010 | Roshan et al. | |
| 2010/0189011 A1* | 7/2010 | Jing | H04W 40/244 370/254 |
| 2010/0226280 A1 | 9/2010 | Burns et al. | |
| 2010/0231131 A1 | 9/2010 | Anderson | |
| 2010/0262296 A1 | 10/2010 | Davis et al. | |
| 2010/0269383 A1 | 10/2010 | Nifenecker | |
| 2010/0295946 A1 | 11/2010 | Reed et al. | |
| 2011/0007168 A1 | 1/2011 | Nagara et al. | |
| 2011/0031897 A1 | 2/2011 | Henig et al. | |
| 2011/0057581 A1 | 3/2011 | Ashar et al. | |
| 2011/0169413 A1* | 7/2011 | Wendt | H05B 47/165 315/152 |
| 2011/0199004 A1 | 8/2011 | Henig et al. | |
| 2011/0211758 A1 | 9/2011 | Joshi et al. | |
| 2012/0038281 A1 | 2/2012 | Verfuerth | |
| 2012/0143357 A1 | 6/2012 | Chemel et al. | |
| 2012/0146518 A1 | 6/2012 | Keating et al. | |
| 2012/0235579 A1 | 9/2012 | Chemel et al. | |
| 2012/0320626 A1 | 12/2012 | Quilici et al. | |
| 2013/0051806 A1* | 2/2013 | Quilici | H05B 47/195 398/106 |
| 2013/0182906 A1 | 7/2013 | Kojo et al. | |
| 2013/0221203 A1 | 8/2013 | Barrilleaux | |
| 2013/0257292 A1 | 10/2013 | Verfuerth et al. | |
| 2013/0293877 A1 | 11/2013 | Ramer et al. | |
| 2013/0307419 A1 | 11/2013 | Simonian et al. | |
| 2014/0001963 A1 | 1/2014 | Chobot et al. | |
| 2014/0028199 A1 | 1/2014 | Chemel | |
| 2014/0028200 A1 | 1/2014 | Van Wagoner et al. | |
| 2014/0062312 A1 | 3/2014 | Reed | |
| 2014/0070724 A1 | 3/2014 | Gould et al. | |
| 2014/0072211 A1 | 3/2014 | Kovesi et al. | |
| 2014/0103833 A1 | 4/2014 | Ho et al. | |
| 2014/0135017 A1 | 5/2014 | Hirano et al. | |
| 2014/0159577 A1 | 6/2014 | Manoukis et al. | |
| 2014/0167653 A1 | 6/2014 | Chobot | |

(56) References Cited

U.S. PATENT DOCUMENTS

| | | | |
|---|---|---|---|
| 2014/0211985 A1 | 7/2014 | Polese et al. | |
| 2014/0217261 A1 | 8/2014 | De Groot et al. | |
| 2014/0247941 A1* | 9/2014 | Gu | H04W 12/50 |
| | | | 380/270 |
| 2014/0266916 A1 | 9/2014 | Pakzad et al. | |
| 2014/0266946 A1 | 9/2014 | Bily et al. | |
| 2014/0267703 A1 | 9/2014 | Taylor et al. | |
| 2014/0340570 A1 | 11/2014 | Meyers et al. | |
| 2015/0008831 A1 | 1/2015 | Carrigan et al. | |
| 2015/0084503 A1 | 3/2015 | Liu et al. | |
| 2015/0097975 A1 | 4/2015 | Nash et al. | |
| 2015/0195855 A1 | 7/2015 | Liu | |
| 2015/0208490 A1 | 7/2015 | Bishop et al. | |
| 2015/0226392 A1 | 8/2015 | Gould et al. | |
| 2015/0245451 A1 | 8/2015 | Sung et al. | |
| 2015/0264779 A1 | 9/2015 | Olsen et al. | |
| 2015/0264784 A1 | 9/2015 | Romano | |
| 2015/0296599 A1* | 10/2015 | Recker | H05B 47/11 |
| | | | 315/153 |
| 2015/0305119 A1 | 10/2015 | Hidaka et al. | |
| 2015/0309174 A1 | 10/2015 | Giger | |
| 2015/0351169 A1 | 12/2015 | Pope et al. | |
| 2015/0370848 A1 | 12/2015 | Yach et al. | |
| 2015/0373808 A1 | 12/2015 | Kuo et al. | |
| 2016/0069978 A1 | 3/2016 | Rangarajan et al. | |
| 2016/0095189 A1 | 3/2016 | Vangeel et al. | |
| 2016/0100086 A1 | 4/2016 | Chien | |
| 2016/0112870 A1* | 4/2016 | Pathuri | H04W 12/50 |
| | | | 726/4 |
| 2016/0124081 A1 | 5/2016 | Charlot et al. | |
| 2016/0192458 A1* | 6/2016 | Keith | H05B 41/39 |
| | | | 315/291 |
| 2016/0195252 A1 | 7/2016 | Wilcox et al. | |
| 2016/0205749 A1 | 7/2016 | Creusen et al. | |
| 2016/0212830 A1 | 7/2016 | Erdmann et al. | |
| 2016/0227618 A1 | 8/2016 | Meerbeek et al. | |
| 2016/0270179 A1 | 9/2016 | Ryhorchuk et al. | |
| 2016/0273723 A1 | 9/2016 | Van Gheluwe et al. | |
| 2016/0282126 A1 | 9/2016 | Watts et al. | |
| 2016/0286619 A1 | 9/2016 | Roberts et al. | |
| 2017/0013697 A1 | 1/2017 | Engelen et al. | |
| 2017/0048952 A1 | 2/2017 | Roberts et al. | |
| 2017/0086273 A1 | 3/2017 | Soler et al. | |
| 2017/0094750 A1 | 3/2017 | Chen | |
| 2017/0167708 A1 | 6/2017 | Kim et al. | |
| 2017/0228874 A1 | 8/2017 | Roberts | |
| 2017/0230364 A1 | 8/2017 | Barile et al. | |
| 2017/0231045 A1 | 8/2017 | Hu et al. | |
| 2017/0231060 A1 | 8/2017 | Roberts et al. | |
| 2017/0231061 A1 | 8/2017 | Deese et al. | |
| 2017/0231066 A1 | 8/2017 | Roberts et al. | |
| 2017/0257925 A1 | 9/2017 | Forbis et al. | |
| 2017/0366970 A1* | 12/2017 | Yu | H04L 63/0428 |
| 2018/0216791 A1 | 8/2018 | Leung et al. | |
| 2018/0246270 A1 | 8/2018 | Di Trapani et al. | |
| 2018/0252374 A1 | 9/2018 | Keller et al. | |
| 2018/0259140 A1 | 9/2018 | Keller et al. | |
| 2018/0318602 A1 | 11/2018 | Ciccarelli et al. | |
| 2018/0359838 A1 | 12/2018 | Liszt et al. | |
| 2019/0242539 A1 | 8/2019 | Roberts | |
| 2019/0340306 A1 | 11/2019 | Harrison et al. | |

FOREIGN PATENT DOCUMENTS

| | | |
|---|---|---|
| DE | 102014115082 A1 | 4/2016 |
| EP | 2709428 A2 | 3/2014 |
| EP | 2918901 A1 | 9/2015 |
| EP | 2016051608 A | 4/2016 |
| FR | 3024898 A1 | 2/2016 |
| GB | 2497096 A | 6/2013 |
| JP | 2010141663 A | 6/2010 |
| JP | 2012243206 A | 12/2012 |
| WO | 03067934 A2 | 8/2003 |
| WO | 2006018604 A1 | 2/2006 |
| WO | 2009011898 A2 | 1/2009 |
| WO | 2010004514 A1 | 1/2010 |
| WO | 2012143814 A1 | 10/2012 |
| WO | 2013121342 A2 | 8/2013 |
| WO | 2013158955 A1 | 10/2013 |
| WO | 2014147524 A1 | 9/2014 |
| WO | 2015103482 A1 | 7/2015 |
| WO | 2017045885 A1 | 3/2017 |

OTHER PUBLICATIONS

Decision on Appeal for U.S. Appl. No. 15/192,308, dated May 20, 2020, 8 pages.
Non-Final Office Action for U.S. Appl. No. 16/259,491, dated Feb. 20, 2020, 8 pages.
Notice of Allowance for U.S. Appl. No. 16/259,491, dated Jun. 1, 2020, 7 pages.
Notice of Allowance for U.S. Appl. No. 15/972,176, dated Jun. 19, 2019, 8 pages.
Notice of Allowance for U.S. Appl. No. 16/657,294, dated May 8, 2020, 8 pages.
Notice of Allowance for U.S. Appl. No. 15/972,178, dated Jun. 17, 2019, 9 pages.
Examination Report for European Patent Application No. 17705540.7, dated Jul. 26, 2019, 8 pages.
Summons to Attend Oral Proceedings for European Patent Application No. 17705540.7, dated Feb. 20, 2020, 9 pages.
Result of Consultation for European Patent Application No. 17705540.7, dated Jul. 31, 2020, 11 pages.
Examination Report for European Patent Application No. 17708904.2, dated Aug. 2, 2019, 9 pages.
Summons to Attend Oral Proceedings for European Patent Application No. 17708904.2, dated Feb. 20, 2020, 10 pages.
Result of Consultation for European Patent Application No. 17708904.2, dated Aug. 20, 2020, 18 pages.
International Preliminary Report on Patentability for International Patent Application No. PCT/US2018/037048, dated Dec. 26, 2019, 9 pages.
International Search Report and Written Opinion for PCT/US2019/016592, dated Apr. 17, 2019, 16 pages.
Non-Final Office Action for U.S. Appl. No. 16/990,230, dated Apr. 1, 2021, 8 pages.
Office Action for Canadian Patent Application No. 3065545, dated Jan. 21, 2021, 4 pages.
International Search Report and Written Opinion for International Patent Application No. PCT/US2020/057706, dated Feb. 9, 2021, 19 pages.
Minutes of the Oral Proceedings for European Patent Application No. 17705540.7, dated Nov. 2, 2020, 4 pages.
Decision to Refuse for European Patent Application No. 17705540.7, dated Nov. 5, 2020, 25 pages.
Minutes of the Oral Proceedings for European Patent Application No. 17708904.2, dated Nov. 2, 2020, 4 pages.
Decision to Refuse for European Patent Application No. 17708904.2, dated Nov. 5, 2020, 19 pages.
Examination Report for European Patent Application No. 18738050.6, dated Dec. 4, 2020, 8 pages.
Notice of Allowance for U.S. Appl. No. 16/990,230, dated Sep. 9, 2021, 7 pages.
Examination Report for European Patent Application No. 19705900.9, dated Sep. 29, 2021, 7 pages.
First Office Action for Chinese Patent Application No. 2018800390348, dated Aug. 18, 2021, 22 pages.
Abdi, Hervé, "Metric Multidimensional Scaling (MDS): Analyzing Distance Matrices," Encyclopedia of Measurement and Statistics, 2007, Thousand Oaks, California, SAGE Publications, Inc., 13 pages.
Author Unknown, "Procrustes analysis," https://en.wikipedia.org/wiki/Procrustes_analysis, Jul. 16, 2016, Wikipedia, 5 pages.
Author Unknown, "Thread Commissioning," Revision 2.0, Jul. 13, 2015, Thread Group, Inc., www.threadgroup.org, 26 pages.
Author Unknown, "Thread Stack Fundamentals," Revision 2.0, Jul. 13, 2015, Thread Group, Inc., www.threadgroup.org, 21 pages.

(56) References Cited

OTHER PUBLICATIONS

Author Unknown, "The IES TM-30-15 Method," Lighting Passport, Available online at: « https://www.lightingpassport.com/ies-tm30-15-method.html», Jan. 15, 2016, 6 pages.
Boots, Byron, et al., "A Spectral Learning Approach to Range-Only SLAM," Proceedings of the 30th International Conference on Machine Learning, vol. 28, 2013, Atlanta, Georgia, JMLR Workshop and Conference Proceedings, 8 pages.
Cree, "Cree® J Series™ 2835 LEDs," Product Family Data Sheet: CLJ-DS8 Rev 0D, Cree, Inc., Available online at: « http://www.cree.com/led-components/media/documents/data-sheet-JSeries-2835.pdf», 2017, 30 pages.
Digeronimo, J., "EIC 2800 Search Report," Scientific and Technical Information Center, Mar. 14, 2018, 33 pages.
Figueiro, M. G., et al., "Light at Night and Measures of Alertness and Performance: Implications for Shift Workers," Biological Research for Nursing, vol. 18, Issue 1, Feb. 19, 2015, pp. 90-100.
Jacobson, J., "CoeLux: The $40,000 Artificial Skylight Everyone Will Want," CE Pro, Available online at: « https://www.cepro.com/article/coelux_the_40000_fake_skylight_everyone_will_want», Mar. 11, 2016, 9 pages.
Kobourov, Stephen, G., "Force-Directed Drawing Algorithms," Handbook of Graph Drawing and Visualization, Chapter 12, 2013, CRC Press, pp. 383-408.
LUMILEDS, "DS146 Luxeon 3535L Color Line," Product Datasheet, Lumileds Holding B.V., Available online at: « https://www.lumileds.com/uploads/565/DS146-pdf», 2018, 18 pages.
Rea, M. S., et al., "A model of phototransduction by the human circadian system," Brain Research Reviews, vol. 60, Issue 2, Dec. 15, 2005, pp. 213-228.
Rea, M. S., et al., "Circadian light," Journal of Circadian Rhythms, vol. 8, No. 2, Feb. 13, 2010, 11 pages.
Sahin, L., et al., "Alerting effects of short-wavelength (blue) and long-wavelength (red) lights in the afternoon," Physiology & Behavior, vols. 116-117, May 27, 2013, pp. 1-7.
Seoul Semiconductor, "STBOA12D—Mid-Power LED—3528 Series Product Data Sheet," Seoul Semiconductor Co., Ltd., Revision 1.0, Available online at: « http://www.seoulsemicon.com/upload2/3528_STB0A12D_Spec_Rev1.0.pdf», Jul. 21, 2017, 19 pages.
Seoul Semiconductor, "STGOA2PD—Mid-Power LED—3528 Series Product Data Sheet," Seoul Semiconductor Co., Ltd., Revision 1.0, Available online at: « http://www.seoulsemicon.com/upload2/3528_STG0A2PD_Spec_Rev1.0.pdf», Jul. 21, 2017, 19 pages.
International Preliminary Report on Patentability for International Patent Application No. PCT/US2017/016469, dated Aug. 23, 2018, 10 pages.
Non-Final Office Action for U.S. Appl. No. 15/192,308, dated Jul. 3, 2017, 11 pages.
Final Office Action for U.S. Appl. No. 15/192,308, dated Oct. 20, 2017, 12 pages.
Advisory Action and Interview Summary for U.S. Appl. No. 15/192,308, dated Jan. 25, 2018, 5 pages.
Non-Final Office Action for U.S. Appl. No. 15/192,308, dated Mar. 15, 2018, 10 pages.
Final Office Action for U.S. Appl. No. 15/192,308, dated Jul. 12, 2018, 11 pages.
Advisory Action for U.S. Appl. No. 15/192,308, dated Sep. 10, 2018, 3 pages.
Examiner's Answer for U.S. Appl. No. 15/192,308, dated Mar. 6, 2019, 5 pages.
Non-Final Office Action for U.S. Appl. No. 15/192,479, dated Jan. 6, 2017, 17 pages.
Non-Final Office Action for U.S. Appl. No. 15/192,479, dated Dec. 15, 2017, 11 pages.
Notice of Allowance for U.S. Appl. No. 15/192,479, dated May 9, 2018, 7 pages.
Non-Final Office Action for U.S. Appl. No. 15/192,035, dated May 31, 2017, 19 pages.
Final Office Action for U.S. Appl. No. 15/192,035, dated Sep. 14, 2017, 15 pages.
Advisory Action for U.S. Appl. No. 15/192,035, dated Dec. 1, 2017, 3 pages.
Non-Final Office Action for U.S. Appl. No. 15/192,035, dated Mar. 9, 2018, 16 pages.
Final Office Action for U.S. Appl. No. 15/192,035, dated Aug. 1, 2018, 20 pages.
Advisory Action for U.S. Appl. No. 15/192,035, dated Sep. 24, 2018, 3 pages.
Notice of Allowance for U.S. Appl. No. 15/192,035, dated Nov. 6, 2018, 8 pages.
Non-Final Office Action for U.S. Appl. No. 15/191,846, dated Mar. 22, 2017, 12 pages.
Notice of Allowance for U.S. Appl. No. 15/191,846, dated Jul. 13, 2017, 8 pages.
Non-Final Office Action for U.S. Appl. No. 15/191,753, dated Aug. 1, 2018, 11 pages.
Notice of Allowance for U.S. Appl. No. 15/191,753, dated Jan. 14, 2019, 23 pages.
Notice of Allowance for U.S. Appl. No. 15/621,695, dated Sep. 21, 2017, 8 pages.
Final Office Action for U.S. Appl. No. 15/849,986, dated Oct. 26, 2018, 7 pages.
Non-Final Office Action for U.S. Appl. No. 15/849,986, dated Apr. 19, 2018, 9 pages.
Notice of Allowance for U.S. Appl. No. 15/849,986, dated Nov. 26, 2018, 8 pages.
Corrected Notice of Allowability and Interview Summary for U.S. Appl. No. 15/849,986, dated Jan. 14, 2019, 6 pages.
International Search Report and Written Opinion for International Patent Application No. PCT/US2017/016448, dated Apr. 6, 2017, 16 pages.
International Preliminary Report on Patentability for International Patent Application No. PCT/US2017/016448, dated Aug. 23, 2018, 10 pages.
International Search Report and Written Opinion for International Patent Application No. PCT/US2017/016454, dated Apr. 6, 2017, 16 pages.
International Preliminary Report on Patentability for International Patent Application No. PCT/US2017/016454, dated Aug. 23, 2018, 10 pages.
International Search Report and Written Opinion for International Patent Application No. PCT/US2017/016469, dated Apr. 6, 2017, 16 pages.
International Search Report and Written Opinion for International Patent Application No. PCT/US2018/037048, dated Aug. 31, 2018, 15 pages.
Non-Final Office Action for U.S. Appl. No. 17/023,899, dated Mar. 17, 2022, 10 pages.
First Office Action for Chinese Patent Application No. 2019800122175, dated Dec. 29, 2021, 12 pages.
Office Action for Canadian Patent Application No. 3089271, dated Oct. 8, 2021, 4 pages.
Non-Final Office Action for U.S. Appl. No. 17/082,767, dated Dec. 10, 2021, 7 pages.
Notice of Allowance for U.S. Appl. No. 17/082,767, dated Apr. 6, 2022, 10 pages.
Examination Report for European Patent Application No. 18738050.6, dated Mar. 22, 2022, 6 pages.
Final Office Action for U.S. Appl. No. 17/023,899, dated Aug. 18, 2022, 9 pages.
Second Office Action for Chinese Patent Application No. 2018800390348, dated Jun. 2, 2022, 20 pages.
Notice of Allowance for Canadian Patent Application No. 3089271, dated Aug. 23, 2022, 1 page.
Second Office Action for Chinese Patent Application No. 2019800122175, dated Sep. 23, 2022, 13 pages.
Decision of Rejection for Chinese Patent Application No. 2019800122175, dated Jun. 10, 2023, 6 pages.
Third Office Action for Chinese Patent Application No. 2019800122175, dated Mar. 16, 2023, 8 pages.
Office Action for Mexican Patent Application No. MX/a/2019/014927, dated Apr. 28, 2023, 3 pages.

(56) References Cited

OTHER PUBLICATIONS

Office Action for German Patent Application No. 112017000706.2, dated Jul. 24, 2023, 9 pages.

\* cited by examiner

| | A | B | C | D | E | F | G | H | I | J | K | L | M | N | O | P | Q | R |
|---|---|---|---|---|---|---|---|---|---|---|---|---|---|---|---|---|---|---|
| A | 1 | | | | | | | | | | | | | | | | | |
| B | | 1 | 0.7 | 0.3 | 0.1 | | | | | | | | | | | | | |
| C | | 0.7 | 1 | 0.7 | 0.3 | | | | | | | | | | | | | |
| D | | 0.3 | 0.7 | 1 | 0.7 | | | | | | | | | | | | | |
| E | | 0.1 | 0.3 | 0.7 | 1 | | | | | | | | | | | | | |
| F | | | | | | 1 | 0.6 | 0.2 | | | 0.1 | | | | | | | |
| G | | | | | | 0.6 | 1 | 0.6 | | | 0.3 | | | | | 0.1 | | |
| H | | | | | | 0.2 | 0.6 | 1 | | | 0.6 | | | | | 0.2 | | |
| I | | | | | | | | | 1 | 0.5 | | 0.6 | 0.3 | | | | 0.2 | 0.1 |
| J | | | | | | | | | 0.5 | 1 | | 0.3 | 0.6 | | | | 0.1 | 0.2 |
| K | | | | | | 0.1 | 0.3 | 0.6 | | | 1 | | | | | 0.6 | | |
| L | | | | | | | | | 0.6 | 0.3 | | 1 | 0.5 | | | | 0.6 | 0.3 |
| M | | | | | | | | | 0.3 | 0.6 | | 0.5 | 1 | | | | 0.3 | 0.6 |
| N | | | | | | | | | | | | | | 1 | 0.7 | | | |
| O | | | | | | | | | | | | | | 0.7 | 1 | | | |
| P | | | | | | | 0.1 | 0.2 | | | 0.6 | | | | | 1 | | |
| Q | | | | | | | | | 0.2 | 0.1 | | 0.6 | 0.3 | | | | 1 | 0.5 |
| R | | | | | | | | | 0.1 | 0.2 | | 0.3 | 0.6 | | | | 0.5 | 1 |

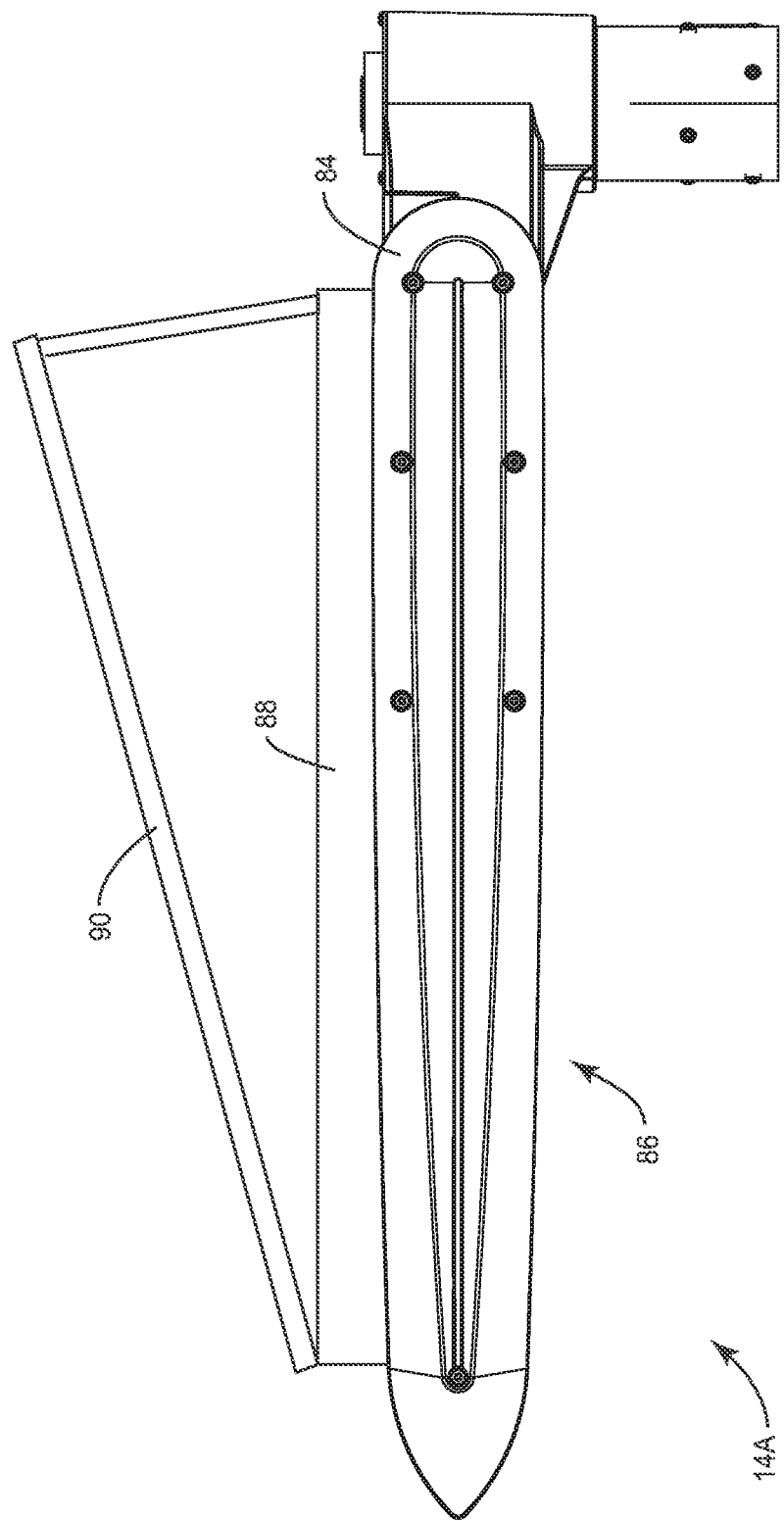

LIGHTING FIXTURE WITH ENHANCED SECURITY

RELATED APPLICATIONS

This application is a division of U.S. patent application Ser. No. 15/192,308, filed Jun. 24, 2016, which claims the benefit of provisional patent application Ser. No. 62/292,528, filed Feb. 8, 2016, the disclosure of which are hereby incorporated herein by reference in their entireties.

FIELD OF THE DISCLOSURE

The present disclosure relates to lighting fixtures, and in particular to lighting fixtures with enhanced security.

BACKGROUND

Lighting fixtures continue to evolve, incorporating features such as sensors, processing circuitry, networking circuitry, and the like. Accordingly, lighting fixtures may implement lighting programs, respond to the surrounding environment, and be controlled, for example, over a local area network and/or the Internet.

Thus far, lighting fixtures have been primarily concerned with measuring environmental factors directly related to the light output thereof (e.g., ambient light and occupancy). These environmental factors have generally been used to make decisions locally, for example, regarding the light output level of the lighting fixture to which the sensors are attached.

Networking circuitry has been incorporated into many lighting fixtures to allow them to communicate with one another. For example, a common approach is to form a mesh network of lighting fixtures in which the lighting fixtures can communicate with one another and/or receive commands from remote devices. Generally, these lighting fixture networks are used to provide control commands to various lighting fixtures or groups of lighting fixtures to adjust the light output thereof in some manner.

While the above mentioned features may improve the utility of a lighting fixture or group of lighting fixtures, there are significant opportunities for improvement.

SUMMARY

The present disclosure relates to lighting fixtures, and in particular to lighting fixtures with enhanced security. In one embodiment, a lighting fixture includes a solid-state light source, communications circuitry, a memory, and processing circuitry. The memory stores common security credentials, wherein the common security credentials are pre-installed during a factory calibration process. The processing circuitry is coupled to the solid-state light source, the communications circuitry, and the memory. The processing circuitry is configured to cause the solid-state light source to provide a desired light output. Further, the processing circuitry is configured to join a common network using the common security credentials, wherein only devices with the common security credentials are permitted to join the network. By using the common security credentials to join the network, a large number of lighting fixtures and other devices may form a secure distributed lighting network without manual intervention from a user. The common security credentials may then be updated to secure the network.

In one embodiment, the processing circuitry is further configured to communicate with a device in the common network via the communications circuitry and receive updated security credentials from the device and store them in the memory. The processing circuitry may then use the updated security credentials to communicate over the common network.

In one embodiment, a lighting fixture includes a solid-state light source, communications circuitry, a memory, and processing circuitry. The memory stores common security credentials, wherein the common security credentials are pre-installed during a factory calibration process. The processing circuitry is coupled to the solid-state light source, the communications circuitry, and the memory. The processing circuitry is configured to cause the solid-state light source to provide a desired light output. Further, the processing circuitry is configured to create a common network using the common security credentials, wherein only devices with the common security credentials are permitted to join the network. By using the common security credentials to create the network, a large number of lighting fixtures and other devices may form a secure distributed lighting network without manual intervention from a user. The common security credentials may then be updated to secure the network.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 11 is a table indicating a detected link strength between lighting fixtures in a distributed lighting network.

FIG. 12 is a table indicating a neighbor ranking for each one of a number of lighting fixtures in a distributed lighting network.

FIGS. 43A and 43B illustrate a lighting fixture according to one embodiment of the present disclosure.

DETAILED DESCRIPTION

Figure 1:
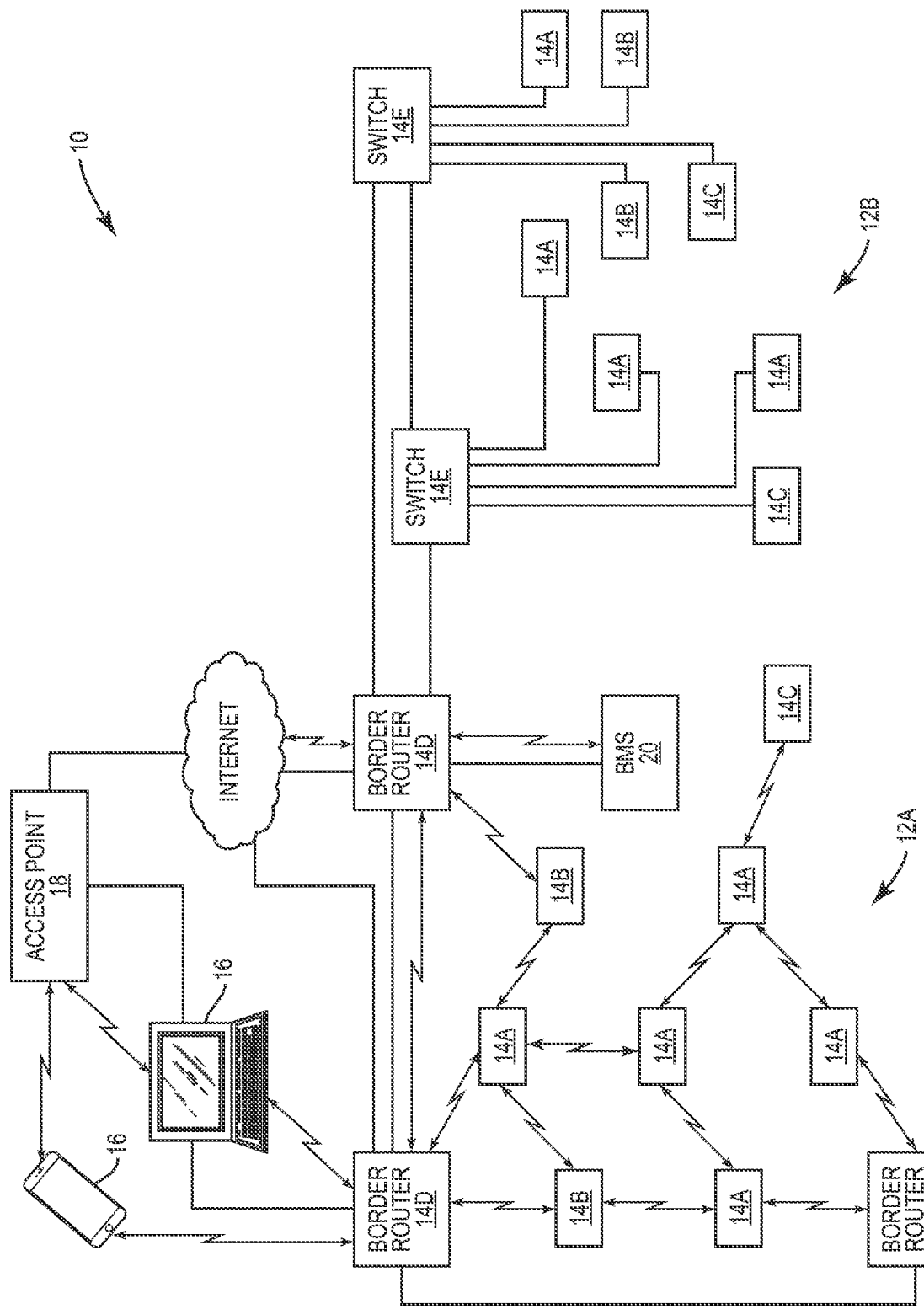
FIG. 1 is a block diagram of a distributed lighting network according to one embodiment of the present disclosure.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

FIG. 1 illustrates a distributed lighting network 10 according to one embodiment of the present disclosure. The distributed lighting network 10 includes a number of lighting networks 12, and in particular a wireless lighting network 12A and a wired lighting network 12B. The wireless lighting network 12A includes a number of devices 14, which may be lighting fixtures 14A, sensor modules 14B, controllers 14C, and border routers 14D. The devices 14 communicate with one another via wireless signals. In one embodiment, the devices 14 form a wireless mesh network, such that communication between two endpoints may be accomplished via one or more hops. For example, the devices 14 may communicate with one another via Institute of Electrical and Electronics Engineers (IEEE) standard 802.15 or some variant thereof. Using a wireless mesh network to communicate among the devices 14 may increase the reliability thereof and allow the wireless lighting network 12A to span large areas.

The wired lighting network 12B also includes a number of devices 14. In addition to including lighting fixtures 14A, sensor modules 14B, controllers 14C, and border routers 14D, the wired lighting network 12B may also include one or more switches 14E. In contrast to the wireless lighting network 12A, the devices 14 in the wired lighting network 12B communicate with one another via signals sent over a wired interface. In particular, the devices 14 may communicate with one another via an Ethernet interface, which is facilitated by a switch 14E. There may be multiple switches 14E in the wired lighting network 12B, each of which is connected to a particular subset of the devices 14. In one embodiment, the switches 14E are Power over Ethernet (PoE) switches such as those conforming to IEEE standard 802.3. Accordingly, the switches 14E may provide power to the devices 14 while simultaneously facilitating the exchange of data between the devices 14. While each one of the devices 14 are shown individually connected to a switch 14E, the devices 14 may be connected to one another in any manner, such that one of the devices 14 connects to one or more of the switches 14E via one or more other devices 14.

Each border router 14D may be in communication with each other border router 14D, or a subset of each other border router 14D. Such communication may occur in a wired or wireless manner. Similarly, each switch 14E may be in communication with each other switch 14E, or a subset of each other switch 14E. At least one of the switches 14E is in communication with at least one of the border routers 14D. The one or more border routers 14D in communication with the one or more switches 14E act as a bridge between the wireless lighting network 12A and the wired lighting network 12B, and therefore allow the separate networks to communicate with one another. Such bridge functionality may involve network address translation, network protocol translation, and the like, which is facilitated by the border router 14D. While the border router 14D in FIG. 1 is shown bridging the wireless lighting network 12A and the wired lighting network 12B, the border router 14D may also bridge two or more separate wireless lighting networks 12A, two or more wired lighting networks 12B, or any combination thereof. Further, while multiple border routers 14D are shown in FIG. 1, only a single border router 14D may be provided in some embodiments. Generally, additional border routers 14D are provided to increase network reliability and speed. Similarly, while multiple switches 14E are shown in FIG. 1, only one switch 14E may be provided in some embodiments. Generally, additional switches 14E are provided to support a larger number of devices 14, since the capacity of each switch 14E is limited. In one embodiment, the functionality of the border router 14D and the switch 14E is combined, such that each device 14 in the wired lighting network 12B connects directly or indirectly to one of the border routers 14D (rather than connecting to one of the border routers 14D via a switch 14E).

In addition to bridging the wireless lighting network 12A and the wired lighting network 12B, one or more of the border routers 14D may also connect to other communications networks such as the Internet. Further, one or more of the border routers 14D may interface, either directly or indirectly, with one or more remote devices 16 (e.g., a computer or wireless communications device). When communicating directly with the one or more border routers 14D, the one or more remote devices 16 may do so in a wired or wireless fashion, and in any number of communications standards/protocols. When communicating indirectly with the one or more border routers 14D, the one or more remote devices 16 may do so via an access point 18 connected to the Internet, which is in turn connected to the one or more border routers 14D. Once again, the one or more border routers 14D are responsible for translating the various network addresses, protocols, and the like between the different devices.

In addition to the bridge functionality discussed above, one or more of the border routers 14D may also communicate with a building management system 20, such as those conventionally used to control HVAC, security, and other building systems. Accordingly, one or more of the border routers 14D may include specialty communications circuitry for communicating with the building management system 20 in a wired or wireless manner. In another embodiment, the building management system 20 is fitted with a communication module (not shown) which enables wired or wireless communications with one or more of the border routers 14D. Allowing one or more of the border routers 14D to communicate with the building management system 20 may add significant intelligence to an existing building management system 20, and may allow for detailed insights regarding a space as well as energy and cost savings as discussed below.

The wireless and wired communications in the distributed lighting network 10 may occur in any number of communications standards/protocols. Additionally, the number of devices 14, border routers 14D, switches 14E, remote devices 16, and the like may be different in various embodiments. Using one or more of the border routers 14D to bridge the wireless lighting network 12A and the wired lighting network 12B extends the reach of the distributed lighting network 10, which may increase the functionality thereof. Further, using one or more of the border routers 14D to provide a bridge to other networks and devices may significantly increase the functionality thereof as discussed below.

The devices 14 may use the distributed lighting network 10 to communicate with one another. For example, the devices 14 may exchange status information, sensor data, commands, and the like. Messages passed between the devices 14 may be individually addressed such that the messages are received by a single one of the devices 14, broadcast to a subset of the devices 14, or broadcast to all of the devices 14. The border routers 14D and/or switches 14E may collect and store information from the devices 14. For example, the border routers 14D may collect and store status information, sensor data, or the like from the devices 14. Further, the border routers 14D and/or switches 14E may relay commands from the remote devices 16 to one or more of the devices 14, and may facilitate the collection of data from the devices 14 by the remote devices 16, either by providing cached data located in local storage in the border routers 14D or by requesting the data directly from the devices 14. At least one border router 14D or a designated device in communication with at least one border router 14D may provide an Application Program Interface (API), which is made available to devices connected to the distributed lighting network 10. In one embodiment, relevant information regarding the functioning of each one of the devices 14 (e.g., status information, sensor data, and the like) is locally cached for a period of time within each individual device. It may then be periodically retrieved and stored by one or more of the border routers 14D, or may be retrieved by one or more of the border routers 14D in response to a request from one or more of the remote devices 16. Each one of the devices 14 may also periodically broadcast relevant operational information, which is received and stored by one or more of the border routers 14D. Alternatively, operational information regarding each one of the devices 14 is not cached, but real time operational information can be obtained when requested. Virtually endless configurations exist for the storage and retrieval of information among the various components of the distributed lighting network 10, all of which are contemplated herein.

Notably, each one of the devices 14 is capable of operating independently of the others, and thus does not need to connect to the distributed lighting network 10 to function. For example, each one of the devices 14 may be capable of detecting the occurrence of an occupancy event and responding thereto (by adjusting the light output thereof in the case of a lighting fixture 14A), detecting changes in an ambient light level of the space surrounding the device and responding thereto (by adjusting the light output thereof in the case of a lighting fixture 14A). In other words, the control logic for each one of the devices 14 is locally stored and executed, and does not require external input. When connected to the distributed lighting network 10, the control logic of each one of the devices 14 may consider information provided via the distributed lighting network 10, and therefore the behavior of each one of the devices 14 may be influenced by other devices 14 in the network and/or one or more of the remote devices 16. For example, upon detection of an occupancy event by one of the devices 14, other devices 14 may respond to the detected occupancy event.

Similar to the above, a group of devices 14 may function together (e.g., sharing information and communicating with one another) without connecting to a border router 14D. In other words, the border router(s) 14D do not directly facilitate communication between the devices 14. This is due to the local control of each device discussed above. Accordingly, a border router 14D may or may not be provided, or may become disconnected or otherwise non-operational without causing a failure of the devices 14. While the additional functionality of the border router 14D may be lost (e.g., as a network bridge between other networks), the devices 14 may still benefit from communicating with one another and enjoy the functionality afforded by such communication.

Figure 2:
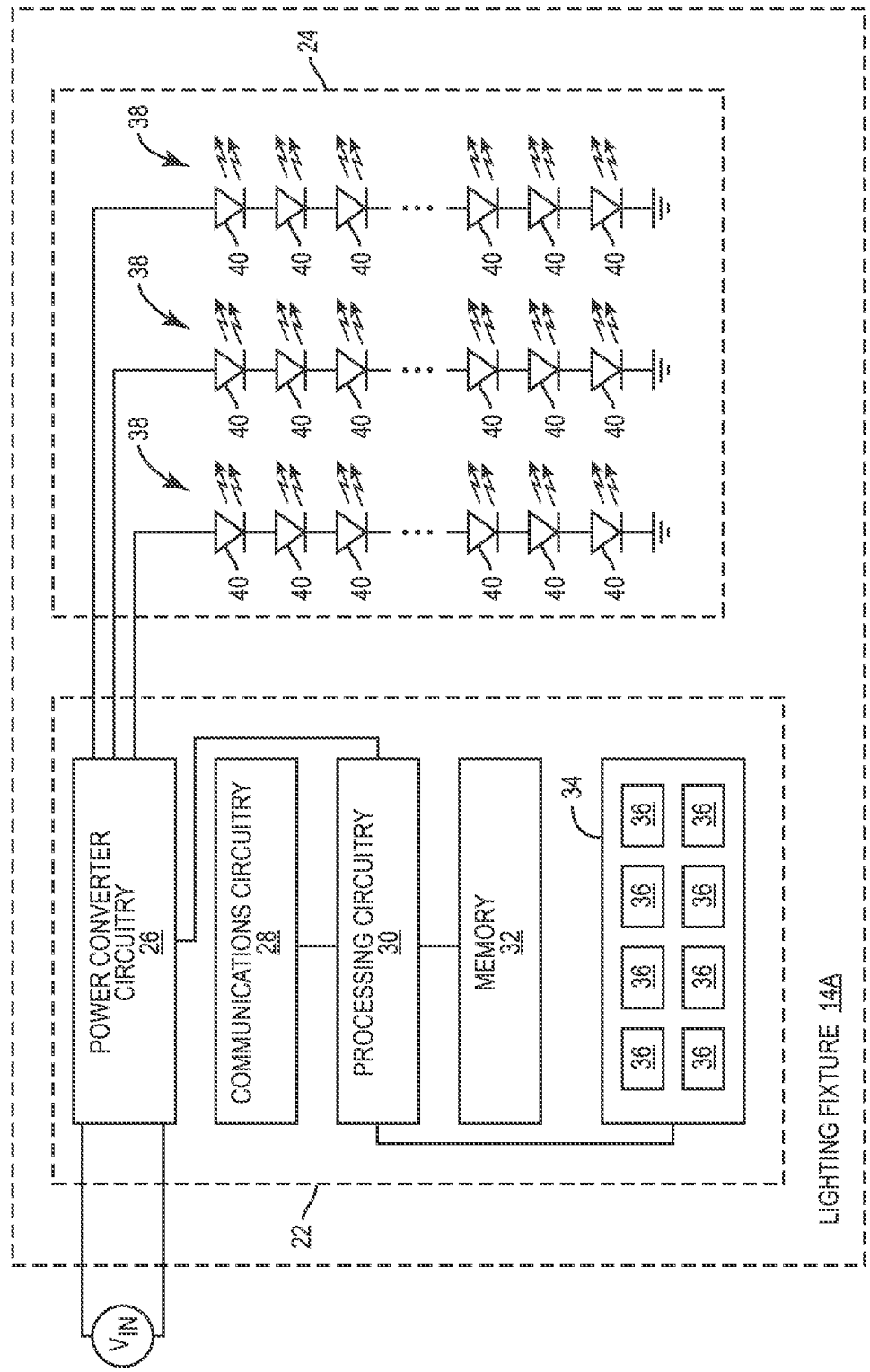
FIG. 2 is a functional schematic of a lighting fixture according to one embodiment of the present disclosure.

FIG. 2 is a block diagram illustrating details of a lighting fixture 14A according to one embodiment of the present disclosure. The lighting fixture 14A includes driver circuitry 22 and an array of light emitting diodes (LEDs) 24. The driver circuitry 22 includes power converter circuitry 26, communications circuitry 28, processing circuitry 30, a memory 32, and sensor circuitry 34. The power converter circuitry 26 is configured to receive an alternating current (AC) or direct current (DC) input signal ($V_{IN}$) and perform power conversion to provide a regulated output power to the array of LEDs 24. Notably, the power converter circuitry 26 may be configured such that the input signal ($V_{IN}$) is provided in whole or in part by a battery, such that the lighting fixture 14A is portable, capable of operating in emergencies such as power outages, and/or capable of being used in one or more off-grid applications as discussed below. In one embodiment, the power converter circuitry 26 is configured to provide a pulse-width modulated (PWM) regulated output signal to the array of LEDs 24. While not shown, a connection between the power converter circuitry 26 and each one of the communications circuitry 28, the processing circuitry 30, the memory 32, and the sensor circuitry 34 may provide regulated power to these portions of the driver circuitry 22 as well. The processing circuitry 30 may provide the main intelligence of the lighting fixture 14A, and may execute instructions stored in the memory 32 in order to do so. The processing circuitry 30 may thus control the amount of current, voltage, or both provided from the power converter circuitry 26 to the array of LEDs 24. The communications circuitry 28 may enable the lighting fixture 14A to communicate via wireless or wired signals to one or more other lighting fixtures 14A, sensor modules 14B, controllers 14C, border routers 14D, switches 14E, or any other devices. The communications circuitry 28 may be coupled to the processing circuitry 30 such that information received via the communications circuitry 28 can be considered and acted upon by the processing circuitry 30. The sensor circuitry 34 may include any number of different sensors 36. For example, the sensor circuitry 34 may include one or more passive infrared (PIR) occupancy sensors, one or more ambient light sensors, one or more microphones, one or more speakers, one or more ultrasonic sensors and/or transducers, one or more infrared receivers, one or more imaging sensors such as a camera, a multi-spectral imaging sensor, or the like, one or more atmospheric pressure sensors, one or more temperature and/or humidity sensors, one or more air quality sensors such as oxygen sensors, carbon dioxide sensors, volatile organic compound (VOC) sensors, smoke detectors, and the like, one or more positioning sensors such as accelerometers, Global Positioning Satellite (GPS) sensors, and the like, one or more magnetic field sensors, or any other sensors. The sensor circuitry 34 may be in communication with the processing circuitry 30 such that information from the sensors 36 can be considered and acted upon by the processing circuitry 30. In some situations, the processing circuitry 30 may use information from the sensors 36 to adjust the voltage and/or current provided from the power converter circuitry 26 to the array of LEDs 24, thereby changing one or more aspects of the light provided by the lighting fixture 14A. In other situations, the processing circuitry 30 may communicate information from the sensors 36 via the communications circuitry 28 to one or more of the devices 14 or one or more of the border routers 14D in the distributed lighting network 10, or to one or more of the remote devices 16. In still other situations, the lighting fixture 14A may both change one or more aspects of the light provided therefrom based on information from the one or more sensors 36 and communicate the information from the one or more sensors 36 via the communications circuitry 28.

The array of LEDs 24 includes multiple LED strings 38. Each LED string 38 includes a number of LEDs 40 arranged in series between the power converter circuitry 26 and ground. Notably, the disclosure is not limited to lighting fixtures 14A having LEDs 40 arranged in this manner. The LEDs 40 may be arranged in any series/parallel combination, may be coupled between contacts of the power converter circuitry 26, or arranged in any other suitable configuration without departing from the principles described herein. The LEDs 40 in each one of the LED strings 38 may be fabricated from different materials and coated with different phosphors such that the LEDs 40 are configured to provide light having different characteristics than the LEDs 40 in each other LED string 38. For example, the LEDs 40 in a first one of the LED strings 38 may be manufactured such that the light emitted therefrom is green, and include a phosphor configured to shift this green light into blue light. Such LEDs 40 may be referred to as blue-shifted green (BSG) LEDs. The LEDs 40 in a second one of the LED strings 38 may be manufactured such that the light emitted therefrom is blue, and include a phosphor configured to shift this blue light into yellow light. Such LEDs 40 may be referred to as blue-shifted yellow (BSY) LEDs. The LEDs 40 in a third one of the LED strings 38 may be manufactured to emit red light, and may be referred to as red (R) LEDs. The light output from each LED string 38 may combine to provide light having a desired hue, saturation, brightness, etc. Any different types of LEDs 40 may be provided in each one of the LED strings 38 to achieve any desired light output. The power converter circuitry 26 may be capable of individually changing the voltage and/or current provided through each LED string 38 such that the hue, saturation, brightness, or any other characteristic of the light provided from the array of LEDs 40 can be adjusted.

The lighting fixture 14A may be an indoor lighting fixture or an outdoor lighting fixture. Accordingly, the distributed lighting network 10 may include any number of both indoor and outdoor lighting fixtures.

Figure 3:
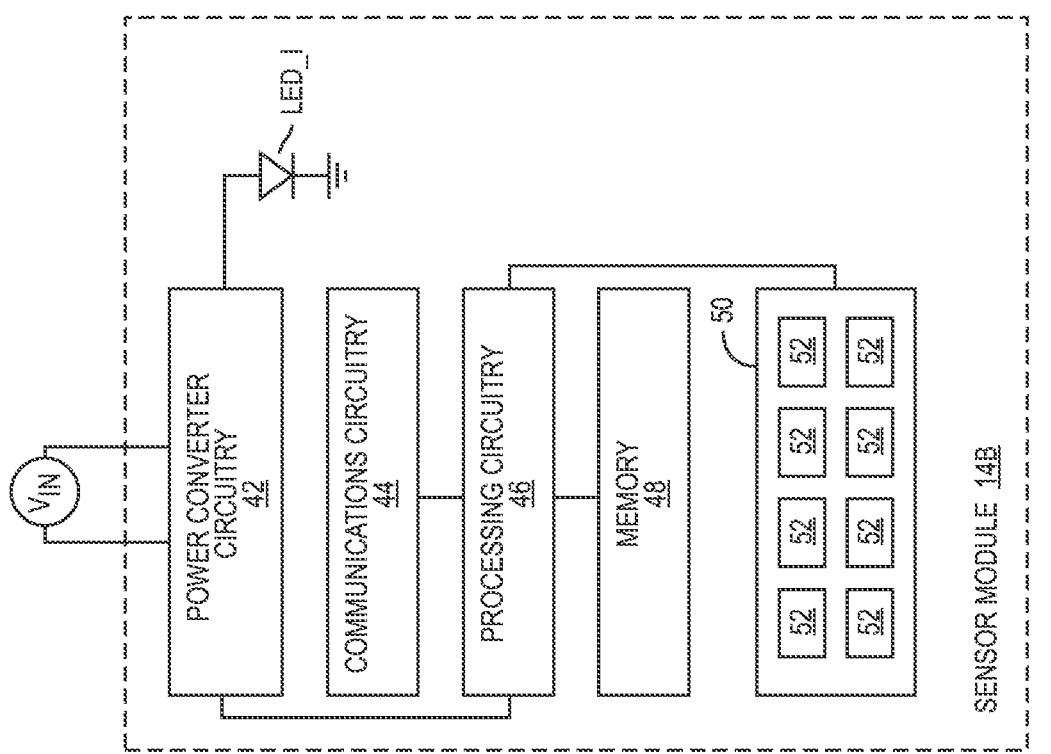
FIG. 3 is a functional schematic of a sensor module according to one embodiment of the present disclosure.

FIG. 3 is a block diagram illustrating details of a sensor module 14B according to one embodiment of the present disclosure. The sensor module 14B includes power converter circuitry 42, communications circuitry 44, processing circuitry 46, a memory 48, sensor circuitry 50, and an indicator light LED_I. The power converter circuitry 42 is configured to receive an AC or DC input signal ($V_{IN}$) and perform power conversion to provide a regulated output power to one or more of the communications circuitry 44, the processing circuitry 46, the memory 48, and the sensor circuitry 50. Notably, the power converter circuitry 42 may be configured such that the input signal ($V_{IN}$) may be provided at least in part by a battery, such that the sensor module 14B is portable, suitable for one or more off-grid applications, and/or capable of operating in emergencies such as power outages. The processing circuitry 30 may provide the main intelligence of the sensor module 14B, and may execute instructions stored in the memory 48 to do so. The communications circuitry 44 may enable the sensor module 14B to communicate via wireless or wired signals to one or more other lighting fixtures 14A, sensor modules 14B, controllers 14C, border routers 14D, switches 14E, or other devices. In some embodiments, regulated power is received at the communications circuitry 44 (e.g., via a communications interface providing both power and data such as an Inter-Integrated Circuit (I$^2$C) bus, a universal serial bus (USB), or PoE), where it is then distributed to the processing circuitry 46, the memory 48, and the sensor circuitry 50. Accordingly, in some embodiments, the power converter circuitry 42 may not be provided in the sensor module 14B. The communications circuitry 44 may be coupled to the processing circuitry 46 such that information received via the communications circuitry 44 may be considered and acted upon by the processing circuitry 46. The sensor circuitry 50 may include any number of sensors 52 as discussed above. The sensor circuitry 50 may be in communication with the processing circuitry 46 such that information from the sensors 52 can be considered and acted upon by the processing circuitry 46. The indicator light LED_I may provide status information to a user, for example, by changing the intensity, color, blinking frequency, or the like. Further, the indicator light LED_I may be used to participate in an automatic grouping process as discussed below.

It may be desirable to incorporate the sensor modules 14B into the distributed lighting network 10 in order to fill gaps in sensor coverage from the sensors 36 in the lighting fixtures 14A. That is, the spacing between lighting fixtures 14A may leave gaps in sensor coverage, which may be filled by standalone sensor modules 14B. Additionally, the sensor modules 14B provide the ability to include sensors in locations in which lighting fixtures are not provided, or where legacy lighting fixtures (e.g., incandescent or fluorescent lighting fixtures are provided instead). Further, the flexibility of the sensor modules 14B may allow them to be incorporated into pre-existing devices including access to power, such as legacy lighting fixtures, exit signs, emergency lighting arrays, and the like. Finally, since the sensor modules 14B do not include the LED array 24, they may be significantly less expensive to manufacture, and therefore may allow sensors to be deployed throughout a space at a reduced cost.

Figure 4:
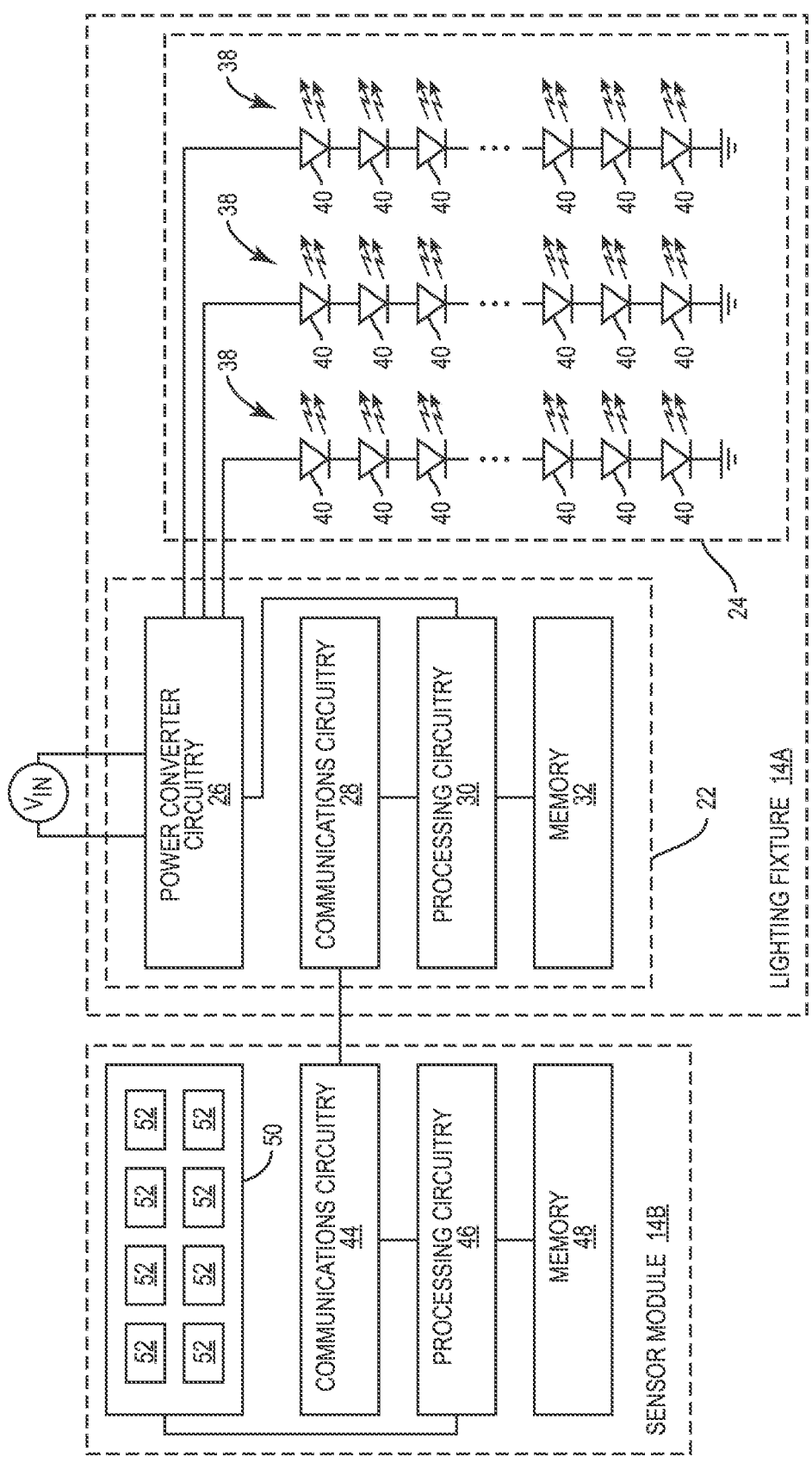
FIG. 4 is a functional schematic of a lighting fixture connected to a sensor module according to one embodiment of the present disclosure.

FIG. 4 is a block diagram illustrating details of a lighting fixture 14A according to an additional embodiment of the present disclosure. The lighting fixture 14A shown in FIG. 4 is similar to that shown in FIG. 2, except that the sensor circuitry 34 is removed from the driver circuitry 22. In place of the sensor circuitry 34, the driver circuitry 22 connects to a sensor module 14B, which is integrated into the lighting fixture 14A. The sensor module 14B is substantially similar to that shown above in FIG. 3, but does not include the power converter circuitry 42, since, in the current embodiment, power is supplied to the sensor module 14B via the communications circuitry 44 (e.g., via an I$^2$C, USB, or PoE interface). However, the disclosure is not so limited. The driver circuitry 22 may maintain all or a portion of the sensors 36 shown in FIG. 2 and the sensor module 14B may maintain the power converter circuitry 42 in some embodiments. Further, the sensor module 14B may share one or more components with the driver circuitry 22 in various embodiments. The sensor module 14B may be detachable from the lighting fixture 14A and thus upgradeable over time. Details of such an upgradeable lighting fixture 14A are described in co-pending U.S. patent application Ser. No. 14/874,099, issued as U.S. Pat. No. 9,699,856, the contents of which are hereby incorporated by reference in their entirety. As discussed in this application, the sensor module 14B may connect to the driver circuitry 22 via a connector in the lighting fixture 14A, and may aesthetically blend with the appearance of the lighting fixture 14A when installed.

Connecting a sensor module 14B to a lighting fixture 14A in this manner provides several benefits. First and foremost, it is a modular approach, and thus foregoes the need for separate product lines with and without the additional functionality of the sensor module 14B. Second, the sensor module 14B may be upgradeable without changing the lighting fixture 14A, for example, to add additional sensors and functionality to the lighting fixture 14A. Third, the sensor module 14B may include separate processing circuitry 46 from the lighting fixture 14A. Since the processing power of the processing circuitry 30 may be limited, and since it is desirable to avoid overloading and thus slowing the functionality of the processing circuitry 30 in the lighting fixture 14A, having separate processing circuitry 46 for conditioning or otherwise operating on data from the sensors 52 in the sensor module 14B may be highly advantageous. In general, any number of sensors may be directly integrated with a lighting fixture 14A, separate from the lighting fixture 14A and connected in either a wired or wireless manner thereto, or separate from the lighting fixture 14A and connected via a network interface to the lighting fixture 14A.

Figure 5:
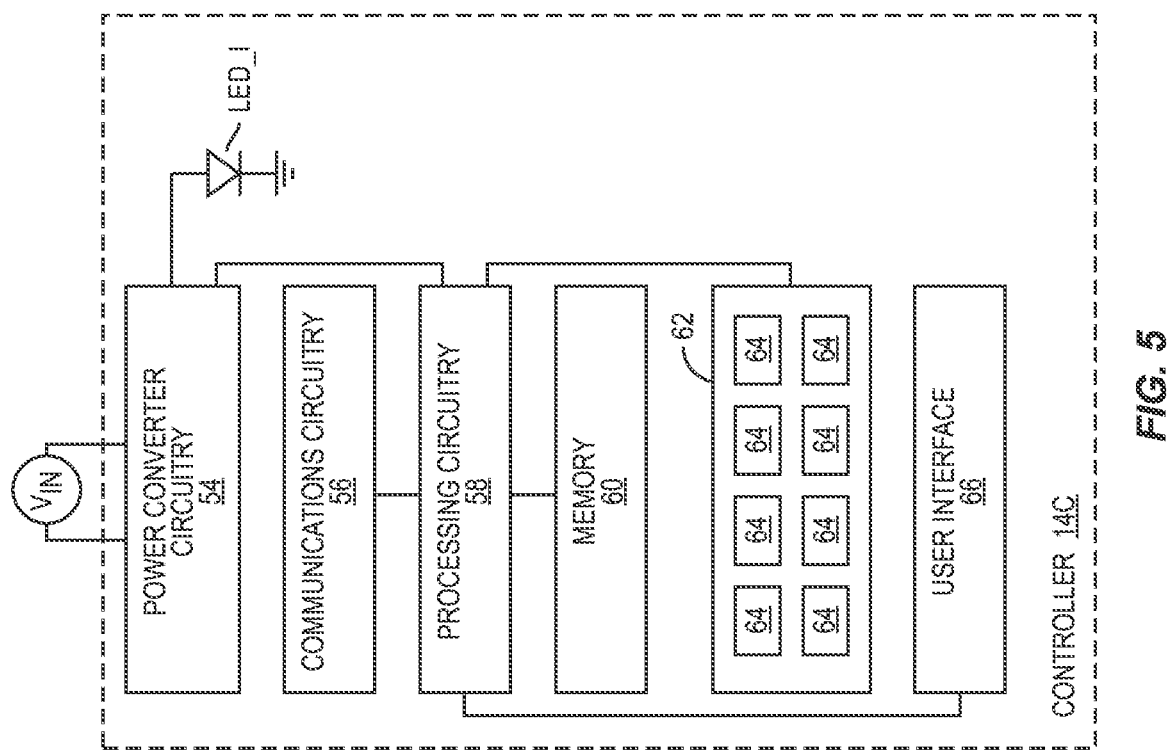
FIG. 5 is a functional schematic of a controller according to one embodiment of the present disclosure.

FIG. 5 is a block diagram illustrating details of a controller 14C according to one embodiment of the present disclosure. The controller 14C is similar to the lighting fixtures 14A and sensor module 14B discussed above, and includes power converter circuitry 54, communications circuitry 56, processing circuitry 58, a memory 60, sensor circuitry 62 with a number of sensors 64, and an indicator light LED_I. The function of each of these components is similar to that discussed above for the lighting fixtures 14A and sensor module 14B. The controller 14C further includes a user interface 66 that allows for interaction with the controller. The user interface 66 may include one or more physical buttons, switches, dials, etc., or may include a software interface that is displayed on a screen or touch-enabled screen. The user interface 66 is coupled to the processing circuitry 58 such that input provided via the user interface 66 can be considered and acted upon by the processing circuitry 58. In one embodiment, the controller 14C is a wall-mounted switch that includes one or more paddles that act as the user interface 66. For example, the controller 14C may be a CWD-CWC-XX and/or CWS-CWC-XX wall controller manufactured by Cree, Inc. of Durham, North Carolina Similar to the sensor module 14B discussed above, the controller 14C may also be configured to be powered at least in part by a battery such that the controller is portable, suitable for one or more off-grid applications, and/or capable of operating in emergencies such as power outages.

Figure 6:
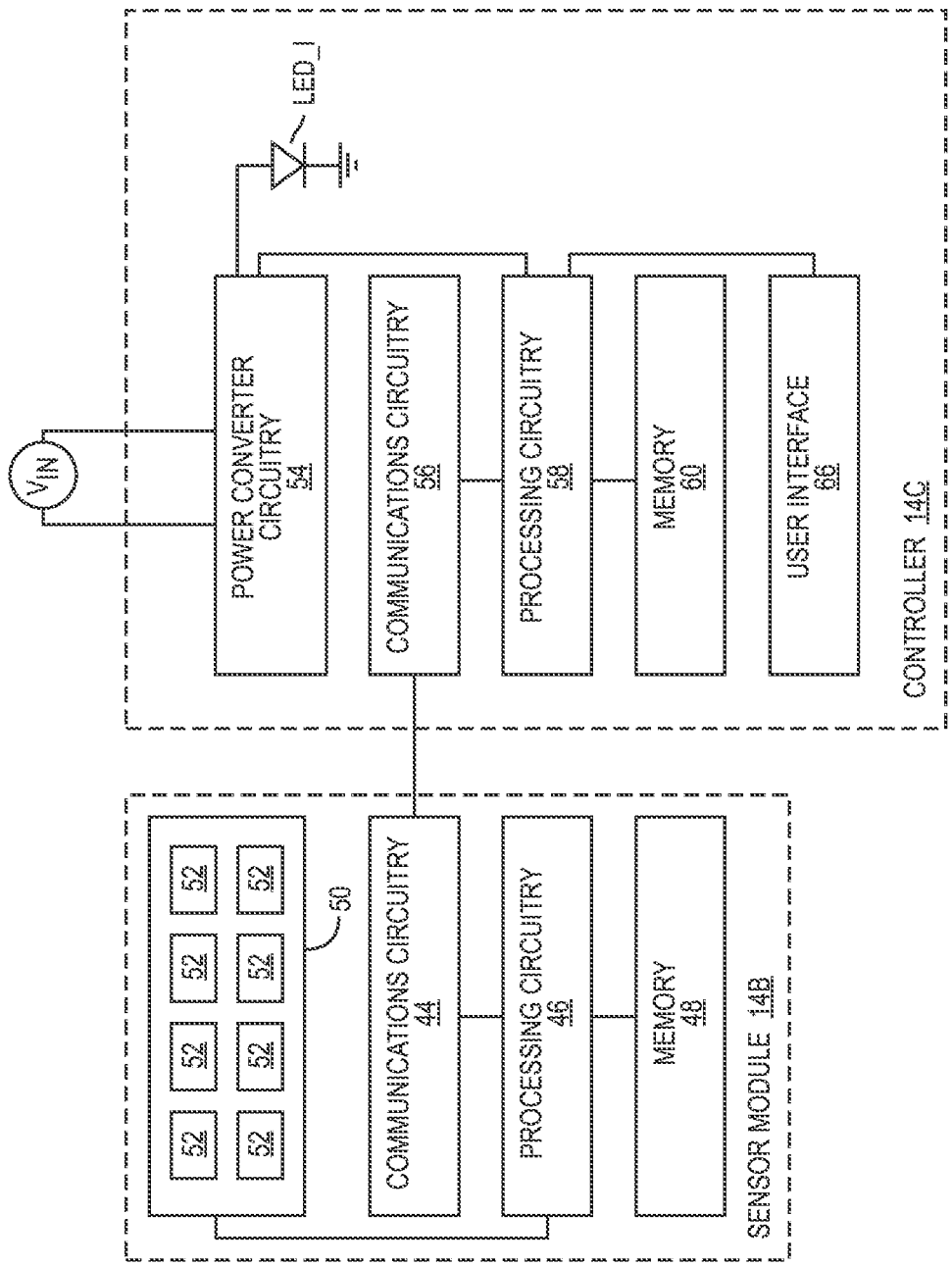
FIG. 6 is a functional schematic of a controller connected to a sensor module according to one embodiment of the present disclosure.

FIG. 6 is a block diagram illustrating details of a controller 14C according to an additional embodiment of the present disclosure. The controller 14C shown in FIG. 6 is similar to that shown in FIG. 5, except that the sensor circuitry 62 is removed. In place of the sensor circuitry 62, the controller 14C connects to a sensor module 14B, which is integrated into the controller 14C. The sensor module 14B is substantially similar to that shown above in FIG. 3, but does not include the power converter circuitry 42, since, in the current embodiment, power is supplied to the sensor module 14B via the communications circuitry 44 (e.g., via an I$^2$C, USB, or PoE interface). However, the disclosure is not so limited. The controller 14C may maintain all or a portion of the sensors 64 shown in FIG. 5 and the sensor module 14B may maintain the power converter circuitry 42 in some embodiments. Further, the sensor module 14B may share one or more components with the controller 14C in various embodiments. The sensor module 14B may be detachable from the controller 14C and thus upgradeable over time. As discussed above, providing the sensor module 14B in this manner may forego the need for additional product lines, maintain upgradeability of the controller without changing the core hardware thereof, and provide additional processing resources.

Figure 7:
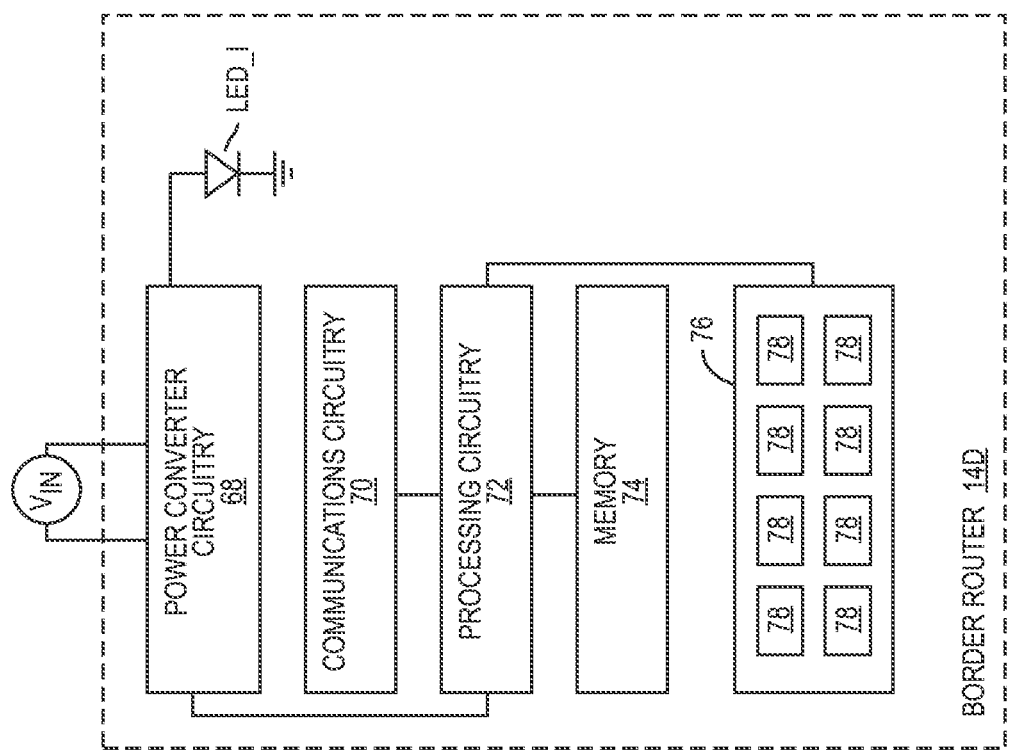
FIG. 7 is a functional schematic of a border router according to one embodiment of the present disclosure.

FIG. 7 is a block diagram illustrating details of a border router 14D according to one embodiment of the present disclosure. The border router 14D includes power converter circuitry 68, communications circuitry 70, processing circuitry 72, a memory 74, sensor circuitry 76, and an indicator light LED_I. As discussed above, the power converter circuitry 68 may receive an AC or DC input signal ($V_{IN}$) and perform power conversion to provide a converted output signal, which is used to power the communications circuitry 70, the processing circuitry 72, the memory 74, and the sensor circuitry 76. The input signal ($V_{IN}$) may be provided in whole or in part by a battery in some embodiments, such that the border router 14D is portable, suitable for one or more off-grid applications, and/or capable of operating in emergencies such as power outages. The communications circuitry 70 allows the border router 14D to communicate with lighting fixtures 14A, sensor modules 14B, controllers 14C, switches 14E, remote devices 16, and the like, and allows the border router 14D to bridge the various networks discussed above with respect to FIG. 1. Accordingly, the communications circuitry 70 in the border router 14D may be more robust than the communications circuitry in the lighting fixtures 14A, sensor modules 14B, controllers 14C, switches 14E, and remote devices 16. In particular, while the lighting fixtures 14A, sensor modules 14B, controllers 14C, switches 14E, and remote devices 16 may communicate via a single communications protocol or a handful of communications protocols and thus include communications circuitry configured only to communicate in this manner, the communications circuitry 70 of the border router may support communication in a large number of diverse communications protocols such that the border router 14D is capable of bridging these various networks. The processing circuitry 72 provides the central intelligence of the border router 14D, and may execute instructions stored in the memory 74 in order to do so. For example, the processing circuitry 72 may facilitate the collection and storage of operational data from the lighting fixtures 14A, sensor modules 14B, and controllers 14C, and further may facilitate the API discussed above to allow remote devices 16 to obtain said operational information. The sensor circuitry 76 may include any number of sensors 78 such as those discussed above, so that the border router 14D may collect information from its own sensors 78 in addition to those provided by the lighting fixtures 14A, sensor modules 14B, and controllers 14C.

Figure 8:
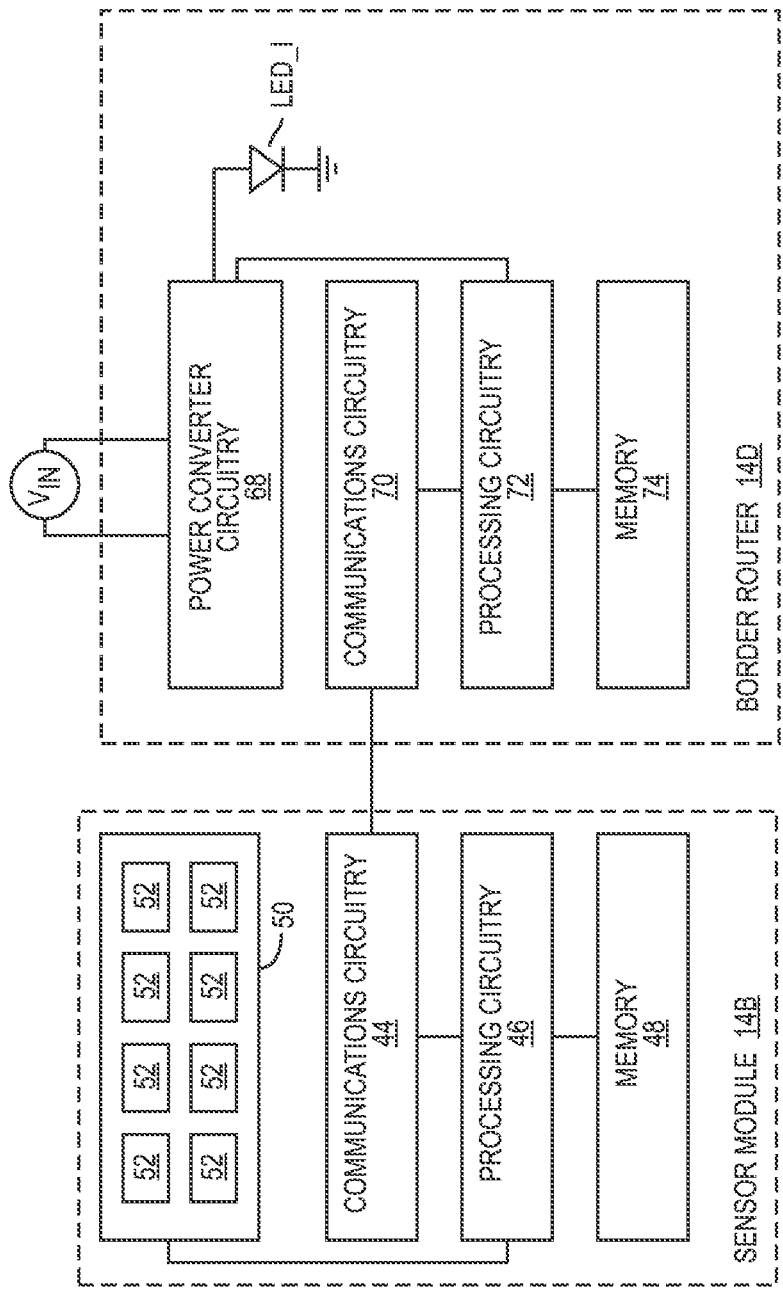
FIG. 8 is a functional schematic of a border router connected to a sensor module according to one embodiment of the present disclosure.

FIG. 8 is a block diagram illustrating details of a border router 14D according to an additional embodiment of the present disclosure. The border router 14D is substantially similar to that shown above in FIG. 7, except that the sensor circuitry 76 is removed from the border router 14D. In place of the sensor circuitry 76, the border router 14D connects to a sensor module 14B, which is integrated into the border router 14D. The sensor module 14B is substantially similar to that shown above in FIG. 3, but does not include the power converter circuitry 42, since, in the current embodiment, power is supplied to the sensor module 14B via the communications circuitry 44 (e.g., via an I²C or PoE interface). However, the disclosure is not so limited. The border router 14D may maintain all or a portion of the sensors 78 shown in FIG. 7 and the sensor module 14B may maintain the power converter circuitry 42 in some embodiments. Further, the sensor module 14B may share one or more components with the border router 14D in various embodiments. The sensor module 14B may be detachable from the border router 14D and upgradeable over time. As discussed above, providing the sensor module 14B in this manner may forego the need for additional product lines, maintain upgradeability of the controller without changing the core hardware thereof, and provide additional processing resources.

In many environments, there are logical divisions between spaces therein. For example, a logical way to divide a building is by floor. Generally, the different lighting networks 12 in the distributed lighting network 10 can be separated based on these logical divisions. In the case of a building, a first lighting network 12 may span all or a portion of a first floor, a second lighting network 12 may span all or a portion of a second floor, and so on. In general, floors are a good way to separate these lighting networks 12 because there is a lesser need for communication and cooperation between devices 14 located on different floors. Accordingly, dividing the lighting networks 12 in this manner reduces the overall traffic in each lighting network 14 and thus may improve the performance thereof. One or more border routers 14D may bridge the various lighting networks 12 to form the distributed lighting network 10. Communication between these lighting networks 12 in the distributed lighting network 10 may only be used for particular messages or types of communication (e.g., high priority communication or the like), thereby allowing each lighting network 12 to remain encapsulated and thus enjoy the aforementioned reductions in network traffic.

In addition to forming different lighting networks 12 in a space, it is sometimes desirable to form groups of devices 14 as well. These groups may correspond, for example, with the devices 14 that are present within a particular room, group of rooms, or other logical sub-division of space. Grouping devices 14 together may cause them to share information to a higher degree than other devices in a lighting network 12. In some embodiments, devices 14 in a group will respond to commands initiated from a controller 14C in the group. Devices 14 outside the group will not respond to said commands. Similarly, devices 14 in a group may respond to changes in the environment detected by one or more sensors of one of the devices 14 in the group. Devices 14 outside the group will not respond to said environmental changes unless detected by one of the devices 14 in their own group. In general, grouping devices 14 may allow them to behave as a unit, which may be desirable in many circumstances. Groups of devices may correspond with networking groups having different privileges. For example, a group of devices may behave as a sub-network of a larger lighting network 12. Further, a group of devices may belong to a multicast IP group in which messages are distributed among devices in the group and not outside the group.

While the above description highlights the advantages of dividing a number of devices 14 into networks and groups, doing so has previously been a time consuming and difficult process. Conventionally, devices 14 have been grouped manually, requiring a significant investment of time to set up these groups. Further, network formation processes have previously been over-inclusive, often extending a lighting network 12 beyond a desired space and causing network congestion due to an unnecessarily large number of devices 14 in the lighting network 12. Previous solutions have significantly simplified the grouping of lighting fixtures using light modulation (referred to herein as "lightcasting/ lightcatching"), as performed by current SmartCast™ lighting fixtures manufactured by Cree, Inc. of Durham, North Carolina Details regarding the automatic formation of groups in this manner are discussed in U.S. patent application Ser. No. 13/782,022, issued as U.S. Pat. No. 9,155,165, the contents of which are hereby incorporated by reference in their entirety. While the automatic grouping discussed above may be applied to any of the devices 14 in the distributed lighting network 10 to significantly improve the setup process of grouping devices 14 together, several improvements have since been made that further simplify network and group formation as discussed below.

Figure 9:
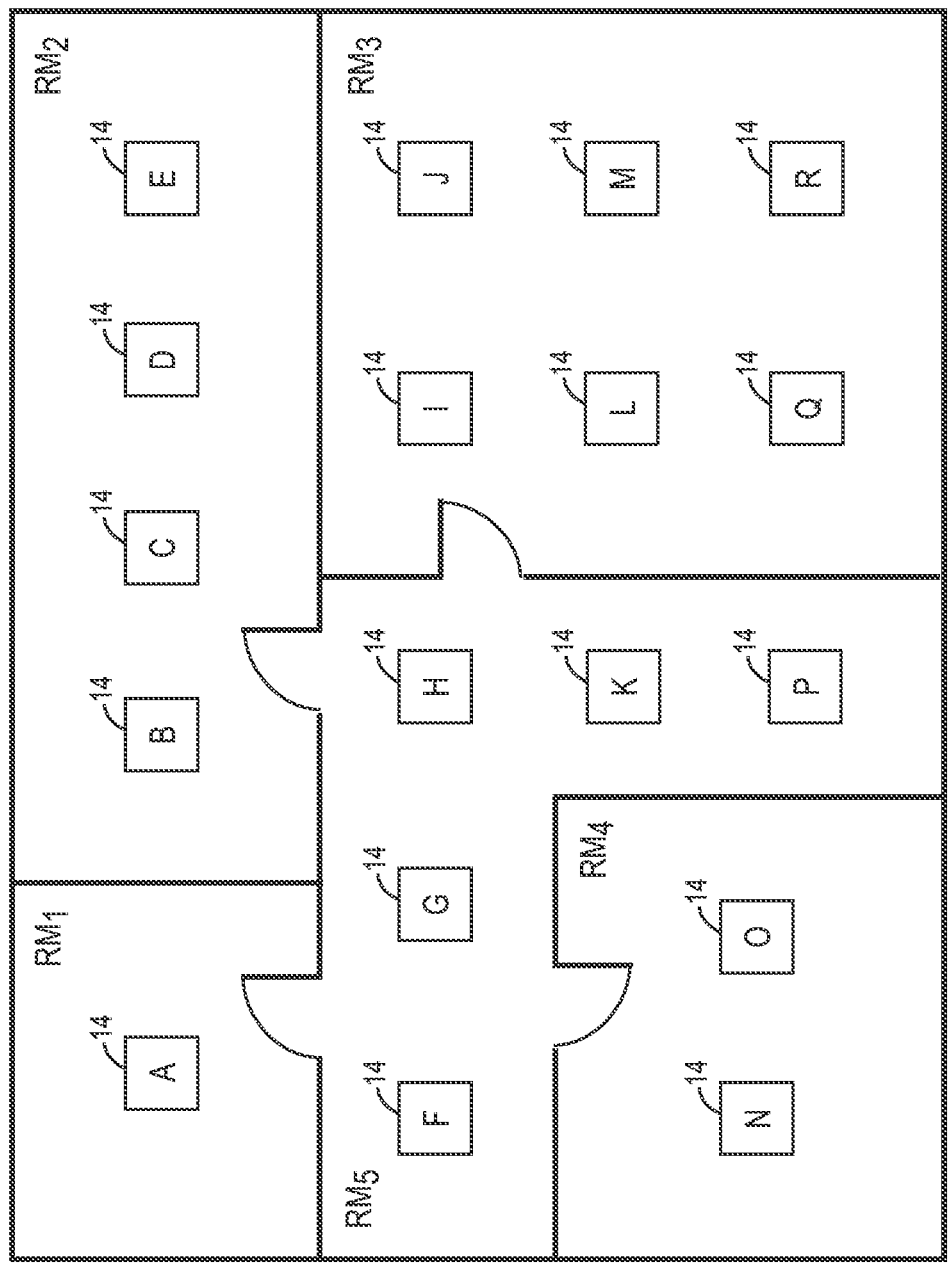
FIG. 9 is a diagram illustrating a distributed lighting system according to one embodiment of the present disclosure.

Previously, network formation (i.e., the inclusion of devices in a lighting network 12) was a separate process than the automatic grouping process discussed above. However, setup of a lighting network 12 and one or more groups within the lighting network 12 may be performed together in some embodiments. With reference to FIG. 9, a number of devices 14, which could be any combination of lighting fixtures 14A, sensor modules 14B, controllers 14C, and/or border routers 14D, are uniquely referenced as devices A through R and shown in different rooms (RM1-RM4) in a space. In particular, device A is located in a first room RM1, devices B-E are located in a second room RM2, devices I, J, L, M, Q, and R are located in a third room RM3, devices N and O are located in a fourth room RM4, and devices F, G, H, K, and P are located in a fifth room RM5, which may be a hallway. Using lightcasting and lightcatching, the devices 14 may be automatically grouped into five different groups as discussed below.

Figure 10:
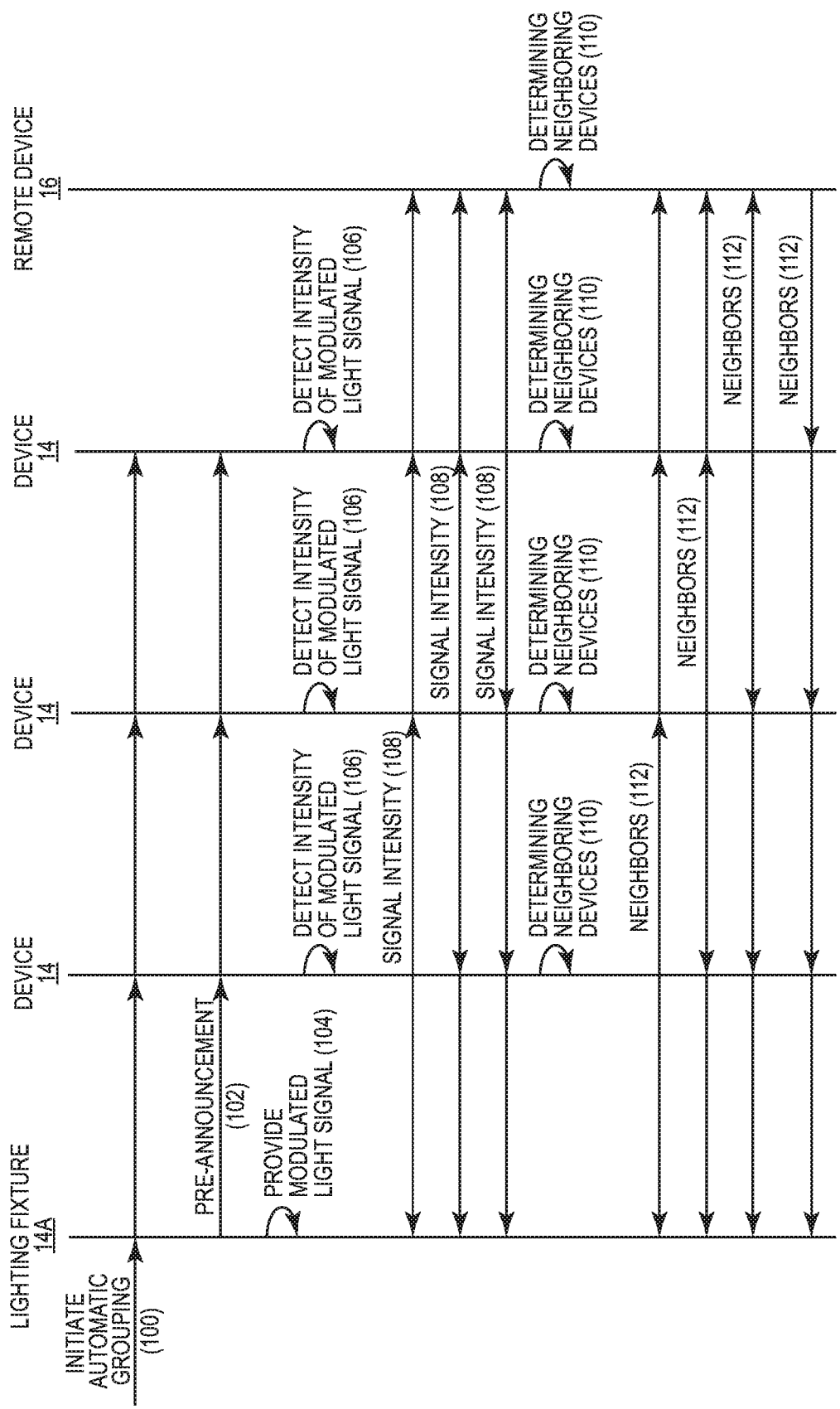
FIG. 10 is a call flow diagram illustrating a process for automatically grouping a number of devices in a distributed lighting network according to one embodiment of the present disclosure.

FIG. 10 is a call flow diagram illustrating an exemplary automatic grouping process according to one embodiment of the present disclosure. First, the automatic grouping process is initiated (step 100). The automatic grouping process may be initiated in any number of different ways. For example, the automatic grouping process may be initiated using a handheld commissioning tool configured to communicate directly with each device 14, may be initiated by a remote device 16 connected to the distributed lighting network 10, or may be initiated by pressing a physical button or otherwise activating a sensor on one of the devices 14. In one embodiment, the automatic grouping process is initiated as soon as the device 14 is powered on. In any event, the automatic grouping process is generally initiated starting with a single device 14, and in particular a single lighting fixture 14A. Due to the nature of the automatic grouping process, the initiating device 14 must be capable of providing a modulated light signal (either visible or not). Generally, the lighting fixtures 14A are the only devices 14 in the distributed lighting network 10 that are capable of doing so, however, devices such as sensor modules 14B and controllers 14C may be similarly configured to do so in some embodiments. Devices 14 that are not capable of providing such a modulated light signal may be configured to ignore such an initiation process or to handoff the initiation process to a nearby device 14 (i.e., a lighting fixture 14A) that is capable of doing so. The initiating device 14 may be specifically chosen by a user, chosen at random, or selected in any preferred manner. In some embodiments, multiple devices 14 are simultaneously chosen to initiate the automatic grouping process. This may speed up the automatic grouping process by allowing it to simultaneously propagate throughout a space in multiple directions, but also may complicate the process, since it is necessary to know which device 14 is providing the modulated light signal and there is a possibility that a single device 14 may simultaneously see a modulated light signal from two different sources. Such a problem may be solved by each device 14 providing a modulated light signal at a particular frequency or frequency range in some embodiments. By communicating the frequency or frequency range using wired or wireless communications, the devices 14 looking for modulated light signals can know which device 14 is providing which modulated light signal, and thereby determine the relationship between the devices 14 as discussed below.

Regardless of how the initiating device(s) 14 are chosen, said device(s) 14 first announce that they will begin providing a modulated light signal via wired or wireless communication (step 102). This lets other devices 14 in the network know which device(s) 14 are providing the modulated light signal upon detection. Accordingly, such an announcement may include identifying information about the device(s) 14 providing a modulated light signal such as a device identifier or MAC address. In additional embodiments, each device 14 providing a modulated light signal may include an identifier thereof in the modulated light signal itself. This principle may be used to uniquely identify several different devices 14 that are simultaneously providing modulated light signals. In general, any desired information can be communicated in the modulated light signals provided by the devices 14, which may be useful in streamlining the automatic grouping process. Next, the initiating device(s) 14 begin providing the modulated light signal (lightcasting) at a particular frequency (step 104), while all other devices 14 in the network detect the intensity of the modulated light signal (lightcatching) using one or more sensors (step 106). In one embodiment, the detecting devices 14 detect the intensity of the modulated light signal using an ambient light sensor. Such a sensor is capable of detecting the modulated light signal and a "signal strength" (i.e., a light intensity) thereof. In other embodiments, the detecting devices 14 detect the intensity of the modulated light signal using an image sensor such as a camera. The image sensor may provide significantly more information about the modulated light signal, such as a "signal strength" and a direction vector indicating the direction of the device 14 providing the modulated light signal with respect to the detecting device 14. Accordingly, in some embodiments the detecting devices 14 may similarly detect this additional information. The direction vectors discussed above may allow the devices 14 to determine a real-space representation of the devices 14 with respect to one another, as discussed in detail in co-pending U.S. patent application Ser. No. 14/826,892, issued as U.S. Pat. No. 9,750,112, the contents of which are hereby incorporated by reference in their entirety.

The above described process is iterated such that each device 14 capable of providing a modulated light signal does so, and each other device 14 obtains an intensity value associated with the modulated light signal from each one of these devices 14. The resulting data can be viewed as a table such as the one shown in FIG. 11. Notably, each device 14 may only know the modulated light intensity measurements detected by its own sensors, and thus in some embodiments the devices 14 may either periodically share the relative intensity information with one another and with one or more remote devices 16 (step 108).

Figure 12:
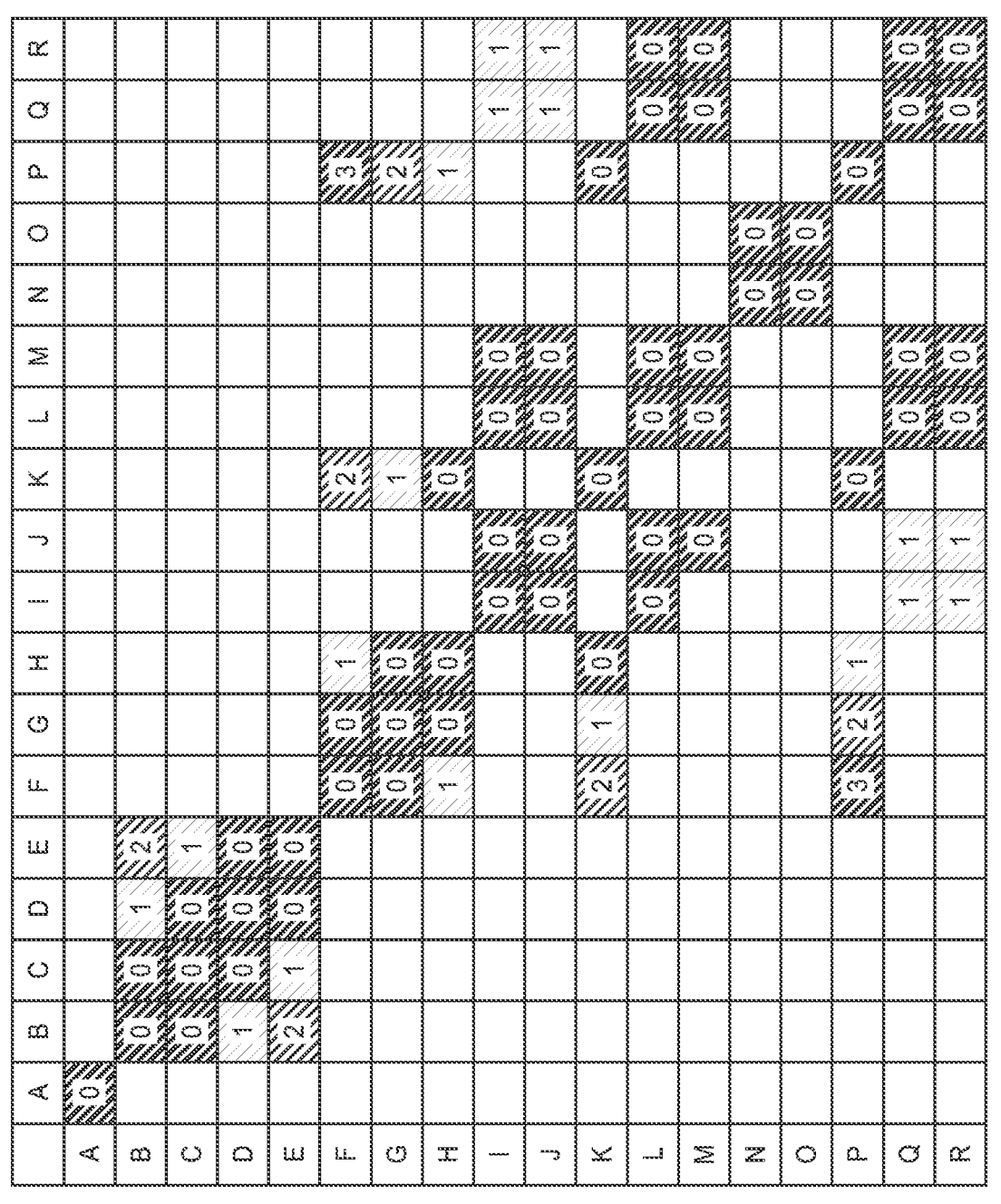

By normalizing and/or otherwise operating on the intensity data from the devices 14, a link table such as the one shown in FIG. 12 can be obtained (step 110). For example, the light detected from a neighboring lighting fixture 14A may first be divided by the light detected from a receiving lighting fixture 14A to calibrate the light measurements to the environment. Mutual light levels detected by neighboring lighting fixtures 14A may be averaged (e.g., the light level detected by a first lighting fixture 14A from a second lighting fixture 14A may be averaged with the light level detected by the second lighting fixture 14A by the first lighting fixture 14A) to calibrate for differences in device 14 spacing and mounting heights. The light detected from a neighboring lighting fixture 14A may then be divided by the light detected from the nearest neighboring lighting fixture 14A (e.g., the light detected by neighboring lighting fixtures 14A may be divided by the strongest detected light signal) in order to group together devices 14 with strong connections. The relative light intensity detected by each device 14 may then be examined to determine a threshold for grouping, and the results shared with every device 14 in the distributed lighting network 10 or a subset thereof (step 112).

The above may be a distributed process performed at least in part by each device 14, may be determined by a single device 14 and provided to all other devices 14, or may be determined by a remote device 16 and provided to all other devices. The link table indicates the adjacency of devices in the network, such that the number indicates the number of devices 14 between any two devices 14 in the network. In some embodiments, each device 14 stores only the links that it shares with other devices 14. In other embodiments, each device 14 stores the entire link table for the network. Devices 14 that are linked are grouped, such as device A with itself, devices B-E with one another, devices F, G, H, K, and P with one another, devices I, J, L, M, Q, and R with one another, and devices N and O with one another. In this way, grouping between the devices 14 can be accomplished automatically.

In addition to the automatic grouping discussed above, any device 14 that is seen by any other device 14 in the automatic grouping process is added to a lighting network 12. As discussed above, a lighting network 12 may define a first level of communication among devices, while a group may define a second and more intensive level of communication among devices. Further, a distributed network such as the distributed lighting network 10 may define a third, less intensive level of communication among devices 14 therein. Adding only those devices 14 to the lighting network 12 that are in optical communication with one another may provide several benefits as discussed above. For example, doing so may prevent the over-inclusion of devices 14 into the lighting network 12 and thus prevent over-congestion. Generally, optical communication is a good analogue for devices 14 in a lighting network 12 that will want or need to communicate. Accordingly, forming a lighting network 12 in this manner may be highly advantageous. In some cases, certain devices 14 that should be included in a network may be optically isolated from other devices 14 (e.g., may be located behind a closed door). Such devices 14 may be added to the network manually as they are identified, for example, by a commissioning tool or a remote device 16. Alternatively, the automatic grouping process described above may be periodically and/or persistently performed, such that when the isolated device 14 is able to optically communicate with another device 14 in the network (e.g., when a door is opened), the isolated device 14 is automatically added to the network. Periodically and/or persistently performing the automatic grouping process may further increase the accuracy of automatic network and group formation over time, thereby reducing the effort required to setup the distributed lighting network 10.

Periodically and/or persistently performing the automatic grouping process may be used to provide additional functionality as well. For example, information such as heartbeat signals, certain messages, and the like may be broadcast via light modulation that is undetectable by the human eye, which may reduce the number of messages sent over other network means and thereby reduce network congestion. In some embodiments, light emitting devices in the network may communicate solely via modulated light or may facilitate communication among any number of devices using modulated light. Further, the automatic grouping process may be used to detect entrances and exits within a space by examining discontinuities in detection between devices 14. In short, if a device 14 detects the modulated light signal from another device 14 in a discontinuous manner, this may indicate that a moveable obstacle such as a door is between these devices 14, and thus may indicate that an entrance and/or exit is located between the devices. Determining which devices 14 are near entrances and/or exits may be useful in some situations, as discussed in detail below.

Figure 13:
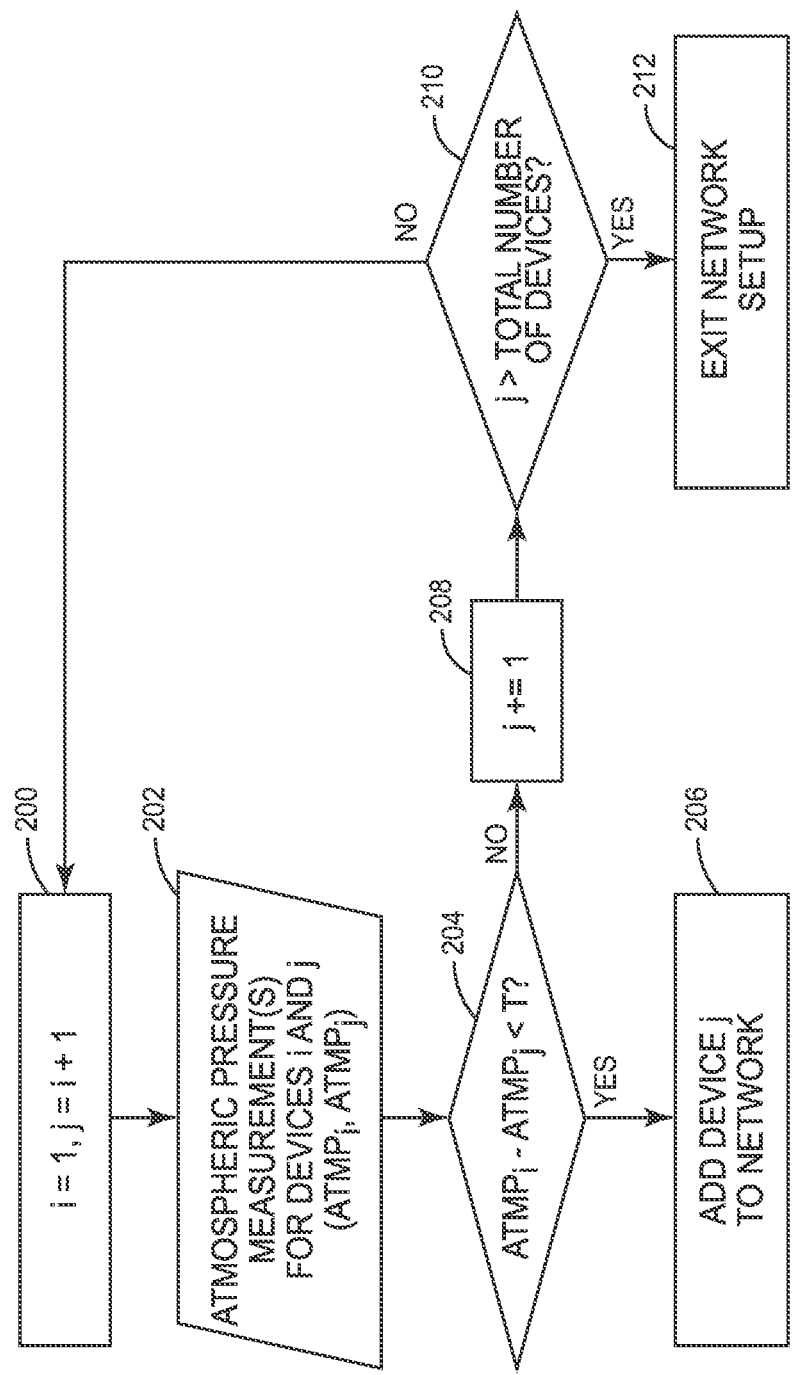
FIG. 13 is a flow diagram illustrating a process for adding devices to a distributed lighting network according to one embodiment of the present disclosure.

As discussed above, any one of the lighting fixtures 14A, sensor modules 14B, controllers 14C, and border routers 14D may include the necessary hardware to detect modulated light (e.g., via an ambient light sensor, image sensor, or the like). Accordingly, any one of these devices 14 may be added to a lighting network 12 substantially automatically, which significantly simplifies the setup of the lighting network 12. In some situations, supplemental information from other sensors in the devices 12 may be used to assist in the network formation and grouping process discussed above. For example, atmospheric pressure sensor measurements may be analyzed to determine which devices should join a particular network. As discussed above, a floor of a building is generally a good way to define the boundaries of a lighting network. In some scenarios, however, the automatic grouping process discussed above may fail to include every device in the network, or may include devices in a lighting network 12 that are not desired. This may be the case, for example, in an open atrium in which devices 14 on different floors may see the light provided by one another, or when a device 14 is optically isolated as discussed above. Accordingly, FIG. 13 is a flow diagram illustrating a method for including devices in a network with one another according to one embodiment of the present disclosure.

To begin, a first device counter (i) and a second device counter (j) are initialized (step 200). A number of atmospheric pressure measurements are then received from a first device 14 indicated by the first device counter and a second device 14 indicated by the second device counter (step 202). Next, a determination is made regarding whether or not a difference between the atmospheric pressure measurements for the first device 14 and the second device 14 are within a predetermined distance of one another (step 204). This may indicate, for example, that the devices 14 are located on the same floor in a building. In general, ceiling mounted devices 14 such as lighting fixtures 14A will have very similar atmospheric pressure measurements (atmospheric pressure sensors are generally capable of detecting a difference between a few vertical feet). Devices 14 that are less than a predetermined distance below these ceiling mounted devices (e.g., sensor modules 14B, controllers 14C and border routers 14D) are most likely also located on the same floor. Accordingly, if the atmospheric pressure measurements (or the average of atmospheric pressure measurements) of two different devices 14 are within the predetermined distance of one another, the devices 14 are added to the same network (step 206). If the atmospheric pressure measurements are not within the predetermined distance of one another, the second device counter is incremented (step 208) and a determination is made regarding whether the second device counter is greater than the total number of devices in the lighting network 12 (step 210). If the second device counter is greater than the number of devices 14 in the lighting network 12, the network setup process is exited (step 212). If the second device counter is not greater than the number of devices 14 in the lighting network, the process returns to step 200.

The process may be performed in response to a command to initiate network formation, as discussed above, which may be provided in any number of different ways. In response, the devices 14 may measure an atmospheric pressure and share this information among each other or with the remote device 16. The process above may then be performed at any level of granularity to determine which devices 14 should be included in a particular network. Using the above process may significantly simplify the setup of a network when used alone. Further, the above process may be used in conjunction with the automatic grouping process described above to increase the accuracy thereof. For example, when used in conjunction with the automatic grouping process, the above process may allow devices 14 that are optically isolated from other devices (e.g., in a closet) to join the network. In addition to atmospheric pressure, any other sensor measurements may be combined with the lightcasting data obtained above in order to further increase the accuracy of the automatic grouping process. For example, radio frequency ranging between devices 14 (e.g., time of flight ranging, phase difference ranging, or any other known RF ranging techniques) may be performed and used to verify or increase the accuracy of the automatic grouping process.

Figure 14:
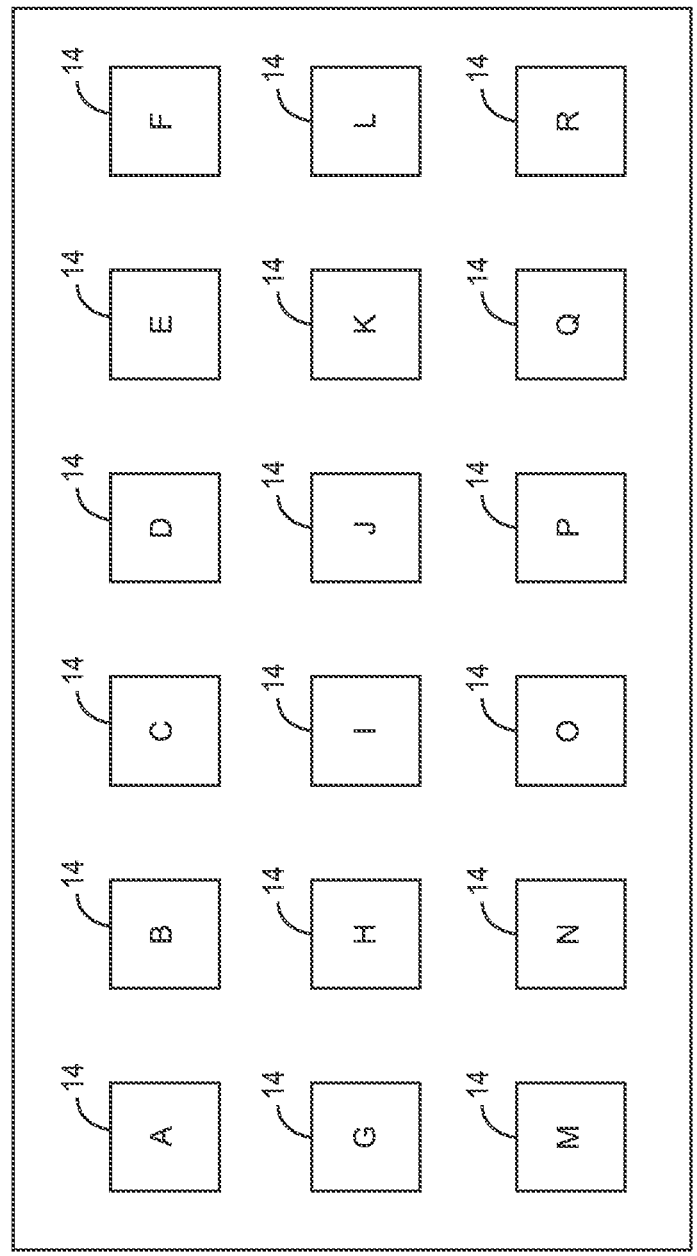
FIG. 14 is a diagram illustrating a distributed lighting system according to one embodiment of the present disclosure.

The initial groups established by the automatic grouping process discussed above may be further improved such that devices 14 in a network are more logically grouped in some situations. FIG. 14 shows an example of such a scenario. In particular, FIG. 14 shows the same devices 14 as in FIG. 9, but wherein the devices 14 are located in an open space with minimal separation. For example, the devices 14 may be located in a warehouse. Accordingly, grouping the devices 14 together via the automatic grouping process may result in placing all of the devices 14 into a single group, since there are no optical barriers to separate the devices 14. Since a warehouse or other open space may be quite large, and since only small portions of the space may be used at the same time, such a grouping may be inefficient. For example, if all of the devices 14 are grouped together in FIG. 14, when one of the devices 14 detects an occupancy event, all of the lighting fixtures located in the space may turn on. If only a small portion of the space is being used at this time, the space is then over-lit, thereby wasting energy.

Figure 15:
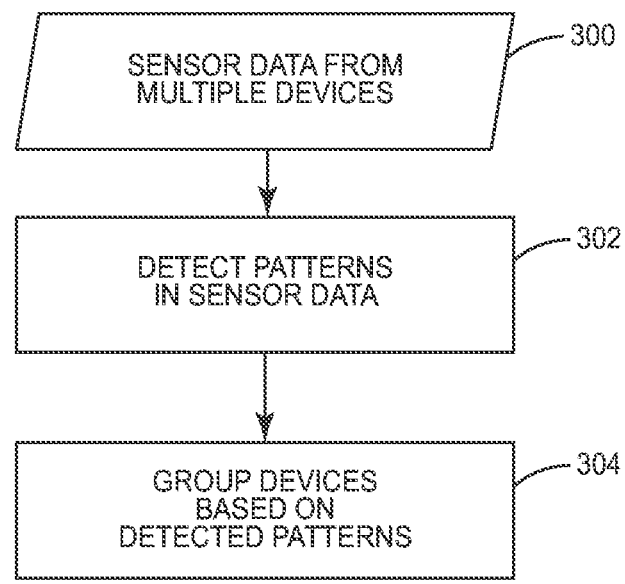
FIG. 15 is a flow diagram illustrating a process for grouping devices in a distributed lighting network according to one embodiment of the present disclosure.

FIG. 15 is a flow diagram illustrating a method for dynamically grouping devices 14 in a lighting network 12 over time by analyzing sensor data from one or more devices 14 in the distributed lighting network 10. First, sensor data is received from multiple devices 14 in a group or lighting network 12 (step 300). One or more desired patterns are then detected in the sensor data (step 302). Examples of such patterns include occupancy events that are closely tied in time, occupancy events that occur sequentially across a number of devices 14, sounds detected by a number of different devices 14, changes in atmospheric pressure detected by a number of different devices 14, changes in temperature detected by a number of different devices 14, changes in ambient light levels detected by a number of different devices 14, or some combination thereof. Virtually any sensor data may be used to logically group devices. One or more devices 14 are then grouped together based on the detected patterns in the sensor data (step 304).

Grouping devices in this manner allows devices 14 to dynamically form logical groups based on the occupancy patterns within a space. The foregoing process may be carried out by a single device 14, distributed among a number of devices 14, or performed by a remote device 16. Using data obtained from the sensors of the various devices 14 to form groups may become even more accurate when done in a centralized manner by a remote device 16, as such a remote device 16 may have access to more historical data and processing power than a single device 14 alone. For example, performing dynamic grouping in a centralized manner may allow for the application of machine learning algorithms, may provide access to neural networks, or may otherwise provide additional resources that are not available at the device level. In general, analyzing sensor measurements between devices 14 over time may be used to dynamically group the devices 14, which may provide functional and logical groups of devices 14 without user input. However, in some situations users may not wish to automatically implement such grouping. In these situations, a suggestion to group a number of devices 14 may be provided instead of automatically grouping the devices 14. Only if a user provides confirmation will such a group be formed. Since the distributed lighting network 10 allows for communication with remote devices 16, suggested groupings of devices may be provided to a user, for example, via a computer, a smart phone, or the like.

One notable pattern that often indicates that devices 14 should be grouped together is based on a correlation in the running average of a sensor measurement or sensor measurements of neighboring devices 14, as shown in Equation (1):

$$|RAS_{D1}-RAS_{D2}|>GR_{THSH}$$

where $RAS_{D1}$ is the running average of a sensor measurement for a first device 14, $RAS_{D2}$ is the running average of a sensor measurement for a second device 14, and $GR_{THSH}$ is a grouping threshold. A running average of a sensor measurement may be maintained by each device 14 according to well-known formulae. In some embodiments, however, a lightweight "running average" may be maintained to save processing power and memory storage in each device 14. A lightweight running average may be obtained according to Equation (2):

$$LRA=\alpha SM_{CURR}+\beta LRA_{PREV}$$

where LRA is the lightweight running average, $SM_{CURR}$ is a current sensor measurement, $LRA_{PREV}$ is a previously calculated lightweight running average, $\alpha$ is a first blending factor, and $\beta$ is a second blending factor. The blending factors may be predetermined by experimentation in some embodiments, or may be adaptive. Using the lightweight running average described above may save memory and processing resources when compared to computing a full running average. In situations where memory and processing power are limited, this may be highly advantageous.

By way of example, neighboring devices 14 (which may be determined by the link table discussed above with respect to FIG. 12) whose running average of detected occupancy events are relatively close to one another indicate that they are in an area that is often used together, and thus can be grouped. As discussed herein, an occupancy event occurs when a human enters or leaves a field of view of a sensor in a device 14. Detecting such events may be important, for example, so that a lighting fixture or group of lighting fixtures can adjust a light output level thereof as light is required or desired in a particular space. Further, occupancy events may provide useful information about how a particular space is currently or historically used, and thus may provide useful information for characterizing a space. Occupancy events are generally detected by a PIR sensor and/or image sensor, however, any suitable means for detecting an occupancy event may be used without departing from the principles of the present disclosure.

As another example, neighboring devices 14 whose running average of ambient light levels are similar may also be grouped. This may be especially useful in light emitting devices configured to use "daylight harvesting," such as current SmartCast™ lighting fixtures manufactured by Cree, Inc. of Durham, North Carolina Details of daylight harvesting are discussed in U.S. patent application Ser. No. 14/681,846, issued as U.S. Pat. No. 9,456,482, the disclosure of which is hereby incorporated by reference in its entirety. In short, daylight harvesting involves changing the amount of light provided by a lighting fixture 14A based on detected ambient light levels in the space such that a task surface is illuminated at substantially the same brightness throughout the day (even as the amount of light provided, for example, through a window, changes). In some cases, when different lighting fixtures 14A detect and act upon ambient light levels individually, differences in the light output of neighboring or nearby lighting fixtures 14A can be quite different, creating a visual disruption. Using the principles described above, devices 14 with similar ambient light levels could be grouped. These grouped devices 14 may be configured such that lighting fixtures 14A in the group provide the same light intensity, which may prevent uneven gradients of light between lighting fixtures 14A due to manufacturing tolerances, slight changes in the detected ambient light level between devices 14, and the like.

Regardless of how the distributed lighting network 10 is formed and devices 14 grouped, it may be desirable to secure the network such that only devices with verified security credentials can interact with the devices 14. In some situations, it may also be desirable for communications in the distributed lighting network 10 to conform to one or more networking protocols, such as the Thread home automation networking protocol. Details of the Thread home automation networking protocol can be found in "Thread Stack Fundamentals" published Jul. 13, 2015 (http://www.threadgroup.org), the contents of which are hereby incorporated by reference in their entirety. Using known networking protocols to communicate in the distributed lighting network 10 may increase compatibility with third party products such that the devices 14 may be easily integrated with preexisting or later obtained products. Prior approaches to security for lighting fixtures 14A and other connected devices 14 have generally been focused on adding a single device 14 to a network at a time, for example, based on a hard-coded product serial number, MAC address, or the like, which is manually provided by a user. Such an approach is generally not feasible in the distributed lighting network 10 due to the large number of lighting fixtures 14A and other devices 14 therein. That is, individually adding each device 14 to the distributed lighting network 10 would be an arduous and time consuming process.

In one embodiment, common security credentials are provided in each of the devices 14 in the distributed lighting network 10 during a factory calibration process. These common security credentials are then used to form a secure network between the devices 14 in an initial setup procedure, such as during network formation as described above. Once the distributed lighting network 10 is initially formed using the common security credentials, updated security credentials may be generated and provided to the devices 14 in the network such that the distributed lighting network 10 is secured by unique security credentials. Using common security credentials during initial formation of the distributed lighting network 10 bypasses the conventional individual device approach to adding devices to a secure network, thereby allowing the distributed lighting network 10 to be formed with minimal user intervention and hassle. Later updating of the security credentials then provides a highly secure distributed lighting network 10.

Figure 16:
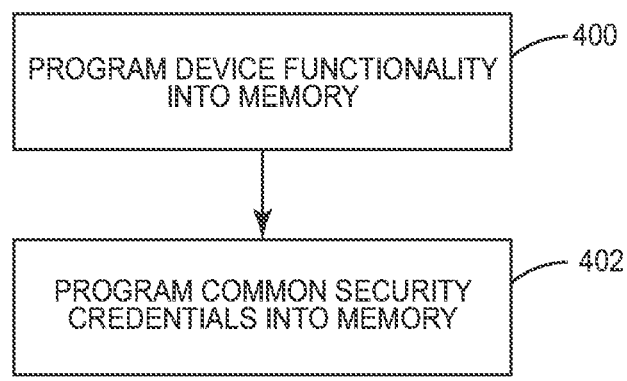
FIG. 16 is a flow diagram illustrating a process for factory calibration of the lighting fixture according to one embodiment of the present disclosure.

FIG. 16 is a flow diagram illustrating a factory calibration process for a lighting fixture 14A or other device 14 in the distributed lighting network 10 according to one embodiment of the present disclosure. First, the device functionality of the lighting fixture 14A or device 14 is programmed into the memory thereof (step 400). This may include instructions for a lighting fixture 14A to properly control the light output thereof based on sensor measurements and communications with other devices 14 in the distributed lighting network 10 as discussed above. Next, common security credentials are programmed into the memory of the lighting fixture 14A or other device 14 (step 402). Programming common security credentials into the memory of the lighting fixture 14A or other device 14 allows for the creation of a secure distributed lighting network 10 with little to no user intervention as discussed in detail below.

Figure 17:
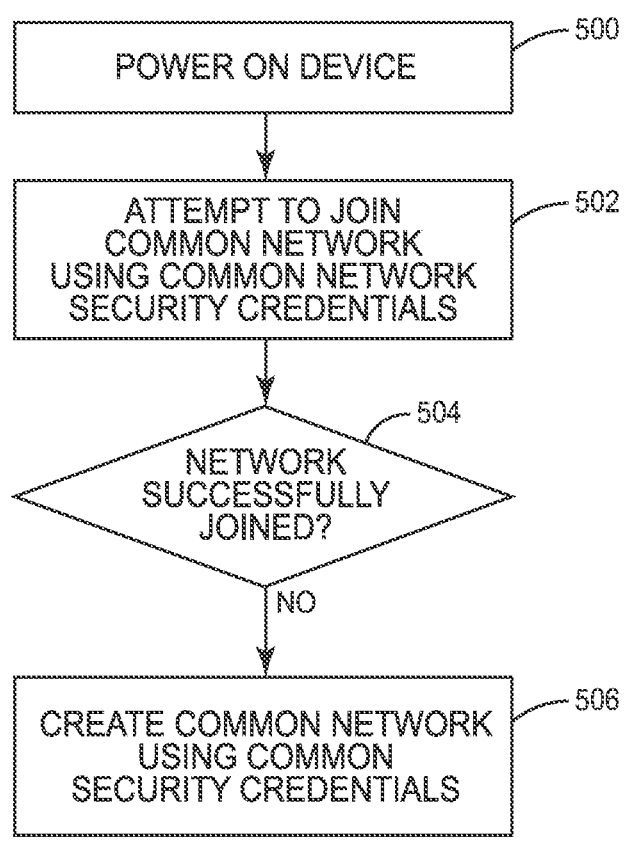
FIG. 17 is a flow diagram illustrating a process for operating a lighting fixture or other device to create a secure distributed lighting network according to one embodiment of the present disclosure.

FIG. 17 is a flow diagram illustrating a process for operating a lighting fixture 14A to create or join a secure distributed lighting network 10 according to one embodiment of the present disclosure. While the process is discussed below with respect to lighting fixtures 14A, any other device 14 in the distributed lighting network 10 may similarly perform the process to create or join a secured distributed lighting network 10. First, the lighting fixture 14A is powered on (step 500). The lighting fixture 14A then attempts to join a common network using common network security credentials that are pre-installed during a factory calibration process (step 502). This may include attempting to join the common network on each one of a number of different channels by sending a request join message or the like and waiting for a response. Using the common security credentials in attempting to join the common network may include providing a key to another device 14 that is based on the common security credentials. For example, using the common security credentials to join the common network may include using the common security credentials in a transport layer security (TLS), datagram transport layer security (DTLS), and/or secure sockets layer (SSL) authentication process. In one embodiment, the common security credentials are used as a network-wide key in a Thread network, as detailed in "Thread commissioning" published Jul. 13, 2015, the contents of which are hereby incorporated by reference in their entirety. The lighting fixture 14A may thus use the common security credentials accordingly when attempting to join the common network.

A determination is then made whether the common network was successfully joined (step 504). If the common network was successfully joined, the process may end. If the common network was not successfully joined, the lighting fixture 14A may wait a predetermined amount of time before creating the common network using the common security credentials (step 506). Creating the common network may include designating oneself as the network "leader", listening for network join requests from other devices 14, and facilitating their addition to the network. For example, creating the common network may include receiving a join request from another device 14, verifying the common security credentials from the device 14, assigning an address to the device 14, and providing the address back to the device 14 or otherwise indicating a successful network join. Verifying the common security credentials of other devices 14 attempting to join the common network may include analyzing a key from a device 14 to ensure that it can be traced back to the common security credentials. For example, the lighting fixture 14A may use the common security credentials in a transport layer security (TLS), datagram transport layer security (DTLS), and/or secure sockets layer (SSL) authentication process. In one embodiment, the common security credentials are used as a network-wide key in a Thread network as discussed above and verified by the lighting fixture 14A accordingly.

Notably, the foregoing process may be performed alongside the network formation and grouping processes discussed above. In one embodiment, the lighting fixture 14A that creates the common network only allows other devices 14 that were identified via the lightcasting/lightcatching process discussed above to join the common network, or only allows other devices 14 with similar atmospheric pressure readings to join the common network. This may prevent the undesirable expansion of the network in order to maintain the security thereof. Further, this may occur at the same time as the lightcasting/lightcatching process such that network join requests are provided during lightcasting of a particular lighting fixture 14A and approved upon lightcatching from the originating lighting fixture 14A or a lighting fixture 14A that is connected through one or more neighbors to the originating lighting fixture 14A.

Figure 18:
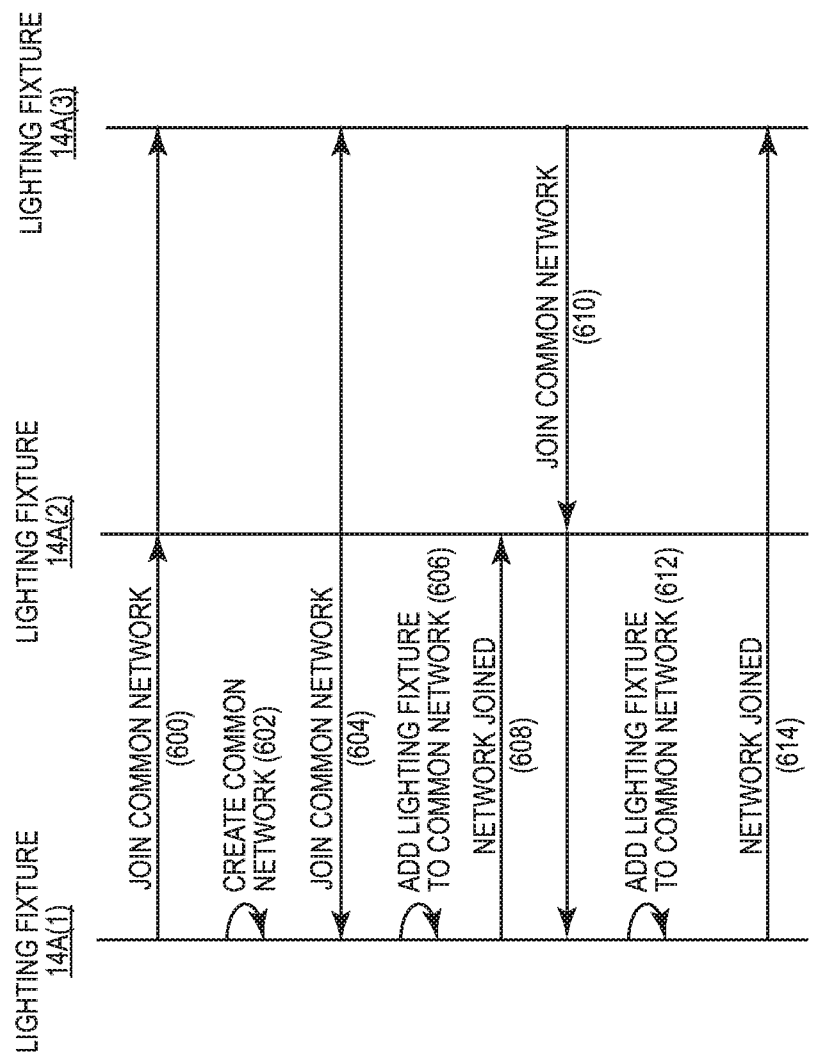
FIG. 18 is a call flow diagram illustrating a process for creating a secure distributed lighting network according to one embodiment of the present disclosure.

FIG. 18 is a call flow diagram illustrating the process described above in FIG. 17. While the process is discussed below with respect to lighting fixtures 14A, any other device 14 in the distributed lighting network 10 may similarly perform the process to create or join a secured distributed lighting network 10. To start, a first lighting fixture 14A(1) sends a network join request, for example, via a local broadcast to one or more other lighting fixtures 14A (step 600). In the present example, a second lighting fixture 14A(2) and a third lighting fixture 14A(3) receive the network join request, but since they have not established a common network, they do not respond. Accordingly, the first lighting fixture 14A(1) creates the common network (step 602). As discussed above, creating the common network may include listening for network join requests from other devices 14, and facilitating their addition to the network. For example, creating the common network may include designating oneself as the network "leader", receiving a join request from another device 14, verifying the common security credentials from the device 14, assigning an address to the device 14, and providing the address back to the device 14 or otherwise indicating a successful network join.

The second lighting fixture 14A(2) then sends a network join request, which is received by the first lighting fixture 14A(1) (step 604). The network join request may similarly be received by the third lighting fixture 14A(3), but since the third lighting fixture 14A(3) did not create the network (i.e., is not the network leader), the third lighting fixture 14A(3) will not respond to the message. The first lighting fixture 14A(1) adds the second lighting fixture 14A(2) to the common network (step 606), for example, by verifying the common security credentials of the second lighting fixture 14A(2) and assigning an address thereto. The first lighting fixture 14A(1) then sends an acknowledgement message back to the second lighting fixture 14A(2) to indicate that the network was successfully joined (step 608).

The third lighting fixture 14A(3) then sends a network join request, which is received by the first lighting fixture 14A(1) (step 610). The network join request may similarly be received by the second lighting fixture 14A(2), but since the second lighting fixture 14A(2) did not create the network (i.e., is not the network leader), the second lighting fixture 14A(2) will not respond to the message. The first lighting fixture 14A(1) adds the third lighting fixture 14A(3) to the common network (step 612) as discussed above. The first lighting fixture 14A(1) then sends an acknowledgement message back to the third lighting fixture 14A(3) to indicate that the network was successfully joined (step 614). Additional devices 14 may be added to the common network in a similar manner.

In some embodiments, the common network may be a Thread network such that messaging in the network conforms to the Thread home automation networking protocol discussed above. Generally, devices are added to a Thread network on an individual basis, requiring manual intervention from a user. Using the process discussed above, multiple lighting fixtures 14A and other devices 14 may be added to a Thread network due to the shared common security credentials that are pre-installed thereon. Such an approach significantly simplifies the setup of a secure network.

Figure 19:
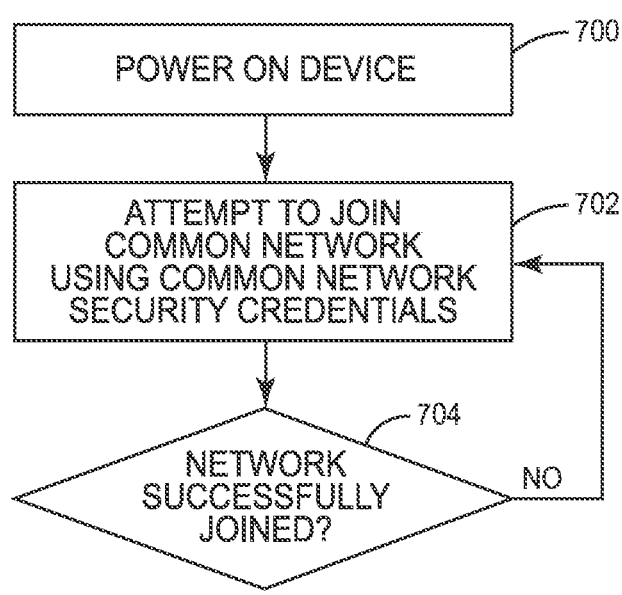
FIG. 19 is a flow diagram illustrating a process for operating a lighting fixture or other device to create a secure distributed lighting network according to one embodiment of the present disclosure.

In the process described above in FIG. 17, if a lighting fixture 14A was unsuccessful in joining a common network, it created the common network. However, this may not always be the case. In some embodiments, the common network may be created by another device 14, such as a commissioning tool. Accordingly, FIG. 19 is a flow diagram illustrating a process for operating a lighting fixture 14A to join a secure distributed lighting network 10 according to one embodiment of the present disclosure. As discussed above, the lighting fixture 14A is first powered on (step 700). The lighting fixture 14A then attempts to join the common network using the common network security credentials as discussed above (step 702). A determination is then made whether the lighting fixture 14A successfully joined the common network (step 704). If the common network was successfully joined, the process ends. However, if the common network was not successfully joined, the process returns to step 702 to attempt to join the common network again. The lighting fixture 14A may continue to try and join the common network until it is successful, rather than creating the common network itself, since the common network is created by another device in such an embodiment.

Figure 20:
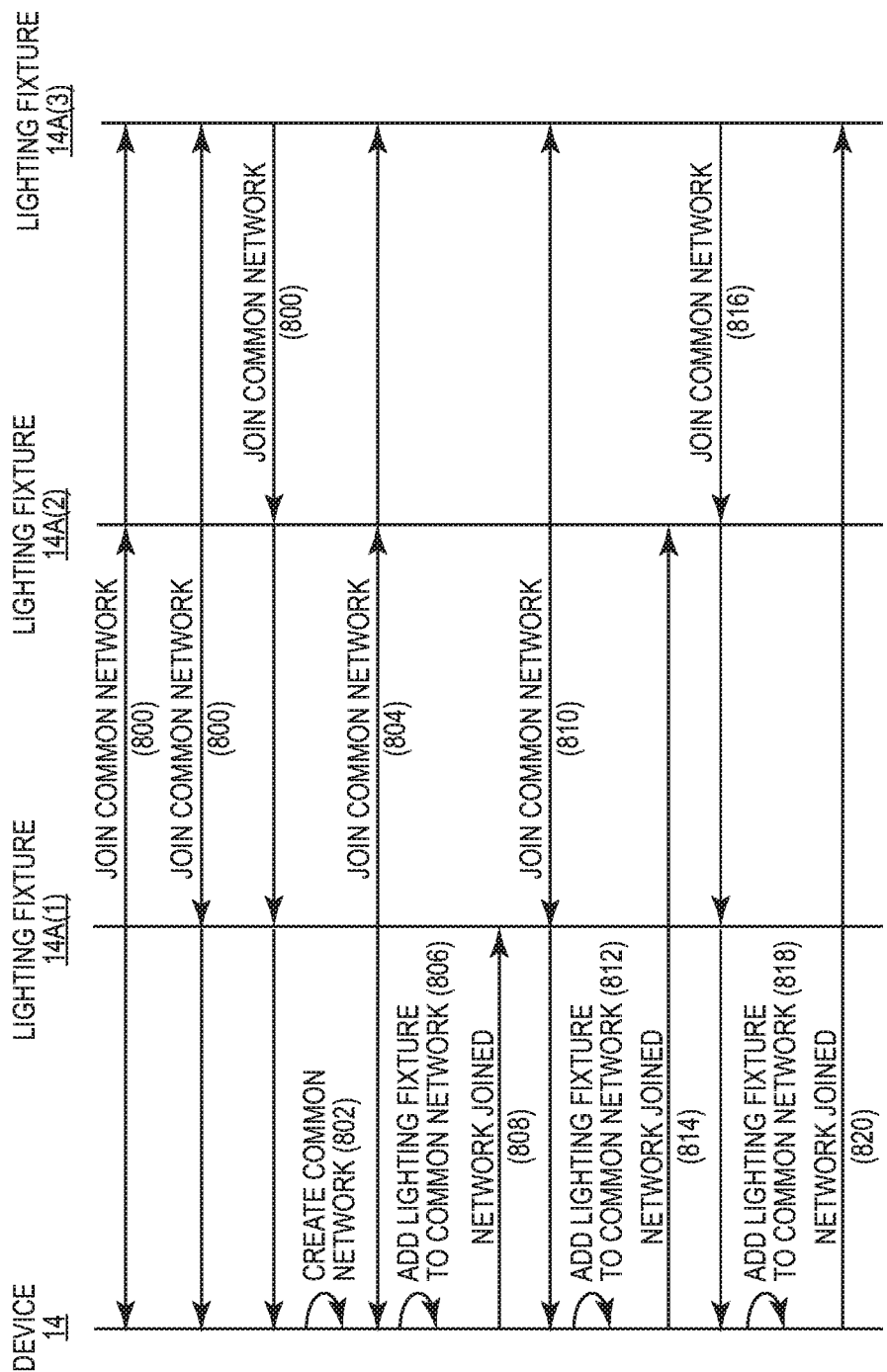
FIG. 20 is a call flow diagram illustrating a process for creating a secure distributed lighting network according to one embodiment of the present disclosure.

FIG. 20 is a call flow diagram illustrating details of the process described above in FIG. 19. First, each one of a first lighting fixture 14A(1), a second lighting fixture 14A(2), and a third lighting fixture 14A(3) each send a network join message via local broadcast (step 800). While the messages are received at each other device 14, a common network has not yet been created and thus there are no responses. At some point in time, a device 14 creates the common network (802). As discussed above, the device 14 may be a commissioning tool operated by a user, or may be any other device suitable for creating the common network. As discussed above, creating the common network may include listening for network join requests from other devices 14, and facilitating their addition to the network. For example, creating the common network may include designating oneself as the network "leader", receiving a join request from another device 14, verifying the common security credentials from the device 14, assigning an address to the device 14, and providing the address back to the device 14 or otherwise indicating a successful network join.

A network join request is then provided again from the first lighting fixture 14A(1) (since the first lighting fixture 14A(1) is configured to continue to try to join the common network as discussed above) and received at the device 14 (step 804). While the second lighting fixture 14A(2) and the third lighting fixture 14A(3) may similarly receive the network join request, these devices are not network leaders and thus do not respond thereto. The device 14 adds the first lighting fixture 14A to the common network (step 806), for example, by verifying the common security credentials of the first lighting fixture 14A(1) and assigning an address thereto. The device 14 then sends an acknowledgement message back to the first lighting fixture 14A(1) to indicate that the network was successfully joined (step 808).

A network request is provided again from the second lighting fixture 14A(2) and received at the device 14 (step 810). While the first lighting fixture 14A(1) and the third lighting fixture 14A(3) may similarly receive the network join request, these devices are not network leaders and thus do not respond thereto. The device 14 adds the second lighting fixture 14A(2) to the common network (step 812), for example, by verifying the common security credentials of the second lighting fixture 14A(2) and assigning an address thereto. The device 14 then sends an acknowledgement message back to the second lighting fixture 14A(2) to indicate that the network was successfully joined (step 814).

A network request is provided again from the third lighting fixture 14A(3) and received at the device 14 (step 816). While the first lighting fixture 14A(1) and the second lighting fixture 14A(2) may similarly receive the network join request, these devices are not network leaders and thus do not respond thereto. The device 14 adds the third lighting fixture 14A(3) to the common network (step 818), for example, by verifying the common security credentials of the third lighting fixture 14A(3) and assigning an address thereto. The device 14 then sends an acknowledgement message back to the third lighting fixture 14A(3) indicating that the network was successfully joined (step 820).

Figure 21:
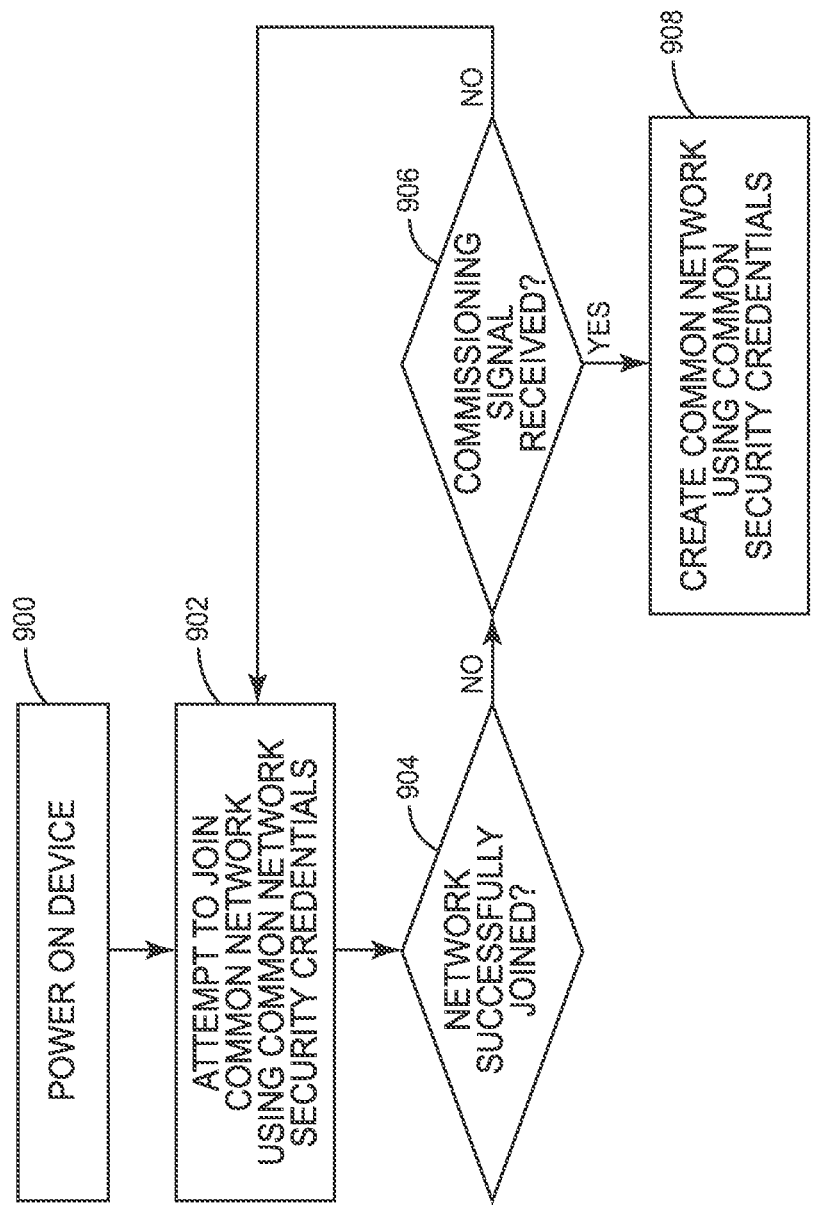
FIG. 21 is a flow diagram illustrating a process for operating a lighting fixture or other device to create a secure distributed lighting network according to one embodiment of the present disclosure.

In some embodiments, a lighting fixture 14A may start the common network, but may require initiation to do so, for example, by another device 14 such as a commissioning tool. Accordingly, FIG. 21 is a flow diagram illustrating a process for operating a lighting fixture 14A to create or join a secure distributed lighting network 10 according to one embodiment of the present disclosure. As discussed above, the lighting fixture 14A is first powered on (step 900). The lighting fixture 14A then attempts to join the common network using the common security credentials as discussed above (step 902). A determination is then made whether the lighting fixture 14A successfully joined the common network (step 904). If the common network was successfully joined, the process ends. However, if the common network was not successfully joined, it is determined if a commissioning signal was received (step 906). The commissioning signal may indicate that the lighting fixture 14A should create the common network, and may be provided by another device 14 such as a commissioning tool operated by a user. In one embodiment, the commissioning signal is provided as an optical signal to an ambient light sensor or image sensor in the lighting fixture 14A, however, the commissioning signal may be provided by any suitable means without departing from the principles described herein.

If the commissioning signal was received, the lighting fixture 14A creates the common network (step 908). As discussed above, creating the common network may include listening for network join requests from other devices 14, and facilitating their addition to the network. For example, creating the common network may include designating oneself as the network "leader", receiving a join request from another device 14, verifying the common security credentials from the device 14, assigning an address to the device 14, and providing the address back to the device 14 or otherwise indicating a successful network join.

Figure 22:
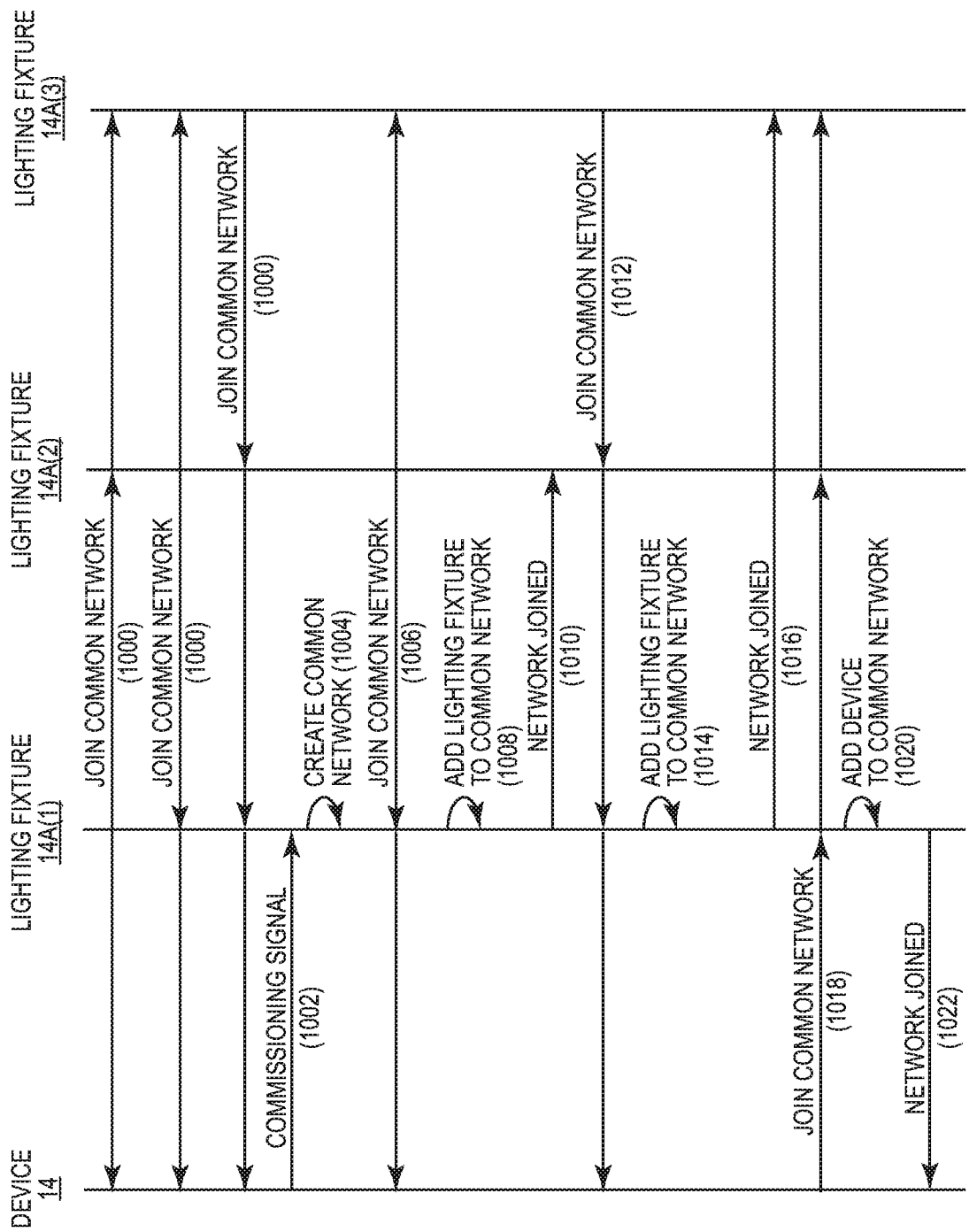
FIG. 22 is a call flow diagram illustrating a process for creating a secure distributed lighting network according to one embodiment of the present disclosure.

FIG. 22 is a call flow diagram illustrating details of the process described in FIG. 21. First, each one of a first lighting fixture 14A(1), a second lighting fixture 14A(2), and a third lighting fixture 14A(3) each send a network join message via local broadcast (step 1000). While the messages are received at each other device 14, a common network has not yet been created and thus there are no responses. At some point in time, a commissioning signal is provided from a device 14 (e.g., a commissioning tool) to the first lighting fixture 14A(1) (step 1002). As discussed above, the commissioning signal may be provided as an optical signal and received via an ambient light sensor or image sensor on the first lighting fixture 14A(1), or by any other suitable means. In response to the commissioning signal, the first lighting fixture 14A(1) creates the common network (step 1004). As discussed above, creating the common network may include listening for network join requests from other devices 14, and facilitating their addition to the network. For example, creating the common network may include designating oneself as the network "leader", receiving a join request from another device 14, verifying the common security credentials from the device 14, assigning an address to the device 14, and providing the address back to the device 14 or otherwise indicating a successful network join.

The second lighting fixture 14A(2) then sends a network join request, which is received by the first lighting fixture 14A(1) (step 1006). While the network join request may similarly be received by the third lighting fixture 14A(3) and the device 14, these devices are not network leaders and thus do not respond thereto. The first lighting fixture 14A(1) adds the second lighting fixture 14A(2) to the common network (step 1008), for example, by verifying the common security credentials of the second lighting fixture 14A(2) and assigning an address thereto. The first lighting fixture 14A(1) then sends an acknowledgement message back to the second lighting fixture 14A(2) to indicate that the network was successfully joined (step 1010).

The third lighting fixture 14A(3) then sends a network join request, which is received by the first lighting fixture 14A(1) (step 1012). While the network join request may similarly be received by the second lighting fixture 14A(2) and the device 14, these devices are not network leaders and thus do not respond thereto. The first lighting fixture 14A(1) adds the third lighting fixture 14A(3) to the common network (step 1014) as discussed above. The first lighting fixture 14A(1) then sends an acknowledgement message back to the third lighting fixture 14A(3) to indicate that the network was successfully joined (step 1016).

The device 14 then sends a network join request, which is received by the first lighting fixture (step 1018). While the network join request may similarly be received by the second lighting fixture 14A(2) and the third lighting fixture 14A(3), these devices are not network leaders and thus do not respond thereto. The first lighting fixture 14A(1) adds the device 14 to the common network (step 1020) as discussed above. The first lighting fixture 14A(1) then sends an acknowledgement back to the device 14 to indicate that the network was successfully joined (step 1022).

Figure 23:
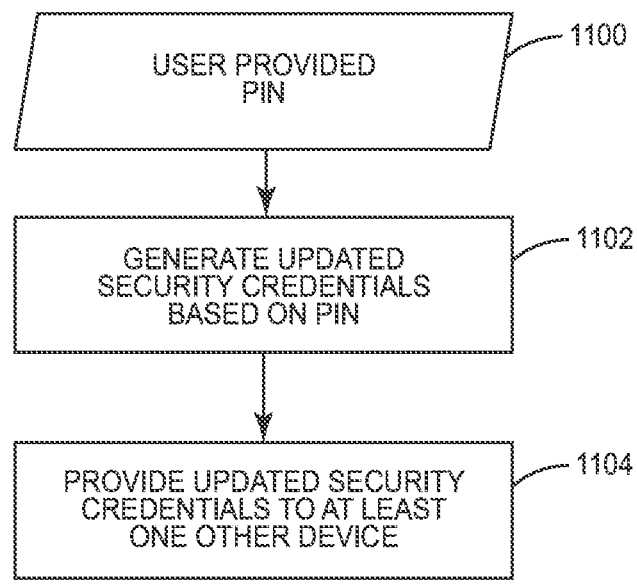
FIG. 23 is a flow diagram illustrating a process operating a lighting fixture or other device for updating security credentials in a distributed lighting network according to one embodiment of the present disclosure.

After the common network has been established using any of the processes described above, or any other suitable processes that leverage the common security credentials for initial formation of the network, it is desirable to update the security credentials for the devices 14 in the network such that they are unique. Accordingly, FIG. 23 is a flow diagram illustrating a process for updating the security credentials for the devices 14 in a secured distributed lighting network 10 according to one embodiment of the present disclosure. The following process may be performed by any lighting fixture 14 or device 14 in the secure distributed lighting network 10. In one embodiment, the process is performed by a commissioning tool or mobile device that allows for user input. First, a user provided PIN is received (step 1100). The user provided PIN may include n characters, and may be numeric or alphanumeric. Based on the user provided PIN, updated security credentials are generated (step 1102). Generating the updated security credentials from the user provided PIN may include hashing or otherwise operating on the user provided PIN in some embodiments. Finally, the updated security credentials are provided to at least one other device 14 in the secure distributed lighting network 10 (step 1104). The device receiving the updated security credentials may then forward the updated security credentials to one or more other devices 14 in order to propagate them across the secure distributed lighting network 10. Once the updated security credentials are received at a device 14, that device 14 may then communicate using the updated security credentials. As the updated security credentials are provided to every device 14 in the secured distributed lighting network 10, the common security credentials are no longer used.

If a new device 14 including the common security credentials is provided, the updated security credentials must be provided to the device 14 before it can join the secure distributed lighting network 10. Such a process may be facilitated by a device 14 such as a commissioning tool, which may be placed in a mode to communicate using both the common security credentials and the updated security credentials in order to provide the updated security credentials to the new device 14.

Figure 24:
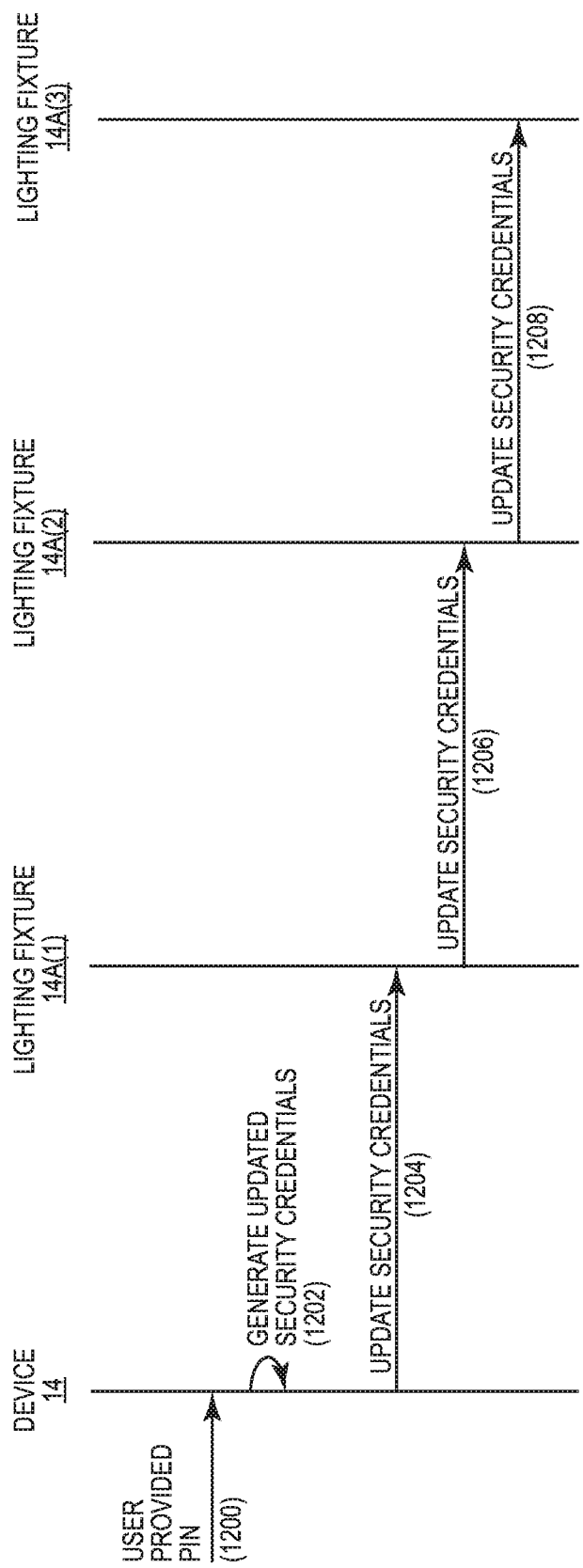
FIG. 24 is a call flow diagram illustrating a process for updating security credentials in a distributed lighting network according to one embodiment of the present disclosure.

FIG. 24 is a call flow diagram illustrating details of the process discussed above in FIG. 23. First, a PIN is provided to a device 14 (step 1200). Updated security credentials are then generated by the device 14 based on the PIN as discussed above (step 1202). The updated security credentials are then provided to a first lighting fixture 14A(1) (step 1204), which forwards the updated security credentials to a second lighting fixture 14A(2) (step 1206), which in turn forwards the updated security credentials to a third lighting fixture 14A(3) (step 1208). In this way, the secure distributed lighting network 10 may be provided with unique security credentials.

Figure 25A:
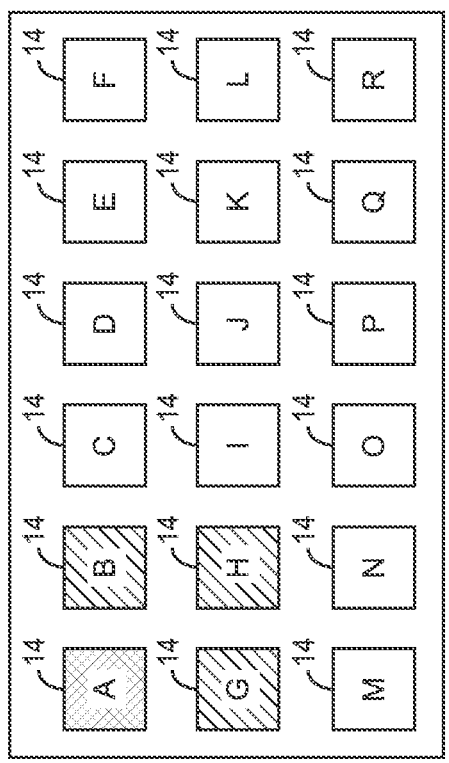
FIGS. 25A through 25C are diagrams illustrating a distributed lighting network according to various embodiment of the present disclosure.
Figure 25B:
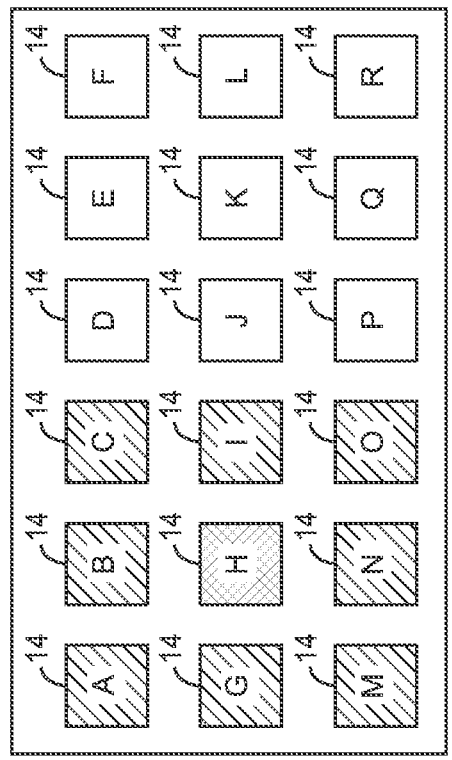
Figure 25C:
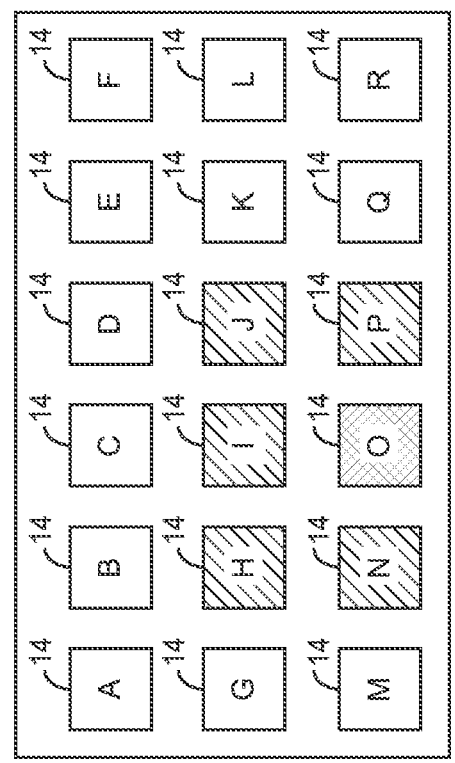

The link table information shown in FIG. 12 may be useful not only for network formation and grouping, but may be used to implement additional functionality in the distributed lighting network 10. One such feature is referred to herein as "fluid occupancy," the basic premise of which is illustrated in FIGS. 25A through 25C. As shown in FIGS. 25A through 25C, a single device 14 in a group of devices 14 may detect an occupancy event. The device 14 that detects the occupancy event is referred to as the "originating device" and is illustrated with a cross-hatch pattern. In response to the detection of the occupancy event, the originating device 14 will begin providing light if it is capable of doing so (e.g., if it is a lighting fixture 14A), or will simply notify other devices 14 in the group if it is not capable of doing so. Neighboring lighting fixtures 14A of the originating device 14 will similarly turn on, forming a "bubble" of light around the originating device 14. These neighboring illuminated lighting fixtures 14A are illustrated with a hatch pattern. The number of neighboring lighting fixtures 14A that turn on in response to the detection of an occupancy event by the originating device 14 may be adjusted. For example, only direct neighbors to the originating device 14 may turn on, neighbors separated from the originating device 14 by one other device 14 may turn on as well, or neighbors separated from the originating device 14 by up to n other devices 14 may turn on as well. The number of devices 14 located between two devices 14 may be readily determined using the link table discussed above with respect to FIG. 12. As shown in FIGS. 25A through 25C, as an occupancy event is detected by a different device 14 (e.g., as an individual moves closer to another device 14), that device 14 then becomes the originating device 14, and the neighboring lighting fixtures 14A turn on. The result is a "bubble" of light that is capable of following an individual as they move throughout a space. This light "bubble" may provide security by allowing an individual to see around them while simultaneously saving energy by preventing over-lighting a space. Notably, the light output of each lighting fixture 14A surrounding the originating device 14 may diminish in proportion to the distance of the lighting fixture 14A from the originating device 14. For example, lighting fixtures 14A that are directly adjacent to the originating device 14 may provide maximum light output, lighting fixtures 14A that are one device 14 removed from the originating device 14 may provide 50% light output, etc.

Figure 26:
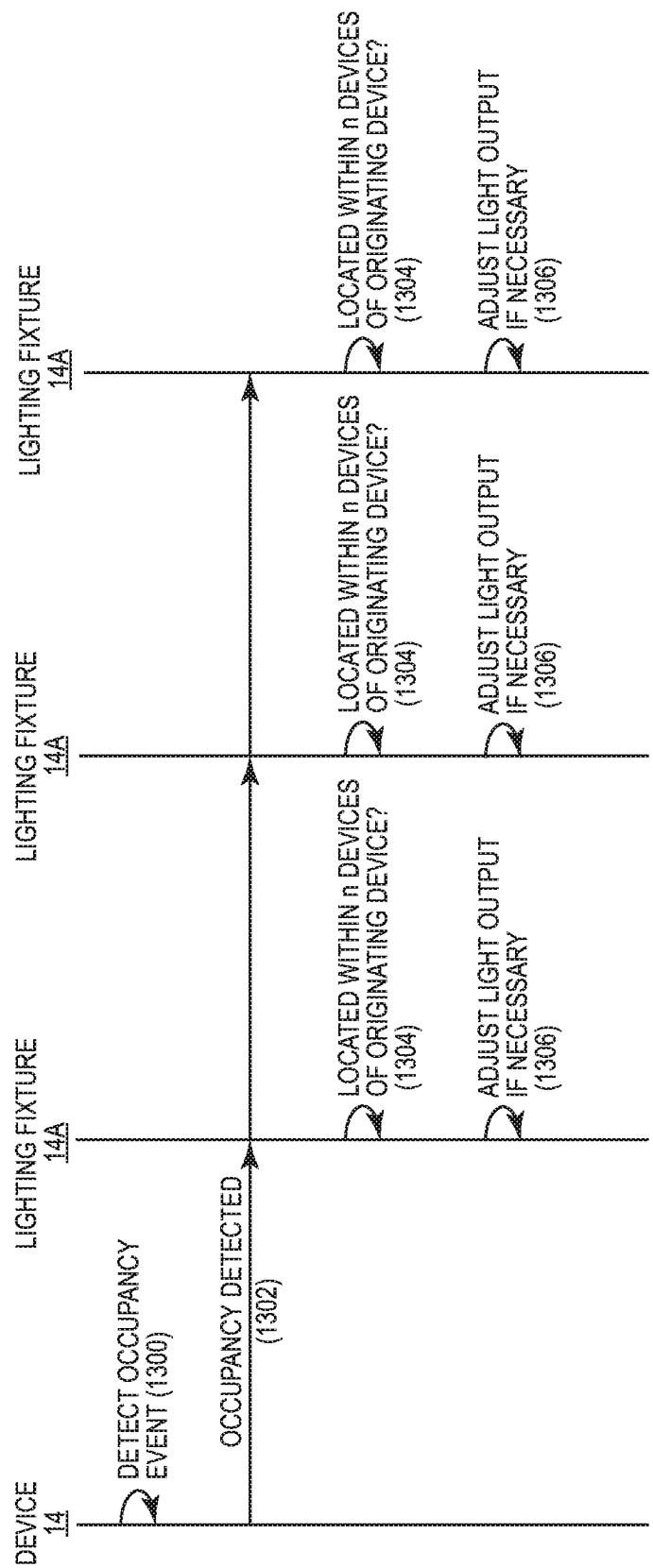
FIG. 26 is a call flow diagram illustrating a process for adjusting the light output of one or more lighting fixtures in a distributed lighting network according to one embodiment of the present disclosure.

FIG. 26 is a call flow diagram illustrating a process for implementing the fluid occupancy functionality discussed above. First, an originating device 14 detects an occupancy event (step 1300). The originating device 14 then indicates that an occupancy event has been detected to one or more lighting fixtures 14A in the group or lighting network 12 (step 1302). Each lighting fixture 14A that is notified of the occupancy event checks if it is within n devices 14 of the originating device 14 (step 1304), where n is the preferred threshold for surrounding illumination. This is determined, for example, by referencing the link table discussed above in FIG. 12. If necessary, each lighting fixture 14A then adjusts the light output thereof (step 1306). Each lighting fixture 14A may also initiate an occupancy timeout in response to the indicating of an occupancy event by the originating device 14. This occupancy timeout may be counted against a real-time clock. On expiration of the occupancy timeout, the lighting fixture 14A may reset the light output thereof to a previously stored setting, or may turn off altogether. Notably, the occupancy timeout in each lighting fixture 14A may execute independently. In some cases, different lighting fixtures 14A may receive notifications from multiple neighboring devices 14 that an occupancy event has occurred. In the case where a different light output level is used based on the distance of the lighting fixture 14A from the originating device, there may be a conflict regarding which light output level a lighting fixture 14A should provide. Generally, this may be resolved by using the highest light output level, the lowest light output level, an average of the highest light output level and the lowest light output level, or any other suitable value.

While the above example is primarily discussed in terms of occupancy events, any number of different sensor measurements may be used to initiate a similar process. For example, the detection of an object (e.g., via an image sensor) may cause a similar illumination pattern to that discussed above. For example, a similar "bubble" of light may follow cars around a parking garage, which may forego the need for illuminating the entire garage, thus saving significant amounts of energy.

The fluid occupancy process discussed above may be used primarily within groups of devices 14. However, in some embodiments, devices 14 outside of a group in which an occupancy event is detected may also be illuminated. For example, the lights in neighboring groups may participate in the fluid occupancy process as occupancy events are detected near a border of the group in which the occupancy event is detected and the neighboring group. For example, as an individual moves through a hallway, lighting fixtures 14A in the hallway may illuminate an area surrounding the individual, and lighting fixtures 14A in rooms located off the hallway may illuminate the rooms as the individual walks by. This may provide the individual a greater sense of security by allowing the individual to view the inside of the rooms. In some embodiments, the lighting fixtures 14A in neighboring groups may provide a lower light level than the lighting fixtures 14A in a group in which an occupancy event was detected.

In some embodiments, the devices 14 may attempt to predict the path of movement of an individual or object, and may adjust the output of one or more lighting fixtures 14A to illuminate this predicted path. As occupancy events are detected by devices 14 in a group, other devices 14 in the group may receive notifications of these occupancy events. A first occupancy event may occur n devices 14 away, a second occupancy event may occur n−1 devices away, and so on, until it may be predicted that a particular device 14 will be next to detect an occupancy event. Such prediction may become significantly easier when image sensors are involved, as motion vectors may be computed for objects using data from the image sensors. The predicted path may then be illuminated.

Figure 27A:
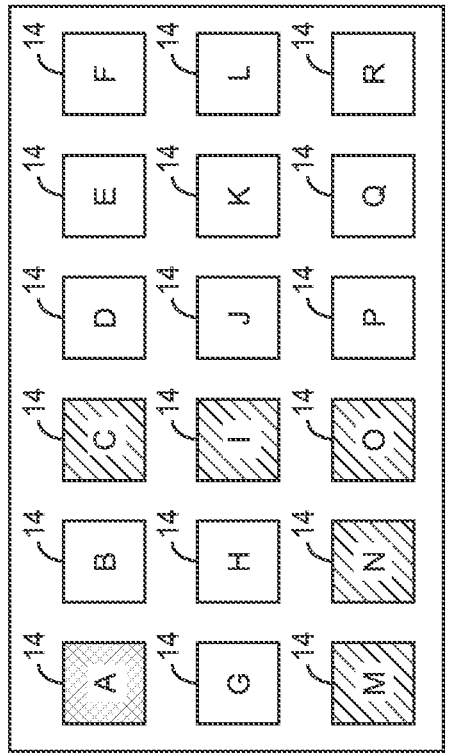
FIGS. 27A through 27D are diagrams illustrating a distributed lighting network according to various embodiments of the present disclosure.
Figure 27B:
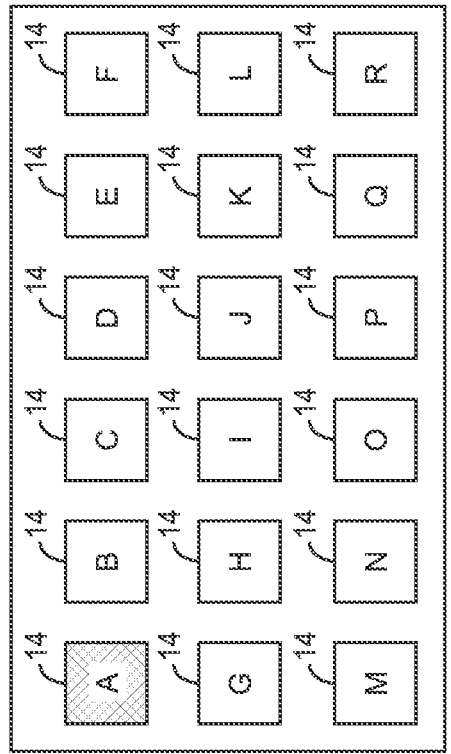
Figure 27C:
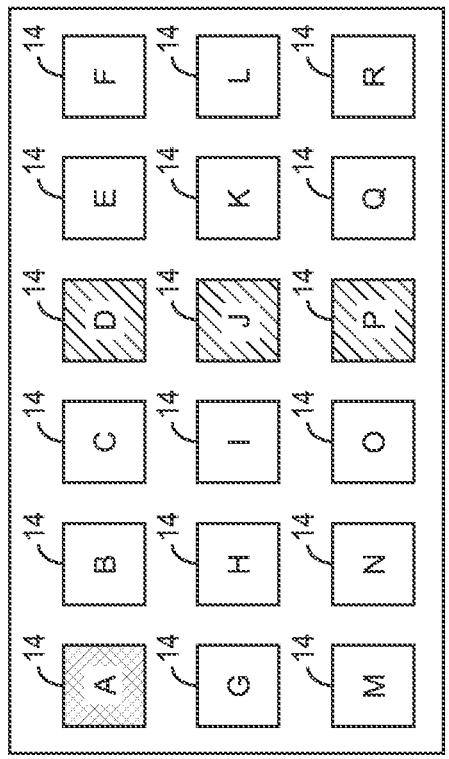
Figure 27D:
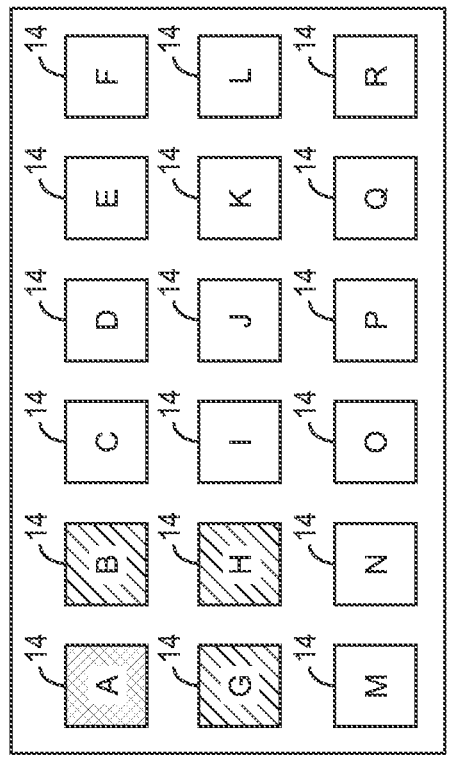

In addition to the above, the link table may be used to illuminate a desired path to a particular location within a space. Such a feature may be used, for example, to illuminate a path towards exits during an emergency. In such an embodiment, a device 14 at or near a desired point in the space, referred to as a "key" device 14, may be designated, and the neighboring lighting fixtures 14A of the key device 14 may sequentially turn on in sequence to their neighbor ranking to the key device 14. This results in a pattern of light that directs attention towards the designated feature, and thus may be used to guide an individual towards the designated feature. FIGS. 27A through 27D illustrate the basic premise of this feature. As shown, a key device 14 is illustrated with a cross-hatch pattern. Lighting fixtures 14A at a maximum neighbor rank away from the key device (two in the present embodiment) are illuminated together in FIG. 27A, followed by lighting fixtures 14A that of the next lowest neighbor ranking in FIG. 27B (one in the present embodiment), and finally be those devices 14 with the lowest neighbor ranking (zero in the present embodiment) in FIG. 27C. If the key device 14 is capable of providing a light output, it may then do so alone as shown in FIG. 27D. It is apparent that such a pattern of light will direct an observer's attention towards the key device 14, which may be useful in any number of different scenarios.

As discussed above, it may thus be desirable to know which devices 14 are near an entrance and/or exit to a space. In order to make such a determination, occupancy events may be analyzed over time. In a group of devices 14, the first device 14 to see an occupancy event will generally be the closest to an entrance, while the last device 14 to see an occupancy event will generally be closest to an exit. While this may not be true every time due to false detections, misdetections, timing, etc., a long running average of the first and last devices 14 in a group that observe an occupancy event are extremely likely to be the nearest to an entrance and exit of the group, respectively. This information may be used to designate entrance and exit devices 14, which may provide special functionality as discussed below.

Figure 28:
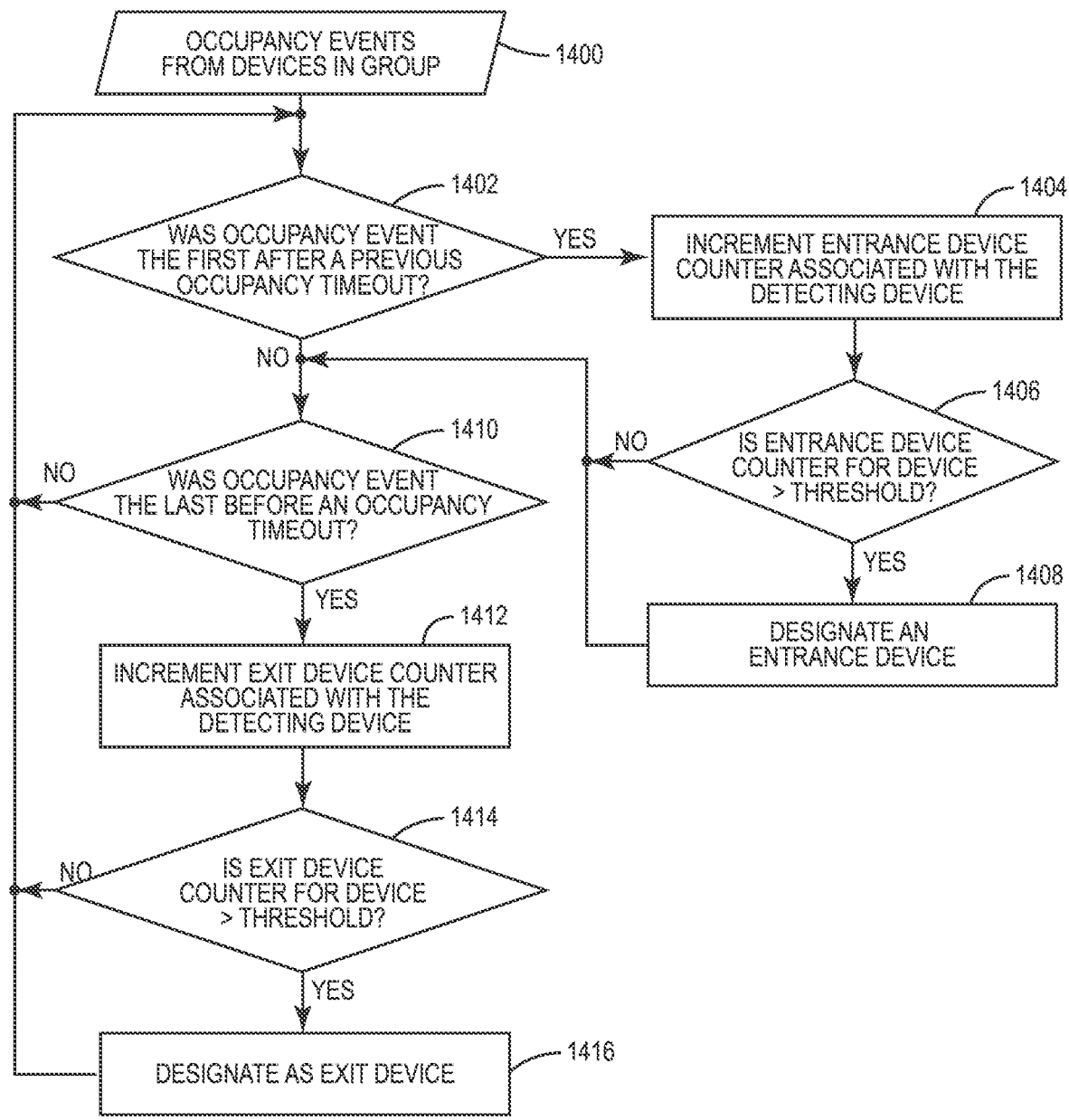
FIG. 28 is a flow diagram illustrating a process for detecting devices near entrances and/or exits according to one embodiment of the present disclosure.

FIG. 28 is a flow diagram illustrating a method for detecting a device 14 near an entrance and/or exit to a space according to one embodiment of the present disclosure. One or more occupancy events detected by the devices 14 in a group are first provided (step 1400). Each occupancy event is then analyzed to determine if it was the first occupancy event detected after a previous occupancy timeout (step 1402). When an occupancy event is detected by a device 14, an occupancy timeout is initiated. If an additional occupancy event is not detected before the occupancy timeout expires, it is determined that an individual is no longer present in the space. One or more lighting fixtures 14A in the group may then adjust the light output provided therefrom. If an occupancy event was the first to occur after a previous occupancy timeout, an entrance device counter associated with the device 14 that detected the occupancy event is incremented (step 1404). The entrance device counter is then compared to a threshold value (step 1406). This threshold value may be fixed, or may be a relative value that is determined with respect to the entrance device counter of each other device 14 in the group. If the entrance device counter is above the threshold value, the device 14 is designated as an entrance device (step 1408), and the process returns to step 1410. If the entrance device counter is not above the threshold value, the process returns to step 1410. If the occupancy event was not the first to occur after a previous occupancy timeout, the process skips step 1404, step 1406, and step 1408, proceeding directly to step 1410. Each occupancy event is then analyzed to determine if it was the last occupancy event detected before an occupancy timeout (step 1410). If an occupancy event was the last before an occupancy timeout, an exit device counter for the device that detected the occupancy event is incremented (step 1412). The exit device counter is then compared to a threshold value (step 1414). As discussed above, the threshold value may be fixed, or may be relative to a value that is determined with respect to the exit device counter for each other device 14 in the group. If the exit device counter is not above the threshold value, the process returns to step 1402. If the exit device counter is above the threshold value, the device 14 is designated as an exit device (step 1416).

Figure 29:
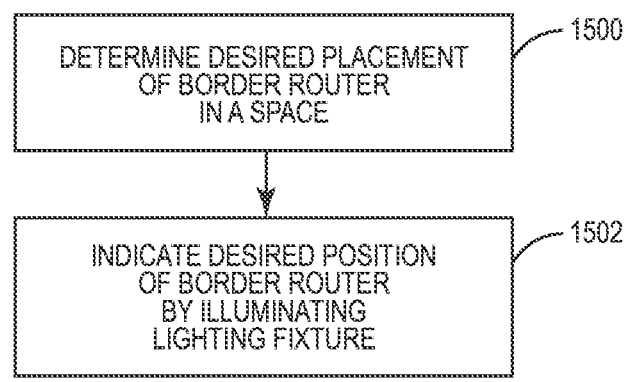
FIG. 29 is a flow diagram illustrating a process for determining and indicating a desired position of a border router in a distributed lighting network according to one embodiment of the present disclosure.

In one embodiment, one or more lighting fixtures 14A may indicate a desired placement of a border router 14D in a space. Accordingly, FIG. 29 is a flow diagram illustrating a method for indicating a preferred placement of a border router 14D in a space according to one embodiment of the present disclosure. First, a desired position for a border router 14D in a space is determined by the devices 14 in a lighting network 12 (step 1500). Such a desired position may be determined, for example, by examining the number of network collisions throughout the lighting network 12 and finding a spot where the collisions are lowest, by examining the total network traffic throughout the lighting network 12 and finding a spot where the traffic is the lowest, examining the received signal strength of each device 14 in the lighting network 12 and determining where there is the least amount of external interference therein, or by examining any other network performance or other parameter that is detectable by the devices 14 in the network. The desired position of the border router 14D is then indicated by one or more lighting fixtures 14 in the network (step 1502). This can be done similar to the process discussed above by directing an individual's attention towards the desired position, or may be indicated by a single lighting fixture 14A, or in any other desired fashion. By detecting and indicating a desired position for a border router 14D, the performance of the border router 14D may be improved by optimizing the communication between one or more devices in the network and the border router 14D.

Figure 30:
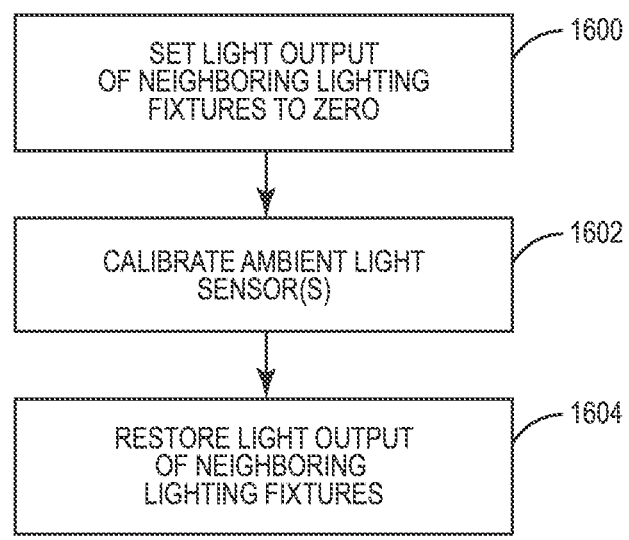
FIG. 30 is a flow diagram illustrating a process for calibrating one or more ambient light sensors according to one embodiment of the present disclosure.

In addition to the above, the link table discussed above in FIG. 12 may be used to improve an ambient light sensor calibration process of devices 14 in a lighting network 12. Accordingly, FIG. 30 is a flow diagram illustrating a method for calibrating the ambient light sensors of one or more devices 14 in a lighting network 12. Upon initiation of an ambient light sensor calibration process at a particular device 14, which may be particularly chosen by a user, chosen at random, or chosen in any desired fashion, the light output of neighboring lighting fixtures 14A to the device is set to zero (step 1600). This is necessary to avoid contaminating ambient light readings with the light output of the neighboring lighting fixtures 14A. In some embodiments, any lighting fixture 14A from which light was detected by the device 14 in the automatic grouping process discussed above may set its light output to zero for proper calibration to occur. Next, the ambient light sensor(s) of the device 14 are calibrated (step 1602). The light output of the neighboring lighting fixtures 14A is then restored to its previous level (step 1604). Notably, this ambient light sensor calibration process may significantly improve over previous approaches, which adjusted the light output of every lighting fixture 14A in a space to zero in order to calibrate the ambient light sensors of the devices 14 therein. While waiting to confirm that each lighting fixture 14A had properly adjusted the light output thereof, the space would be unlit, and therefore may be unusable for a period of time. The above process allows the majority of the space to remain usable during such a calibration period.

Figure 31:
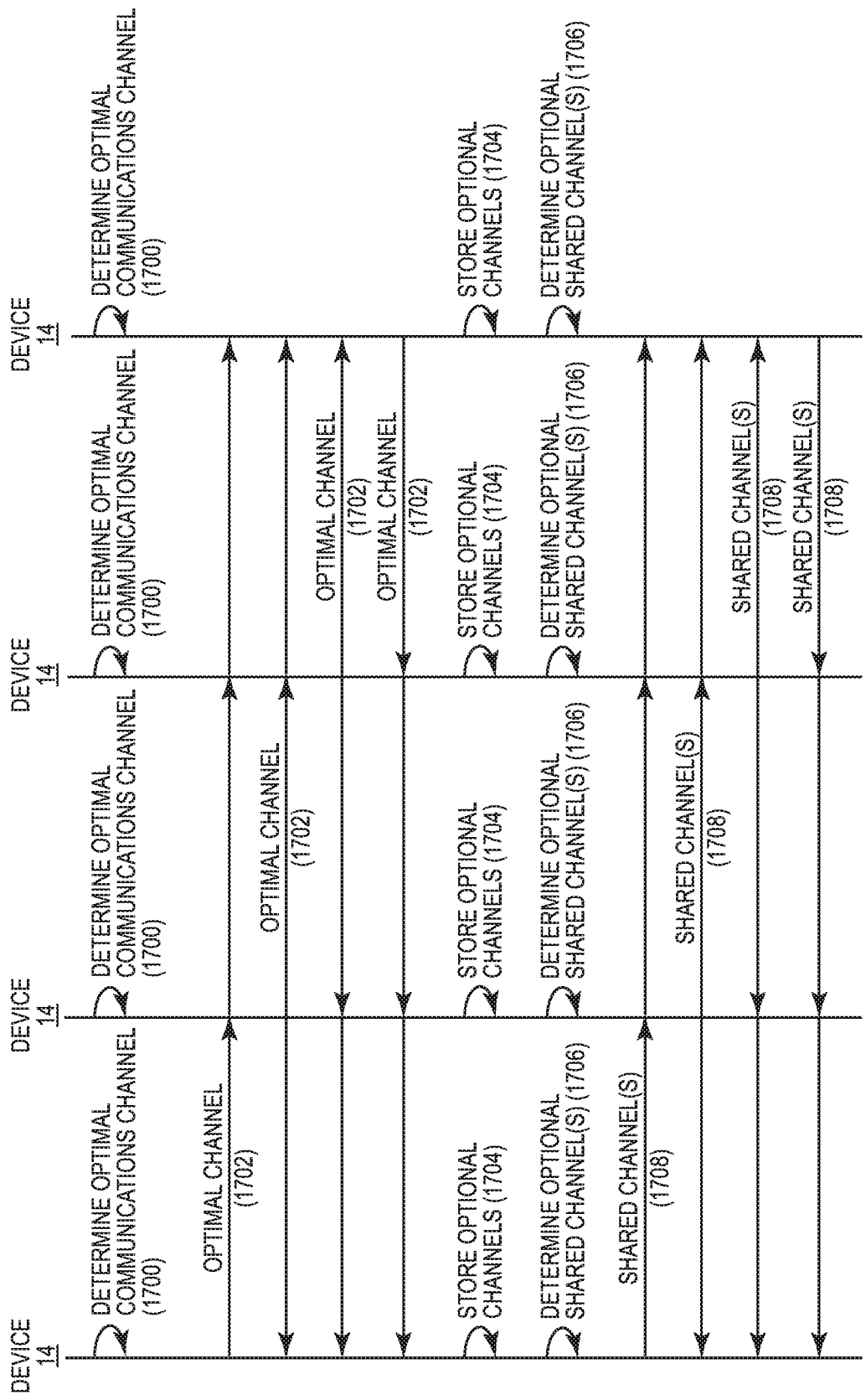
FIG. 31 is a call flow diagram illustrating a process for determining and using an optimal communication channel in a distributed lighting network according to one embodiment of the present disclosure.

Previously, devices 14 in a wireless lighting network 12A communicated with one another using a single wireless communications channel, which may have been chosen at random or by a user. This often resulted in sub-optimal wireless communication between the devices 14. In some cases, the wireless communications channel chosen for the devices 14 was based on network conditions, however, the network conditions for one device 14 or group of devices 14 may vary significantly throughout a space. For example, one device 14 or group of devices 14 may be located near a large source of radio frequency (RF) noise such as an RF device operating in a similar frequency spectrum, or may be located near an obstacle to wireless signals such as a metal structure. Accordingly, FIG. 31 is a call-flow diagram illustrating a method for optimizing a wireless communications channel for communication between devices 14 in a wireless lighting network 12A according to one embodiment of the present disclosure.

First, each device 14 determines an optimal communications channel (step 1700). Each device 14 may make this determination, for example, based on a local analysis of network traffic, network collisions, or any other network performance metric that is measurable by each device 14. The optimal channel determined by each device 14 is then shared with each other device 14 in the wireless lighting network 12A (step 1702). Each device 14 may store the optimal channel determined by each other device 14 (step 1704). Each device 14 may further determine which shared communications channel should be used in the wireless lighting network 12A or a subset thereof, such as a group (step 1706). For example, if a majority of devices 14 in the wireless lighting network 12A determined the same optimal communications channel, this channel may be used for communication within the wireless lighting network 12A. Similarly, if the majority of devices 14 in a group determined the same optimal communications channel, this channel may be used for communication within the group. Notably, each device 14 may communicate on a different communications channel with each other device 14 based on the optimal communications information that was previously shared amongst the devices 14. For example, a device 14 may look-up the optimal communications channel for another device 14 before communication therewith, and use this optimal communications channel. This may occur at any level of granularity, such as on a device 14 level, on a group level, or on a network level. The determined shared communications channel may then be shared between the devices 14 (step 1708) so that it can be used as discussed above.

Figure 32:
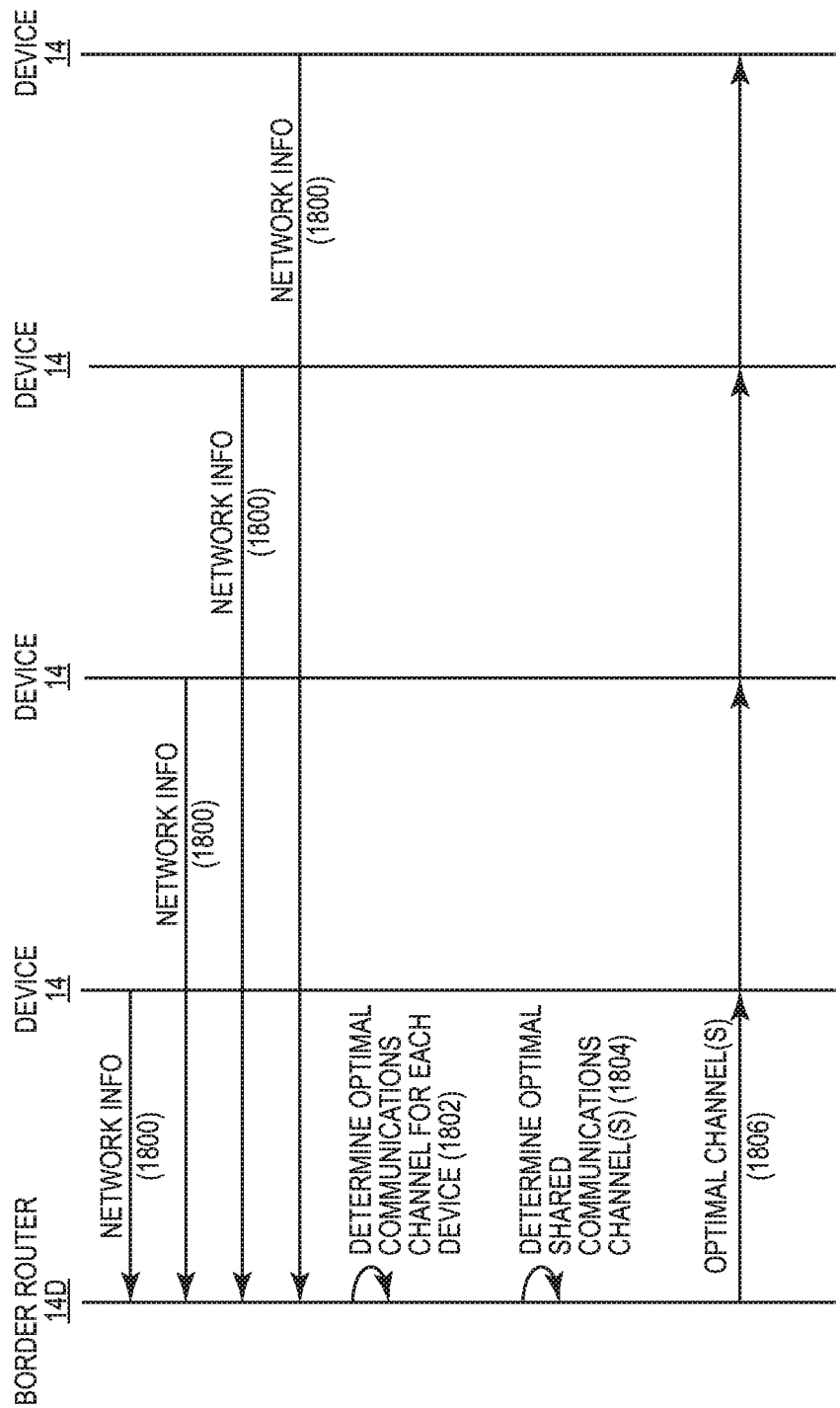
FIG. 32 is a call flow diagram illustrating a process for determining and using an optimal communication channel in a distributed lighting network according to one embodiment of the present disclosure.

FIG. 32 is a call-flow diagram illustrating a method for optimizing a wireless communications channel for communication between devices 14 in a wireless lighting network 12A according to an additional embodiment of the present disclosure. First, the devices 14 in a network provide network information about the network to a border router 14D (step 1800). The network information may include any network parameters that are measurable by the devices 14 as discussed above. The border router 14D then determines an optimal communications channel for each device 14 in the wireless lighting network 12A (step 1802). Further, the border router 14D may determine the optimal shared communications channel for the wireless lighting network 12A or any subset thereof such as the groups in the wireless lighting network 12A (step 1804). The border router 14D may then share these optimal communications channels and optimal shared communications channel with each device 14 (step 1806).

The features described above allow for the formation of an improved distributed lighting network 10. The distributed lighting network 10 is unique in that it provides intelligent devices 14 at fixed points throughout a space. These devices 14 may be leveraged to introduce significant new functionality into a space, and to provide valuable insights about the space. As an infrastructure for lighting is ubiquitous in most modern spaces, the distributed lighting network 10 may be provided in a space without significant investment in new infrastructure.

The sensors included in each device 14 in the distributed lighting network 10 may provide a very large amount of information about the space in which they are located. Data from these sensors may be utilized to gain insights about the space that were previously unachievable, and thus add new and interesting features to the distributed lighting network 10. This is due to the fact that these sensors may be distributed throughout the space in a relatively fine-grained fashion, and are capable of communicating with one another and other remote devices 16. As discussed above, the infrastructure afforded to lighting is especially suited for this task.

In particular, providing an image sensor in each device 14 or a subset of devices 14 in the distributed lighting network 10 may provide extensive insights about a space. First and foremost, however, an image sensor may be used to perform the function of several other sensors, such as a PIR occupancy sensor and an ambient light sensor. Certain aspects of detecting occupancy and ambient light using an image sensor are discussed in copending U.S. patent application Ser. No. 14/928,592, issued as U.S. Pat. No. 9,769,900, the contents of which are hereby incorporated by reference in their entirety.

Figure 33A:
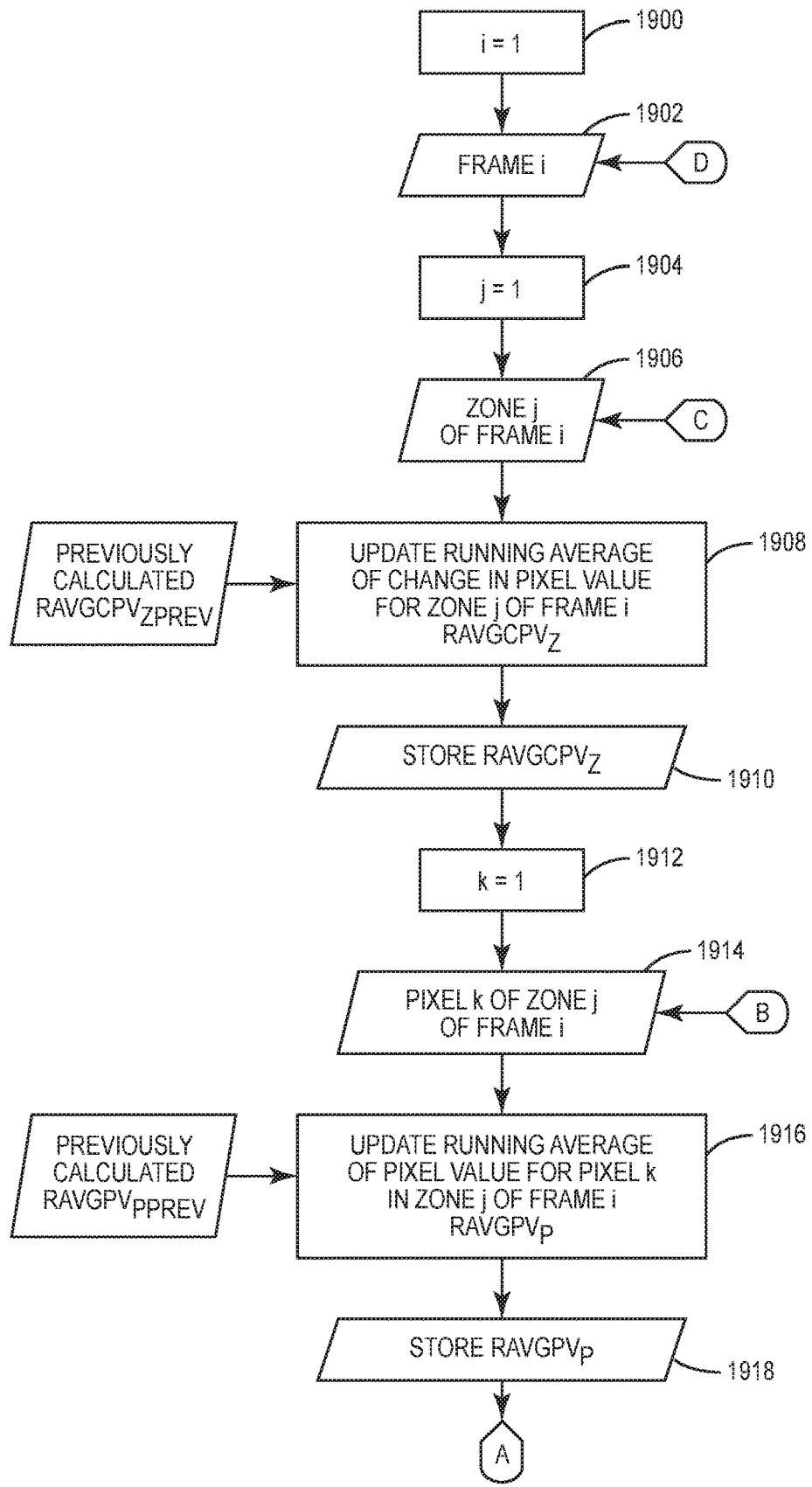
FIGS. 33A and 33B are flow diagrams illustrating a process for detecting occupancy using an image sensor according to one embodiment of the present disclosure.
Figure 33B:
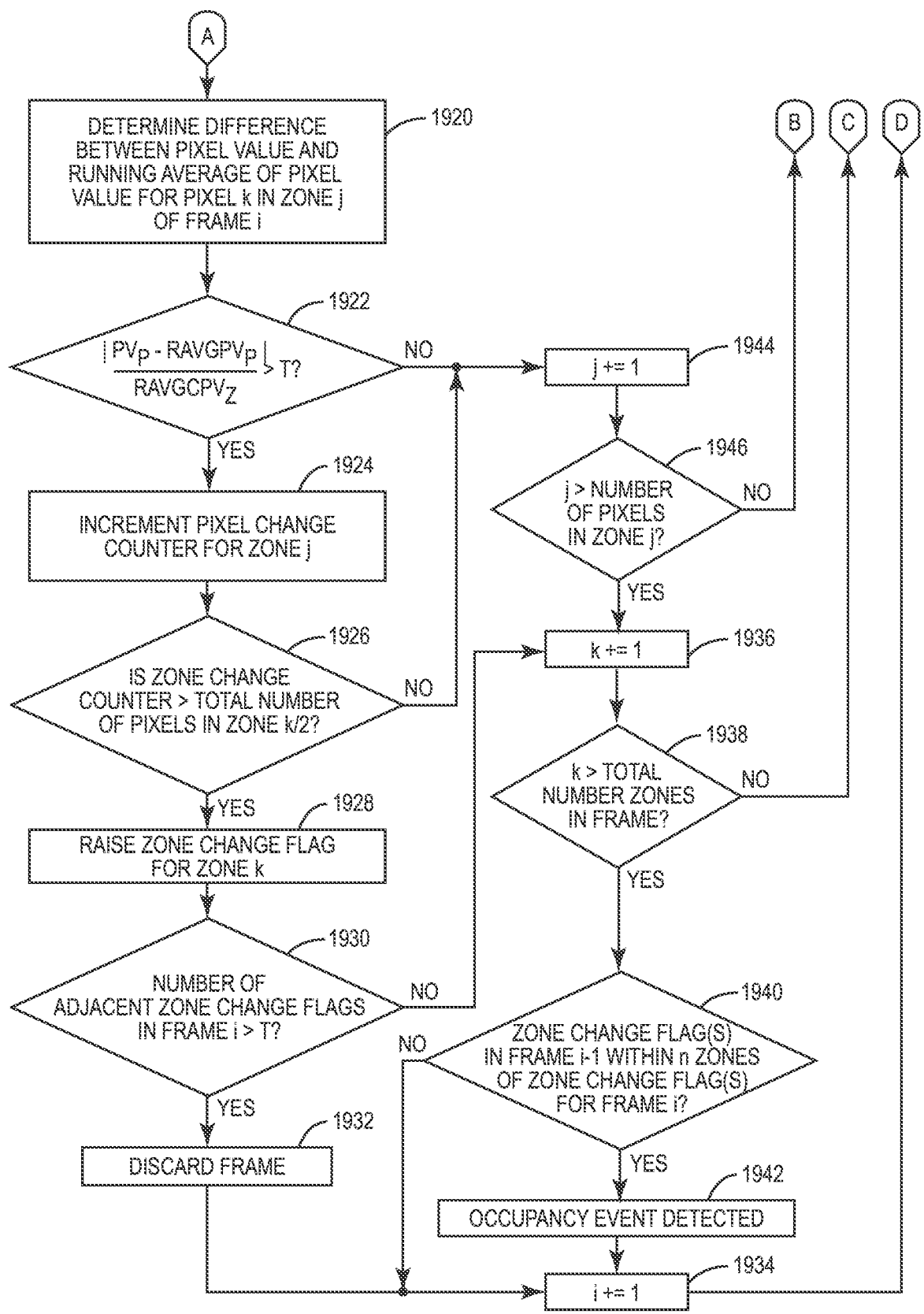

Detecting occupancy events using an image sensor may prove especially challenging in some circumstances. Simply looking for differences between pixel values in frames obtained from an image sensor is inadequate, as there are many sources of noise that may cause false occupancy event detections. For example, low-level noise such as dark current, thermal noise, and analog-to-digital conversion noise may be misinterpreted as motion and thus trigger an occupancy event in some circumstances. Further, modulation of light sources (e.g., fluorescent lights, pulse-width modulated solid-state light sources, etc.) or sources of repetitive motion such as the rotation of a fan or the sway of a tree branch in a nearby window may be misinterpreted as an occupancy event. Changes in ambient light, for example, due to cloud coverage or a change in light output of one or more lighting fixtures may also be misinterpreted as an occupancy event. For outdoor fixtures, rain, snow, sleet, insects, and animals traversing a field of view of an image sensor may be misinterpreted as an occupancy event. Accordingly, FIGS. 33A and 33B illustrate a flow diagram illustrating a method for detecting occupancy events using an image sensor according to one embodiment of the present disclosure.

First, a frame counter (i) is set (step 1900). The frame indicated by the frame counter is then obtained (step 1902). For example, the frame may be obtained by requesting it from an image sensor, or by viewing the frame as it is stored in memory. Next, a zone counter (j) is set (step 1904). The zone indicated by the zone counter in the frame indicated by the frame counter is then obtained (step 1906). The zone may include pixel values for each pixel within the zone. An average (e.g., a running average) of the pixel change value for each pixel in the zone $RAVGCPV_Z$ is then updated (step 1908). As discussed above, the pixel value (and thus the pixel change value) may be a brightness value, a luma value, a color value, raw pixel data (i.e., pixel data that has not been processed e.g., via a demosaic process, referred to herein as a raw value), or the like. An average of the pixel change value for the zone $AVGCPV_Z$ may be calculated according to Equation (3):

$$AVGCPV_Z = \frac{CPV_{P1} + CPV_{P2} \ldots + CPV_{PN}}{NP_Z}$$

where $AVGCPV_Z$ is the average of the pixel change value for the zone, $CPV_{PX}$ is the pixel change value for a particular pixel within the zone (calculated as described below), and $NP_Z$ is the number of pixels in the zone. The running average of the pixel change value for the zone $RAVGCL_Z$ may then be calculated according to Equation (4):

$$RAVGCPV_Z = \alpha AVGCPV_{ZCURR} + \beta RAVGCPV_{ZPREV}$$

where $RAVGCPV_Z$ is the running average of the pixel change value for the pixels in the zone, $RAVGCPV_{ZCURR}$ is the current average of the pixel change value for the pixels in the zone, $RAVGCPV_{ZPREV}$ is the previously calculated running average of the pixel change value for the pixels in the zone, $\alpha$ is a first blending factor, and $\beta$ is a second blending factor. The updated running average of the pixel change value for the pixels in the zone $RAVGCPV_Z$ is then stored (step 1910).

Next, a pixel counter (k) is set (step 1912). The pixel indicated by the pixel counter in the zone indicated by the zone counter in the frame indicated by the frame counter is then obtained (step 1914). A running average of the pixel value for the pixel $RAVGPV_P$ is then updated (step 1916). A running average of the pixel value for the pixel $RAVGPV_P$ may be calculated according to Equation (5):

$$RAVGPV_P = \alpha PV_P + \beta RAVGPV_{PPREV}$$

where $RAVGPV_P$ is the running average of the pixel value for the pixel, $PV_P$ is the pixel value of the pixel, $RAVG_{PPREV}$ is the previously calculated running average of the pixel value the pixel, $\alpha$ is a first blending factor, and $\beta$ is a second blending factor. The running average of the pixel value $RAVGPV_P$ is then stored (step 1918). An absolute difference between the pixel value of the pixel $PV_P$ and the running average of the pixel value of the pixel $RAVGPV_P$ is then calculated (step 1920), the result of which is the pixel change value. In some embodiments, this may be calculated based on the previously calculated running average of the pixel value of the pixel $RAVGPV_{PPREV}$ instead of the updated running average of the pixel value $RAVGPV_P$. This pixel change value is then normalized by dividing the pixel change value by the running average pixel change value for the zone $RAVGCPV_Z$, and compared to a threshold (step 1922). This essentially provides a Boolean indicator for whether a change in a pixel value is reliably significant and meaningful. If the difference between the pixel value of the pixel $PV_P$ and the running average pixel value of the pixel $RAVGPV_P$ divided by the running average of the pixel change value for the zone $RAVGCL_Z$ is greater than a threshold, a pixel change counter is incremented for the zone (step 1924). A determination is then made whether the pixel change counter is larger than half of the number of pixels in the zone (step 1926), indicating that at least half of the pixels in the zone experienced a significant change. Notably, any fraction of the pixels in the zone may be used without departing from the principles of the present disclosure (e.g., the determination may be whether the pixel change counter is greater than at least a quarter of the pixels in the zone, an eighth of the pixels in zone, or any other fractional value of the pixels in the zone). If the pixel change counter is larger than half the number of pixels in the zone, a zone change flag is raised (step 1928), indicating that a reliably significant change was detected in the zone. Notably, each zone may be sized to detect an object at a desired size. For example, the size of the zone may be around two times the size of an individual in the field of view of the camera sensor so that half of the pixels should indicate the detection of an object that is about that size. The zone change flag may be an indication that the pixel values for the pixels in the zone may need to be updated by transmission to a remote device as discussed above. A determination is then made whether the number of adjacent zone change flags for the frame is above a threshold value (step 1930). If a number of adjacent zone change flags is above a threshold value, this indicates a change in pixel values over a large portion of the frame, and is assumed to be a false alarm. Accordingly, the frame is discarded (step 1932), the frame counter is incremented (step 1934), and the process returns to step 1902. In lieu of step 1930, in some embodiments, if the determination made in step 1922 is positive for a number of pixels in the frame over a threshold value, the frame is similarly labeled a false detection and discarded.

If the number of adjacent zone change flags in the frame is not above the threshold, the zone counter is incremented (step 1936). A determination is then made whether the zone change counter is greater than the number of zones in the frame (step 1938). If the zone counter is greater than the number of zones in the frame, a determination is made if the zone change flag(s) in a previous frame (i–1) are within n zones of the zone change flag(s) in the current frame (i) (step 1940). This indicates movement within the frame, where n is a value chosen based on the framerate of the image sensor such that the detected movement is occurring with a velocity threshold for a desired object (e.g., the average moving speed of a human, slow-moving vehicle, or the like). Generally, the zone change flag(s) between frames should move at least one zone, if not more to indicate movement between frames and thus avoid false detections. Zone change flag(s) moving greater than n zones are moving too fast to be an object that the image sensor is interested in detecting and thus are ignored. If the zone change flag(s) in a previous frame are within n zones of the zone change flag(s) in the current frame, an occupancy event is detected (step 1942), the frame counter is incremented (step 1934), and the process returns to step 1902. If the zone change flag(s) in a previous frame are not within n zones of the zone change flag(s) in the current frame, the frame counter is incremented (step 1934), and the process returns to step 1902 without indicating an occupancy event.

If the pixel change counter is not larger than half the number of pixels in the zone, the pixel counter is incremented (step 1944). A determination is then made whether the pixel counter is greater than the number of pixels in the zone (step 1946). If the pixel counter is not greater than the number of pixels in the zone, the process returns to step 1914. If the pixel counter is greater than the number of pixels in the zone, the process returns to step 1936.

The above process has several advantages over conventional image processing techniques directed towards object detection. First, the running averages calculated above may be done so by using the blending factors (rather than conventional running average techniques), which may save processing power and memory resources. Second, using the running average of the change of luma in a zone, rather than at the pixel level further saves memory resources by preventing the storage of a running change in luma value for each pixel. In general, the above is a lightweight image processing technique that may be used to detect occupancy events using an image sensor. The image processing technique may be capable of implementation on each individual device 14 including an image sensor, such that an image sensor may provide occupancy event detection in each device 14. Due to the fact that an image sensor may further provide the functionality of other sensors as well, such as ambient light sensors, using the image sensor in place of these other sensors may save space and cost in the devices 14.

While PIR sensors and image sensors may be used alone to detect occupancy events, additional sensor data may be used either alone or in combination with the above to further increase the accuracy of detection. For example, changes in atmospheric pressure may correspond with an individual entering a space, and thus may be used either alone or in combination with data from a PIR or image sensor to detect an occupancy event. This may be especially true in the case of a room with a door. The pressure in such a room will significantly change upon open or close of said door, and thus detecting such a change using an atmospheric pressure sensor may be a simple way to detect when someone has entered or left the room (corresponding with an occupancy event). Further, vibration and/or motion detected from an accelerometer in a device 14 may be further indicative of an occupancy event, and thus may be used alone or in combination with data from a PIR or image sensor to detect an occupancy event. Finally, sound detected from a microphone may be indicative of an occupancy event, and may be used alone or in combination with data from a PIR and/or image sensor to detect an occupancy event. All of the data from the atmospheric pressure sensors, the vibration and/or motion sensors, and the microphones may be used according to the principles described above in order to reduce background noise therein. That is, changes in a long-running average of these sensor measurements may be much more indicative of an event than instantaneous changes therein, and thus the measurements may be examined in this manner in order to detect one or more occupancy events. Changes in sound levels using the microphone may be especially useful, as different changes may correlate with different "degrees" of occupancy. That is, using measurements from a microphone either alone or in combination with data from a PIR and/or image sensor may allow for a rough estimate of how many individuals are occupying and/or using a space, which may provide additional insights about the space.

In one embodiment, an accelerometer is provided near an image sensor in a device 14. Data from the accelerometer may then be used to determine if the device 14 is moving. Such movement may be likely to indicate, for example, that distortion will occur in the output of the image sensor (e.g., from shaking, swaying, or the like). In order to avoid false occupancy detections due to such movement, the data from the accelerometer may be used in conjunction with data from the image sensor, where occupancy events detected by the image sensor are ignored or further processed with the accelerometer indicates movement above a certain threshold.

As discussed above, certain distractors such as precipitation, snow, insects, and animals may cause false detections in outdoor devices 14. Often, these distractors are much more likely to create a false occupancy event detection when they are detected very near the image sensor. As insects and animals are often attracted to light, this may occur frequently. Accordingly, in one embodiment a lens associated with an image sensor on a device 14 is configured with a focal length that is tailored to a desired detection length from the image sensor. For example, the minimum focal length of the lens may be at least 1 foot, at least 3 feet, at least 9 feet, and the like. Creating such a minimum focal length causes objects that are near to the image sensor to remain blurry, and thus reduces their detection by the image sensor. This may avoid false detection of occupancy events due to these distractors. In some cases, an integration time associated with the image sensor may also be adjusted to "filter" out fast-moving distractors such as precipitation, snow, insects, and animals. Often, these distractors appear to be moving very quickly due to their proximity to the image sensor and velocity. By increasing an integration time of the image sensor to capture objects moving within a desired range of velocities (e.g., human walking or running speeds, the speed of slow-moving vehicles, etc.), faster moving objects such as the above-mentioned distractors may essentially be ignored by the image sensor, thereby avoiding false detection of occupancy events.

Figure 34:
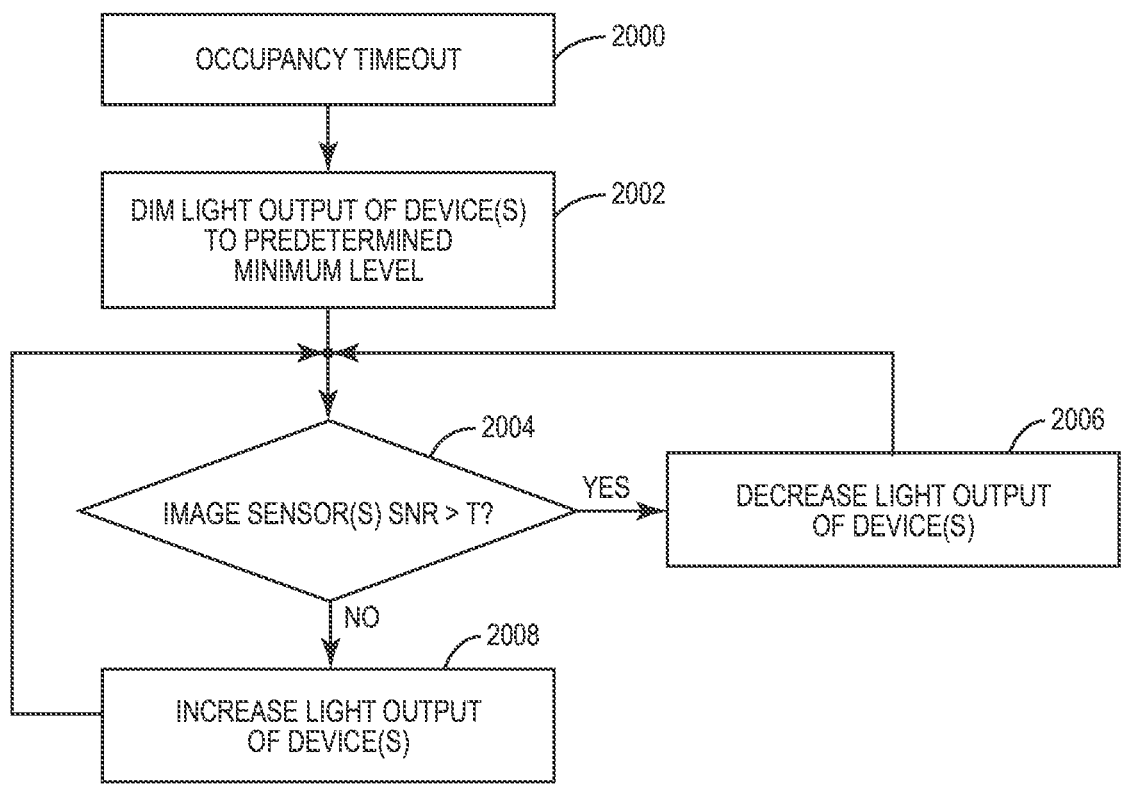
FIG. 34 is a flow diagram illustrating a process for adjusting a light level of a lighting fixture in order to properly detect occupancy in a lighting fixture according to one embodiment of the present disclosure.

The foregoing process for detecting an occupancy event with an image sensor is merely illustrative, and not exhaustive. There are many different ways to detect occupancy events using an image sensor, all of which are contemplated herein. One problem with detecting occupancy events with an image sensor is that there is a minimum required level of light for doing so. That is, at light levels below a certain threshold, the signal-to-noise ratio (SNR) of an image sensor becomes too high to detect occupancy events. Accordingly, FIG. 34 illustrates a method for adjusting the light output of a lighting fixture 14A to maintain a necessary amount of light for detecting occupancy events using an image sensor. Such adjustment may be done with respect to an image sensor on the lighting fixture 14A itself, or with respect to an image sensor on any neighboring device(s) 14.

First, an occupancy timeout occurs (step 2000). As discussed above, after an occupancy event is detected, an occupancy timeout is initiated. As additional occupancy events are detected by a device 14 or within a group, this occupancy timeout is re-initiated such that the occupancy timeout starts over. When occupancy events are not detected for a period of time, the occupancy timeout occurs, indicating that the space is no longer occupied. The light output of the lighting fixture 14A is then set to a predetermined minimum level (step 2002). This predetermined minimum level may be set up by a user or pre-programmed into the lighting fixture 14A. The goal of the predetermined minimum level is to provide only the necessary amount of light so that one or more nearby image sensors may detect occupancy events. However, this light level may be different for different image sensors, environmental conditions, and the like. Accordingly, a determination is then made regarding whether the SNR of any nearby image sensors is above a threshold value (step 2004). If the SNR of the image sensors is above the threshold value, the light output of the lighting fixture 14A is decreased (step 2006) and the process is returned to step 2004. If the SNR of the image sensor is below the threshold value, the light output of the lighting fixture is increased (step 2008), and the process again returns to step 2004. In this way, the light output of the lighting fixture 14A is dynamically adjusted such that nearby image sensors are capable of detecting occupancy while avoiding over-lighting a space.

The above process may be conducted on each lighting fixture 14A in a group, in which case the lighting fixtures 14A may cooperate to ensure that the light output levels thereof are substantially uniform. In general, however, such minimum lighting only needs to be done by lighting fixtures 14A that illuminate the area near one or more entrances to a space. This is because it is known that an individual will have to pass through an entrance to initiate occupancy at any device 14. Accordingly, the foregoing minimum dimming may only be done on those lighting fixtures 14A that illuminate an area near an entrance to a space in order to save energy and avoid over-lighting the space when it is not in use.

Figure 35:
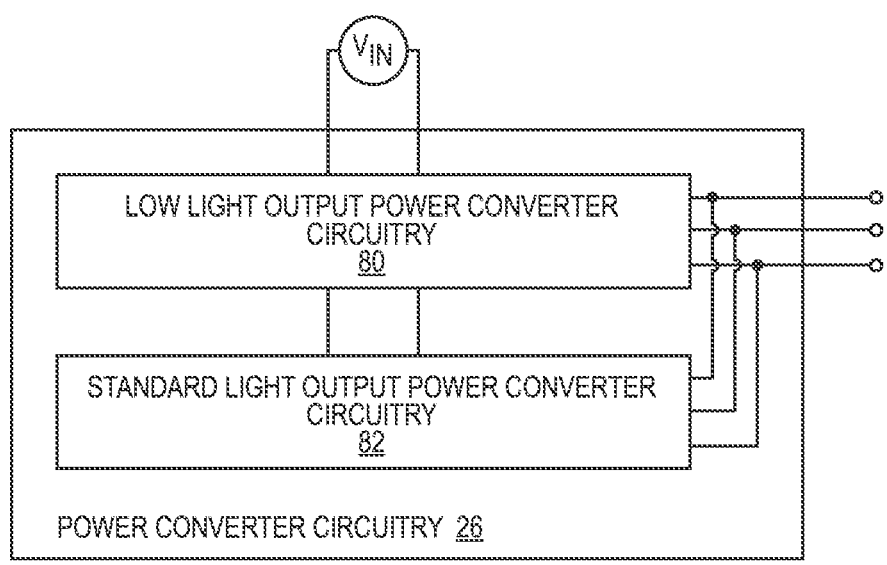
FIG. 35 is a functional schematic of power converter circuitry according to one embodiment of the present disclosure.

Generally, the sensitivity of image sensors is such that the minimum light level discussed above will be very low. Such light levels may not be achievable by conventional power converter circuitry used for solid state lighting devices, which generally provide a pulse-width modulated current to a string or strings of LEDs as discussed above. As the current required by a load becomes small, the timing between current pulses in a pulse-width modulated signal becomes very small, requiring a switching power converter that is capable of very fast switching speeds. Such a switching power converter may be impractical due to cost constraints, or impossible altogether. Accordingly, FIG. 35 illustrates power converter circuitry 26 for a lighting fixture 14A according to one embodiment of the present disclosure. The power converter circuitry 26 includes low light output power converter circuitry 80 and standard light output power converter circuitry 82. The low light output power converter circuitry 80 and the standard light output power converter circuitry 82 may each be coupled to an input voltage ($V_{IN}$), and coupled together at a number of outputs, each of which are configured to power a different LED string. The low light output power converter circuitry 80 may be configured to provide a linear output signal, while the standard light output power converter circuitry 82 may be configured to provide a pulse-width modulated output signal. Accordingly, the low light output power converter circuitry 80 may be a linear regulator, while the standard light output power converter circuitry 82 may be a switching power converter such as a buck converter, a boost converter, a buck-boost converter, or the like. Notably, the low light output power converter circuitry 80 may be less efficient than the standard light output power converter circuitry 82 at standard light levels, however, the difference in efficiency may be negligible at the low light levels that the low light output power converter circuitry 80 is used for. Further details of an ultra-low dimming lighting fixture may be found in co-filed U.S. patent application Ser. No. 15/018,375, filed Feb. 8, 2016, issued as U.S. Pat. No. 9,730,289, and titled "Solid State Light Fixtures Having Ultra-Low Dimming Capabilities And Related Driver Circuits And Methods", the disclosure of which is hereby incorporated by reference in its entirety.

Another problem that may arise in detecting occupancy events using an image sensor occurs when a neighboring lighting fixture 14A to a device 14 abruptly adjusts the light output thereof. Neighboring devices 14 to the lighting fixture 14A may falsely detect the changing light output as an occupancy event in some circumstances, which may result in a control loop in which the device 14 prevents the lighting fixture 14A from adjusting the light output thereof as desired. This is a particular problem when a lighting fixture 14A experiences an occupancy timeout event and thus attempts to reduce the light output thereof, as nearby devices 14 may then detect this reduction in light output as an occupancy event, causing the lighting fixture 14A to increase the light output thereof. One way to compensate for this is for lighting fixtures 14A to pre-announce when the light output thereof is going to change, so that nearby devices 14 can ignore said changes. For example, nearby devices 14 may ignore occupancy events detected by an image sensor associated therewith for a period of time after such announcement. However, this may be undesirable in some circumstances, as these devices 14 may then fail to detect the occurrence of an actual occupancy event. Accordingly, in some embodiments nearby devices 14 may ignore only a portion of a field of view of an image sensor associated therewith, and specifically that portion that is affected by the light output of the neighboring lighting fixture 14A. For example, a frame of an image from an image sensor may be divided into a number of zones, and only those zones that are affected by the neighboring lighting fixture 14A (which may be determined, for example, during the automatic grouping process discussed above) may be ignored. However, even this may result in missed occupancy event detections.

Accordingly, in some embodiments the amount of light change from the neighboring lighting fixture 14A, which may be predetermined during the automatic grouping process or determined based on communication with the lighting fixture 14A may be taken into account and ignored, while other changes detected by the image sensor according to the processes described above may continue to function. In other words, the automatic grouping process discussed above may indicate that a neighboring lighting fixture 14A is detected at a certain intensity by the device 14. The device 14 may then ignore changes in light output detected by the image sensor associated therewith within this range. This allows for the continuing detection of occupancy events while failing to falsely detect occupancy events based on the changing light output of neighboring lighting fixtures 14A.

Yet another, simpler way to avoid the above mentioned problems is to dim the light output of neighboring lighting fixtures 14A slowly upon the occurrence of an occupancy timeout. If done slowly enough, this prevents nearby devices 14 from falsely interpreting the changing light output from nearby lighting fixtures 14A as an occupancy event and thus avoids the control loop problems discussed above. Generally, it is not critical to instantly reduce the light output in a space on the occurrence of an occupancy timeout. Accordingly, the above method is a simple but effective way to avoid entering undesirable control loops between neighboring devices 14 using image sensors to detect occupancy events.

Figure 36:
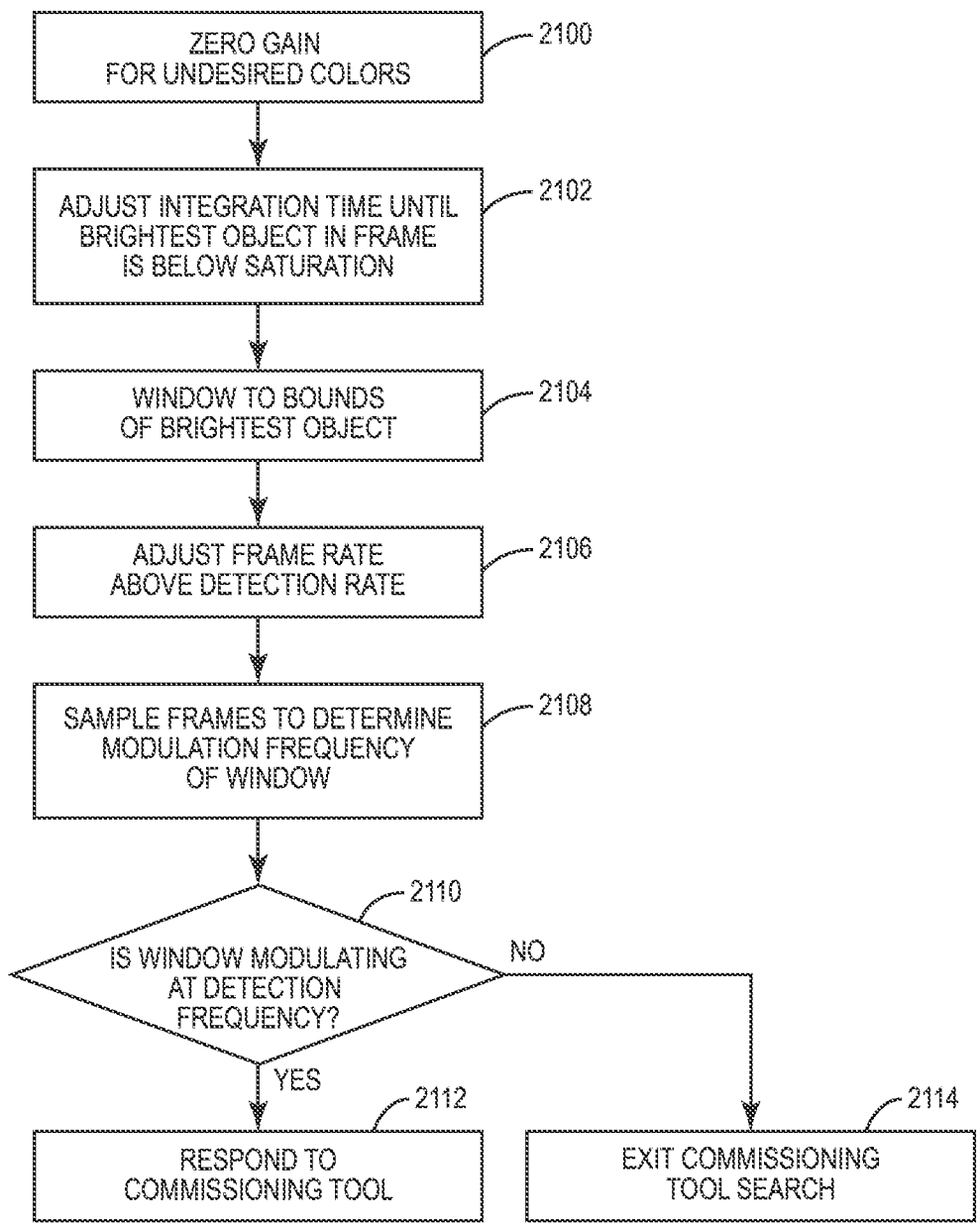
FIG. 36 is a flow diagram illustrating a process for detecting and responding to a commissioning tool using an image sensor according to one embodiment of the present disclosure.

It may be desirable for the image sensor to be capable of detecting a commissioning tool used in the distributed lighting network 10 to communicate with the various devices 14. Details regarding the initiation of communication between a device 14 and a commissioning tool are discussed in detail in U.S. patent application Ser. No. 13/782,022, issued as U.S. Pat. No. 9,155,165, the disclosure of which is hereby incorporated by reference in its entirety. In short, the commissioning tool includes a light emitting device of a certain color, which must be detected by a device 14 to ensure that the commissioning tool is attempting to communicate specifically with that device 14. If the light emitting device were not present on the commissioning tool, messages sent, for example, via a wireless signal, could be received and acted upon by any number of nearby devices 14. Previously, light from the commissioning tool was detected by an ambient light sensor in a device 14. However, as discussed above it may be desirable to replace the functionality of a dedicated ambient light sensor with an image sensor. Accordingly, FIG. 36 is a flow diagram illustrating a method of detecting a commissioning tool using an image sensor according to one embodiment of the present disclosure.

Upon initiation of the detection process, which may be in response to a wireless signal provided by the commissioning tool indicating that it wishes to communicate with a nearby device 14, the gain of the image sensor is first zeroed for any undesired colors (step 2100). Specifically, the gain of the image sensor is zeroed for all colors except the color of the light emitting device on the commissioning tool. If the commissioning tool is in the field of view of the image sensor, the resulting image will include a highly saturated area where the light emitting device of the commissioning tool is located due to the gain zeroing. Accordingly, the integration time of the image sensor is then adjusted such that the brightest object in the frame (which should be the light emitting device of the commissioning tool) is below saturation (step 2102). The frame is then windowed to the bounds of the brightest object, which, once again, is the light emitting device of the commissioning tool (step 2104). This windowing allows the image sensor to reduce the amount of data that it needs to collect, and therefore may enable the frame rate of the image sensor to be increased (step 2106).

This is important, as the light provided by the commissioning tool may be modulated at a particular frequency to prevent false detections of other light emitting devices during this process. To assure that the modulation frequency of the light provided by the commissioning tool is different from standard sources of interference, the light signal may be modulated at a frequency above 60 Hz (e.g., 80 Hz). Many image sensors are incapable of providing frame rates capable of detecting modulation at this frequency. The dynamic windowing around the light provided from the commissioning tool may remedy this, as the frame rate of the image sensor is proportional to the area sampled thereby in many cases. A number of frames from the image sensor are then sampled (step 2108), and it is determined if the sampled frames are modulated at a desired detection frequency (i.e., the modulation frequency of the light provided by the commissioning tool) (step 2110). This may be done, for example, by looking for a beat frequency which is the difference of the sample frequency of the image sensor and the modulation frequency of the light provided by the commissioning tool. If the modulation is detected, the device 14 will respond to the commissioning tool (step 2112). If the modulation is not detected, the device may cease searching for the commissioning tool (step 2114).

While image sensors may be used to implement the functionality previously served by other sensors, they may also be used to implement new functionality in the distributed lighting network 10. One such function is security, wherein the image sensors may be used not only to detect occupancy events and ambient light levels, but also to provide images of a space to a central location for security purposes. In many wireless lighting networks 12A, such functionality may be problematic, as the mesh networks used by the devices 14 therein may not be suited for the transfer of high bandwidth data such as images and video. Certain compression techniques may be used to circumvent this effect, such as only sending images and/or video when something in the frame has changed, using well-known video compression codecs such as MPEG-4 and H.264, or the like. However, in some situations even this may be insufficient to overcome these shortcomings. Accordingly, one or more of the devices 14 in the network may communicate this image and/or video data over a secondary communications means that is better suited for these tasks. For example, one or more of the devices 14 may connect to a WiFi network or other high-speed wireless communications network in order to provide images and/or video from image sensors in the devices 14 to a desired location.

While images and/or video of a space are useful when viewed separately, it may be more advantageous to provide a unified visual representation of a space in some cases. For example, images from multiple devices 14 in the distributed lighting network 10 may be merged together at their points of overlap to present a unified overhead view of the space. This image may be very high resolution, as it combines the resolution of each of its constituent images. Such an image and/or video stream may be viewed together and thus provide an excellent overview of what is happening within the space at any given time.

Figure 37:
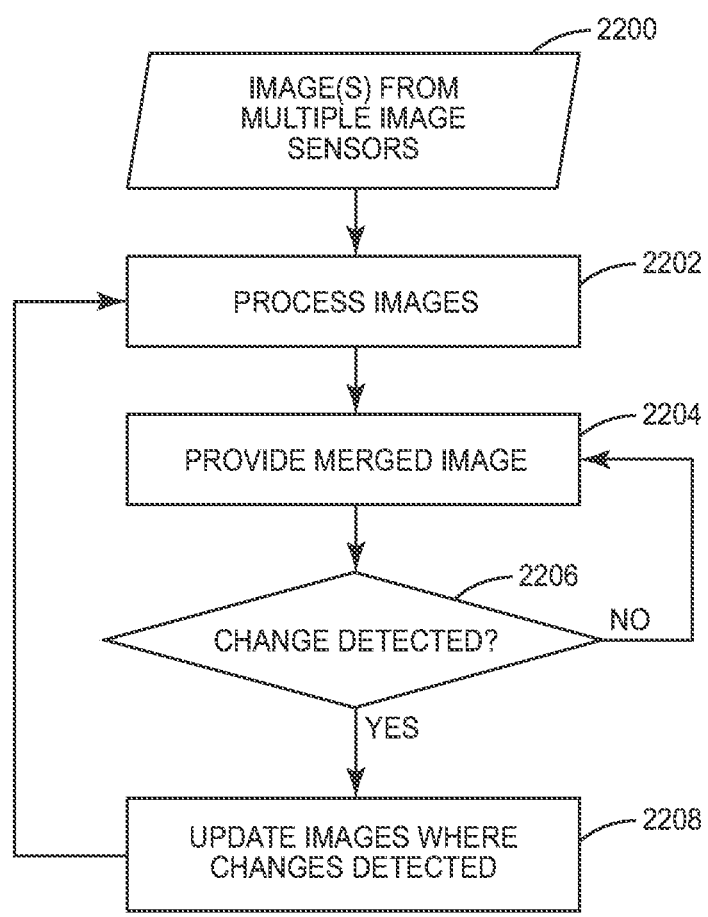
FIG. 37 is a flow diagram illustrating a process for providing merged images from multiple image sensors in a distributed lighting network according to one embodiment of the present disclosure.

FIG. 37 is a flow diagram describing a method for providing such a merged image. First, images from multiple image sensors are provided (step 2200). The images are then processed (step 2202). The processing may include not only merging the images at their points of overlap, but also de-warping, de-skewing, and otherwise compensating the images for any distortion therein. A merged image is then provided (step 2204). A determination is then made regarding whether a change has been detected from any of the image sensors (step 2206). If a change has been detected, new images are obtained from the image sensors (step 2208), and the process returns to step 2202 to process these images and provide the merged image once again. If no changes have been detected by the image sensors, the merged image continues to be provided as in step 2204. This prevents the unnecessary use of bandwidth in the network, as it only requires updated images when something in the space has changed.

Figure 38:
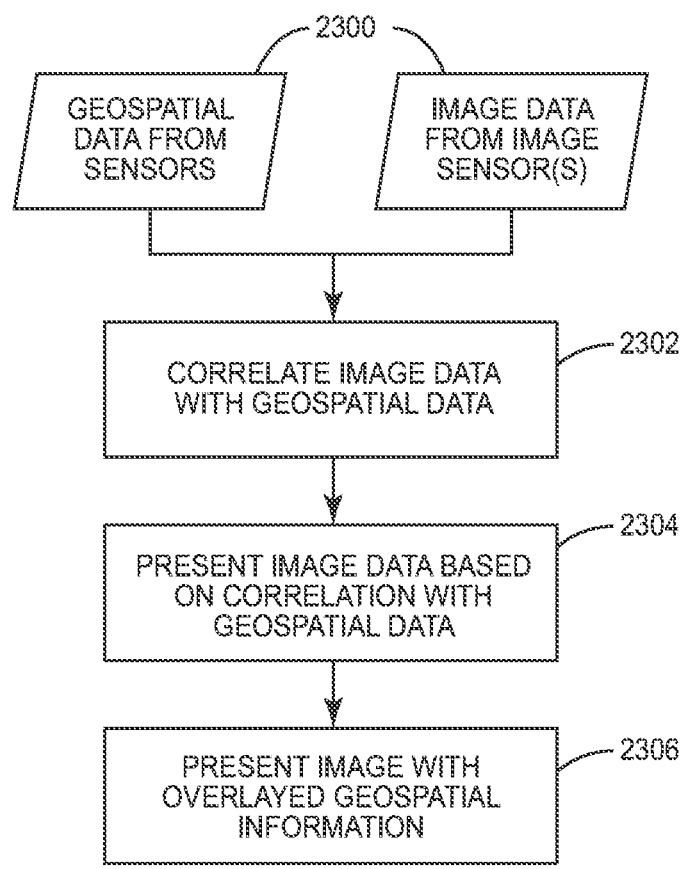
FIG. 38 is a flow diagram illustrating a process for correlating image data and geospatial data and displaying the result according to one embodiment of the present disclosure.

In addition to the above, it may also be highly advantageous to correlate image data from one or more image sensors with geospatial data obtained from one or more other sensors. Correlating image data with geospatial data allows for a real-space representation of a space to be constructed, which may be highly useful in many situations. Such a process may be referred to as georegistration of image data, and a flow chart describing the basics of such is shown in FIG. 38. First, geospatial data from one or more sensors and image data from one or more image sensors is provided (step 2300). The image data and the geospatial data are then correlated (step 2302). Generally, if two points of image data (e.g., pixels or areas) can be correlated with two points of geospatial information (e.g., latitude and longitude, GPS coordinates, etc.), the image data can be considered georegistered and a real-space representation of the space can be generated. Next, image data may be presented based on the correlation of image data and geospatial data (step 2304). This may involve presenting the image data such that it is properly oriented, properly scaled, or the like. Further, the image data may be displayed with geospatial information overlayed thereon (step 2306), which may provide additional context to the image data. Further applications of an image sensor in one or more devices 14 in the distributed lighting network 10 are discussed below.

In some situations, power consumption may be an important concern for the devices 14 in the distributed lighting network 10. For example, power consumption may be very important in emergency situations in which one or more of the devices 14 is powered by a battery backup, or in off-grid applications in which an off-grid energy source is used to charge a battery, which in turn powers one or more of the devices 14. As discussed above, current solid-state lighting fixtures 14A provide a pulse-width modulated current to one or more LEDs in order to provide a desired light output. This pulse-width modulated current is fixed in magnitude with a modulated duty cycle. The duty cycle thus determines the light output of the lighting fixture 14A. In some situations, the efficiency of driving one or more LEDs may be improved.

Figure 39:
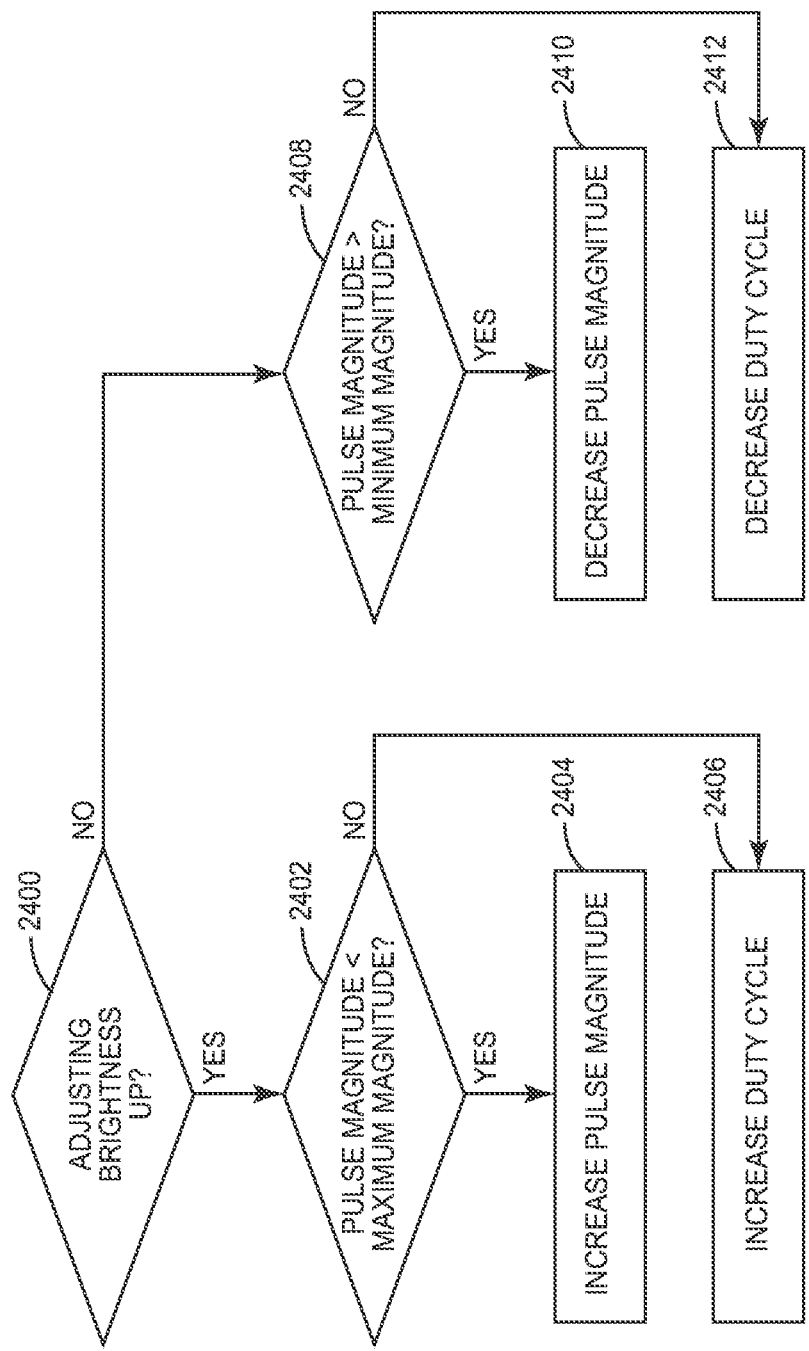
FIG. 39 is a flow diagram illustrating a process for adjusting a drive signal to a light source in order to reduce the energy consumption of a lighting fixture according to one embodiment of the present disclosure.

FIG. 39 is a flow diagram illustrating a method for controlling the brightness of one or more LEDs according to one embodiment of the present disclosure. First, a determination is made regarding whether the brightness of the LEDs is being adjusted up or down (step 2400). If the brightness is being adjusted up, a determination is then made regarding whether a pulse magnitude of a pulse-width modulated signal provided to the LEDs is less than a predetermined maximum pulse magnitude (step 2402). If the pulse magnitude of the pulse-width modulated signal is less than the maximum pulse magnitude, the magnitude of the pulse-width modulated signal is increased (step 2404). If the pulse magnitude of the pulse-width modulated signal is not less than the maximum pulse magnitude, the duty cycle of the pulse-width modulated signal is increased (step 2406). If the brightness of the LEDs is being adjusted down, a determination is then made regarding whether a pulse magnitude of the pulse-width modulated signal is greater than a predetermined minimum magnitude (step 2408). If the pulse magnitude of the pulse-width modulated signal is greater than the minimum magnitude, the pulse magnitude of the pulse-width modulated signal is decreased (step 2410). If the pulse magnitude of the pulse-width modulated signal is not greater than the minimum magnitude, the duty cycle of the pulse-width modulated signal is decreased (step 2412).

Figure 40:
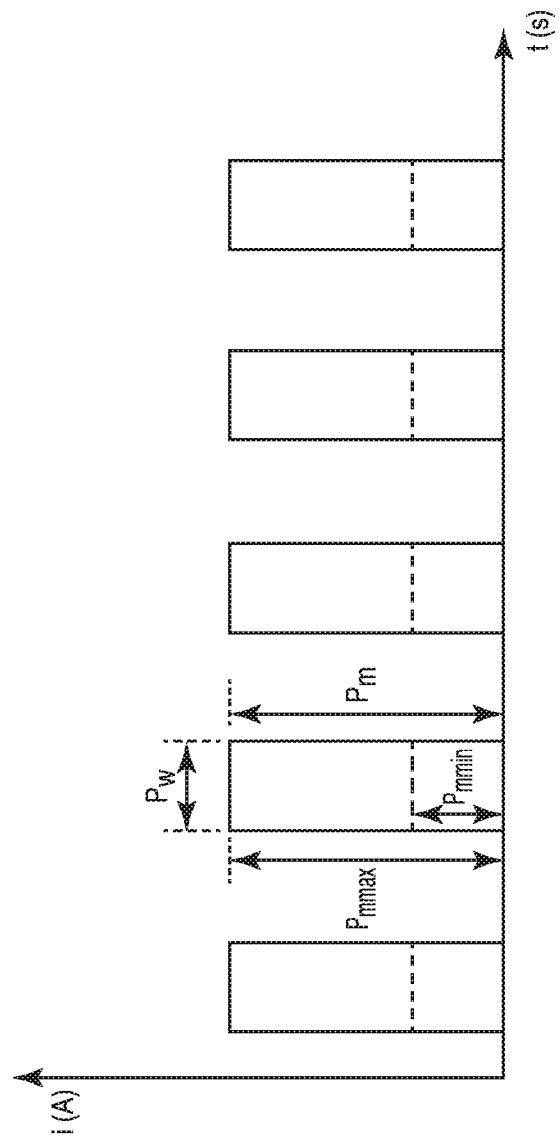
FIG. 40 is a diagram illustrating a process for adjusting a drive signal to a light source in order to reduce the energy consumption of a lighting fixture according to one embodiment of the present disclosure.

FIG. 40 shows an exemplary pulse-width modulated signal according to one embodiment of the present disclosure. In particular, FIG. 40 shows a pulse width $P_w$, a pulse magnitude $P_m$, a minimum pulse magnitude $P_{mmin}$ and a maximum pulse magnitude $P_{mmax}$. When adjusted according to the process discussed above, efficiency improvements may be achieved over conventional fixed magnitude pulse-width modulation schemes for solid-state lighting devices. The minimum pulse magnitude $P_{mmin}$ may be chosen such that the light output of the lighting fixture 14A maintains one or more desired parameters such as brightness, color, color temperature, color rendering index, or the like. However, in some embodiments one or more of these parameters may be sacrificed in favor of efficiency. At a certain pulse magnitude $P_m$, one or more of the desired parameters for light output mentioned above will begin to suffer. While this is generally not desirable, it may be a useful tradeoff in some cases where any quality of light is better than none. Additional actions such as driving only the most efficient LEDs in the lighting fixture 14A or intentionally sacrificing light output parameters such as color rendering index may be simultaneously used along with the power control process discussed above to obtain even further improvements in efficiency at the expense of light output quality.

Figure 41:
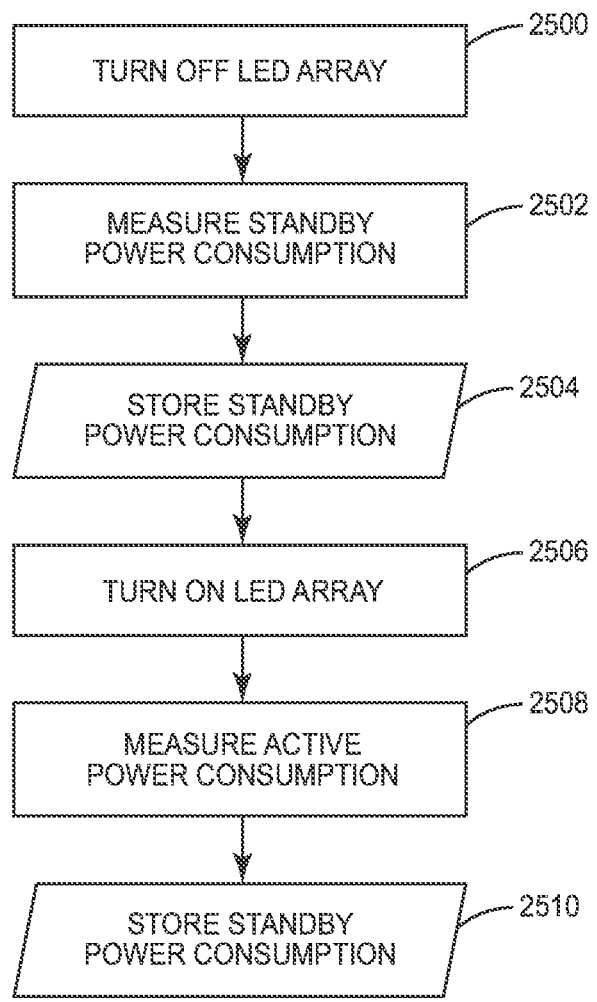
FIG. 41 is a flow diagram illustrating a process for measuring and determining the power consumption of a device in a distributed lighting network according to one embodiment of the present disclosure.

In situations such as the aforementioned emergency and off-grid applications, it may be advantageous to know with precision the power consumption of a device 14 in the distributed lighting network 10. Accordingly, FIG. 41 is a flow diagram illustrating a method for calibrating a power consumption measurement of a device 14 according to one embodiment of the present disclosure. Such a calibration process may occur, for example, after assembly. First, if the device 14 is a lighting fixture 14A, the LED array 24 is turned off (step 2500). If the device 14 is not a lighting fixture 14A, there is no LED array 24 to turn off, and thus this step may be skipped. The standby power consumption of the device 14 is then measured (step 2502) and stored (step 2504). Once again, if the device 14 is a lighting fixture 14A, the LED array is turned on (step (2506). An active power consumption of the device 14 is then measured (step 2508) and stored (step 2510). In devices 14 other than lighting fixtures 14A, these steps may not be performed, as they may not be necessary. The stored power consumption values may be used to more accurately determine the instantaneous or historical power consumption of the device 14. Such measurements may increase the accuracy of power consumption of the devices 14 such that power metering can be performed by one or more of the devices 14 in the distributed lighting network 10.

Figure 42:
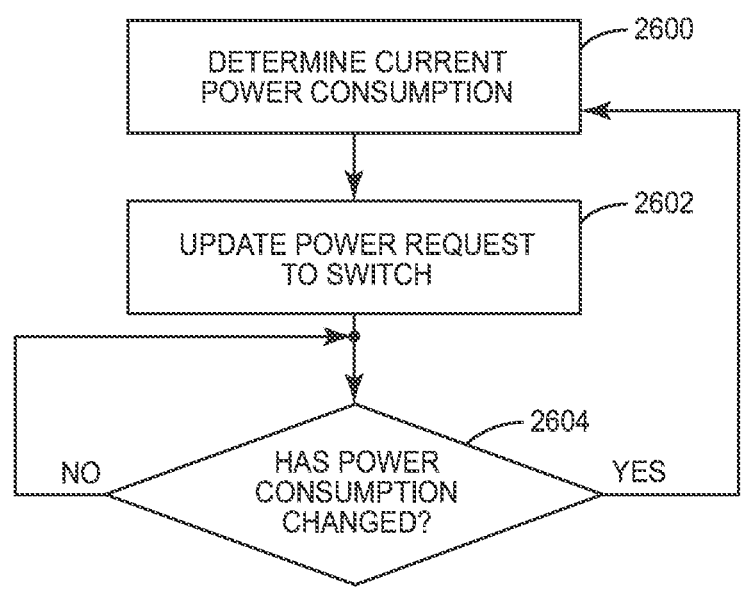
FIG. 42 is a flow diagram illustrating a process for reducing the power consumption of a device in a distributed lighting network according to one embodiment of the present disclosure.

One use for the aforementioned power consumption data is in PoE devices 14 in the distributed lighting network 10. PoE devices 14 are capable of requesting a given amount of power from a switch 14E. Generally, PoE devices 14 are configured to request an amount of power that is equal to the maximum possible power draw of the device 14. However, the device 14 may rarely consume this much power. Accordingly, FIG. 42 is a flow diagram illustrating a method of requesting power from a switch 14E in order to improve the efficiency thereof. First, the power consumption of a device 14 is determined (step 2600). An updated request for power is then sent from the device 14 to a switch 14E (step 2602). The updated request is based on the determined actual power consumption of the device 14, which may be instantaneously updated, averaged and updated periodically, or updated in any other way. A determination is then made regarding whether the power consumption of the device 14 has changed (step 2604). If the power consumption of the device 14 has changed, the process starts again at step 2600. If the power consumption of the device 14 has not changed, the process starts again at step 2604. Requesting only the power that is instantaneously required by a device 14 may significantly improve the efficiency of the wired lighting network 12B, as each switch 14E no longer has to deliver power to each device 14 based on the maximum possible power requirements of that device.

Figure 43A:
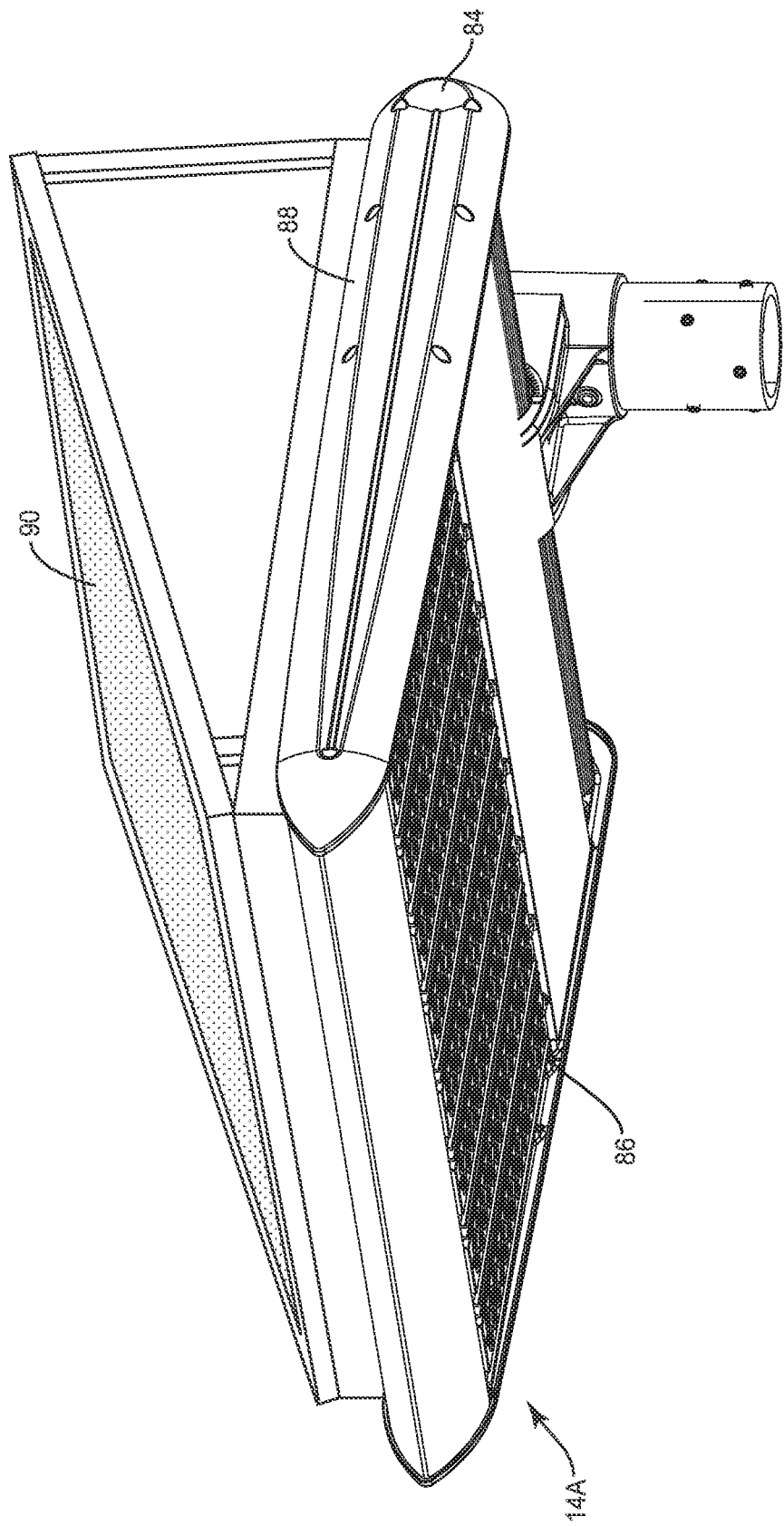

The foregoing power saving techniques may be especially useful in off-grid lighting fixtures 14A, the details of which are illustrated in FIGS. 43A and 43B. As shown in the Figures, an off-grid lighting fixture 14A includes a body 84, a light source 86, a battery 88, and a photovoltaic panel 90. The body 84 houses the light source 86, and further includes the driver circuitry 22 and other necessary components of the lighting fixture 14A. The battery 88 is located on top of the body 84, and in particular may be fused with the body 84. Further, the photovoltaic panel 90 is located on top of the battery 88. Notably, the photovoltaic panel 90, the battery 88, and the light source 86 are located directly adjacent to one another. This is so that energy generated by the photovoltaic panel 90 and provided by the battery 88 are maximized, and efficiency is not degraded in the transport of said energy to the light source 86. Notably, FIGS. 43A and 43B are merely exemplary embodiments of an off-grid lighting fixture 14A. Numerous different configurations may exist for the body 84, the battery 88, and the photovoltaic panel 90, all of which are contemplated herein.

Figure 44:
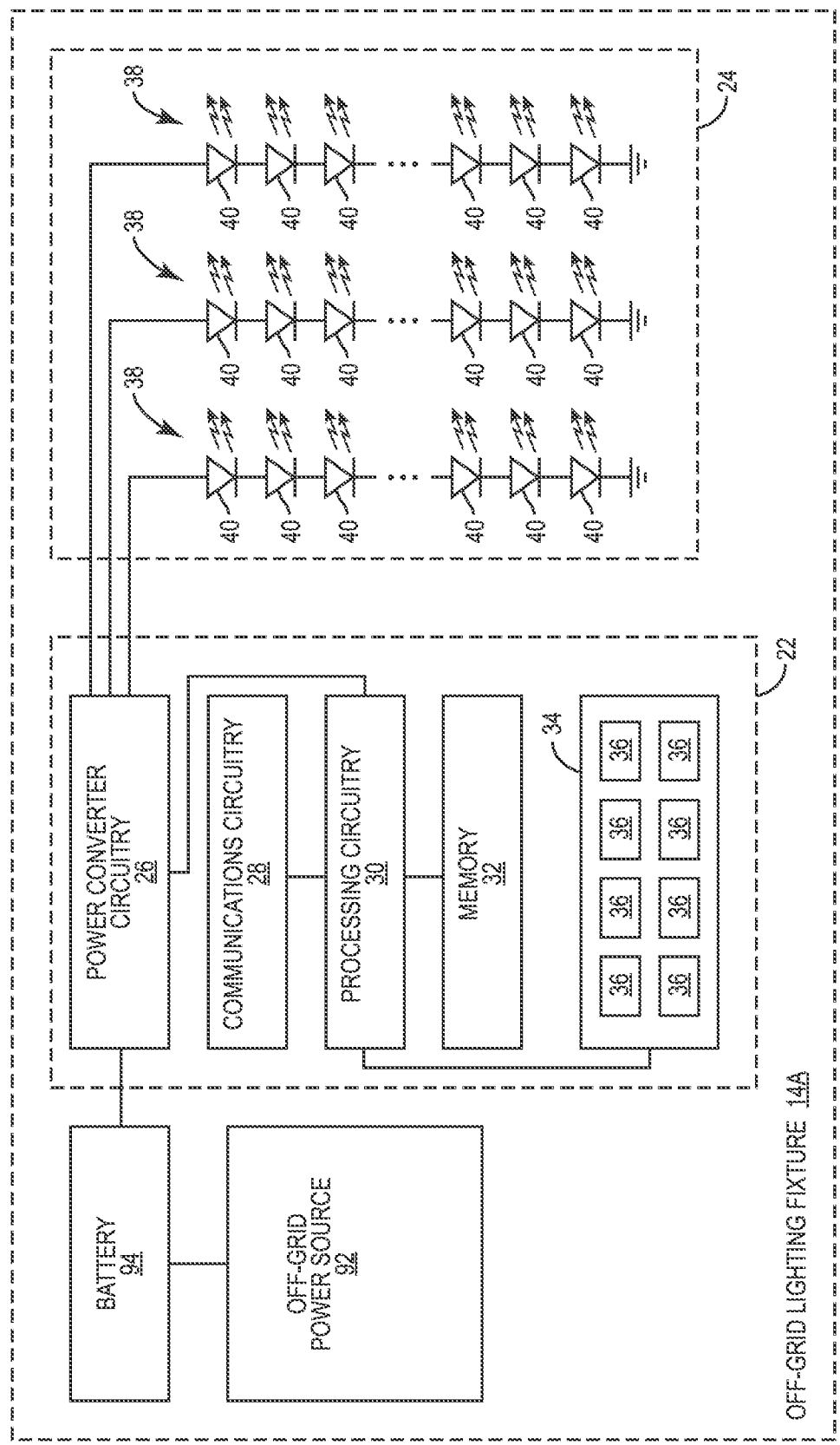
FIG. 44 is a functional schematic of a lighting fixture according to one embodiment of the present disclosure.

FIG. 44 is a block diagram illustrating details of the operational circuitry of the off-grid lighting fixture 14A according to one embodiment of the present disclosure. The off-grid lighting fixture 14A shown in FIG. 44 is substantially similar to the lighting fixture 14A discussed above with respect to FIG. 2, except that the input voltage source is replaced with an off-grid power source 92 and a battery 94. The off-grid power source may be any suitable off-grid power source, and may be a renewable energy source such as a photovoltaic panel or a wind turbine. The off-grid power source 92 charges the battery 94, which in turn provides the necessary power for the driver circuitry 22.

Figure 45:
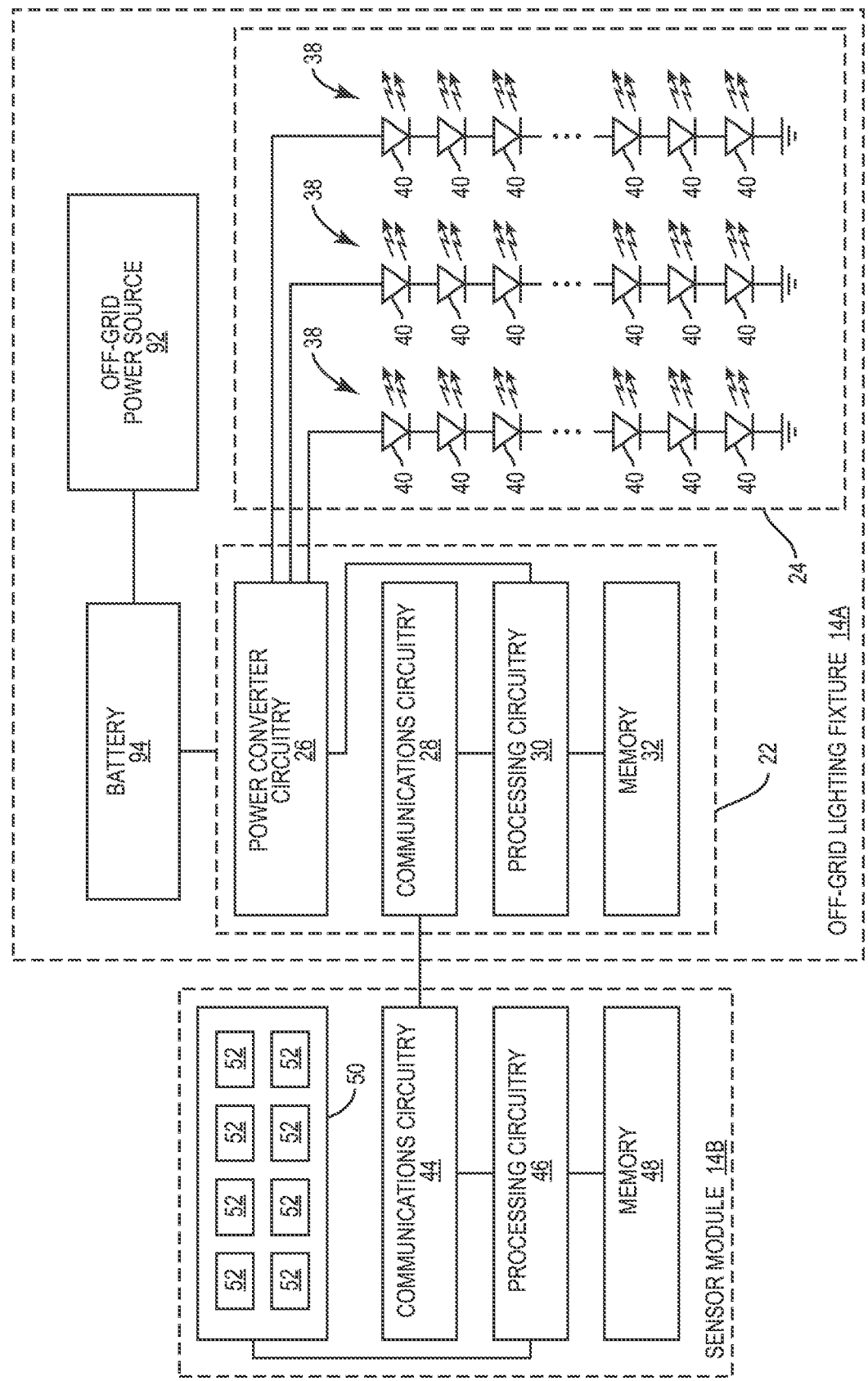
FIG. 45 is a functional schematic of a lighting fixture connected to a sensor module according to one embodiment of the present disclosure.

FIG. 45 is a block diagram illustrating details of the operational circuitry of the off-grid lighting fixture 14A according to an additional embodiment of the present disclosure. The off-grid lighting fixture 14A shown in FIG. 45 is substantially similar to that discussed above with respect to FIG. 4, except that the input voltage source is replaced with an off-grid power source 92 and a battery 94. The off-grid power source 92 may be any suitable off-grid power source, and may be a renewable energy source such as a photovoltaic panel or a wind turbine. The off-grid power source 92 charges the battery 94, which in turn provides the necessary power for the driver circuitry 22.

The intelligence of the off-grid lighting fixture 14A may be especially useful in off-grid applications. In addition to merely providing light, the off-grid lighting fixture 14A may measure environmental parameters, provide security, and the like. Further, a number of off-grid lighting fixtures 14A may form the distributed lighting network 10, which may be used for communication, and further may distribute wireless or wired communications signals received from other sources. For example, an off-grid lighting fixture 14A may act as a base-station for cellular signals in some embodiments. In general, the intelligence of the off-grid lighting fixture 14A may significantly enhance its utility as an off-grid device.

Figure 46:
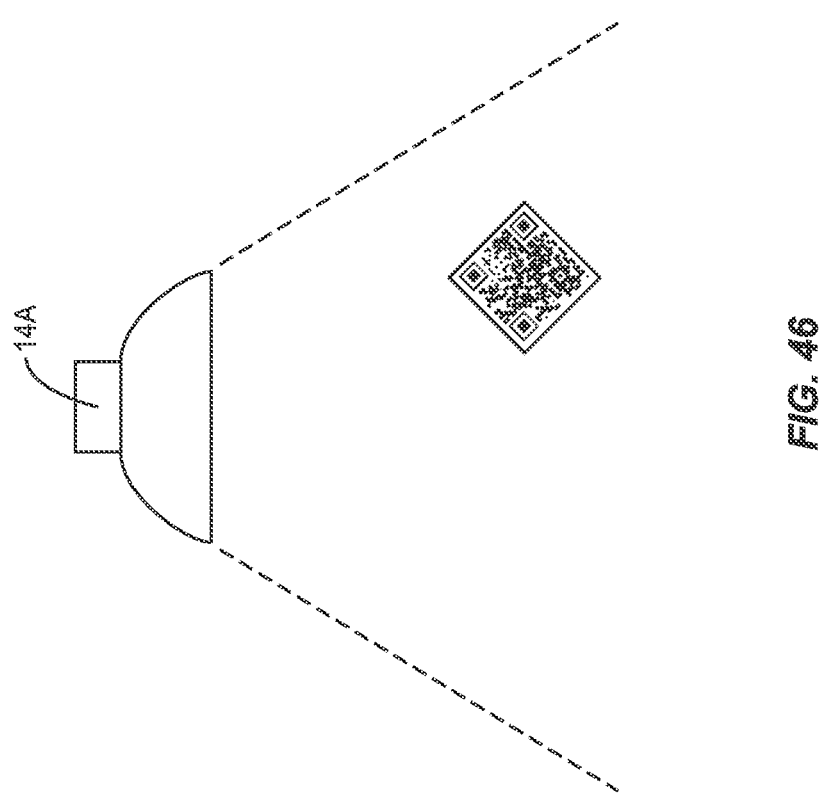
FIG. 46 illustrates a lighting fixture according to one embodiment of the present disclosure.

In some situations, due to communications network restraints and other factors it may be desirable to communicate information with one or more devices 14 in the distributed lighting network 10 via optical means. For example, lighting fixtures 14A that are mounted very high in a warehouse in which wired or wireless communications are not possible may need to be configured. One example of such a fixture is described in co-filed U.S. patent application Ser. No. 15/018,616, filed Feb. 8, 2016, issued as U.S. Pat. No. 10,203,103, and titled "Led Luminaire Having Enhanced Thermal Management", the disclosure of which is hereby incorporated by reference in its entirety. Conventionally, an individual would have to climb a ladder or otherwise access each lighting fixture 14A in the distributed lighting network 10 in this situation in order to perform such configuration. If each device 14 is equipped with an image sensor, however, such configuration may be significantly simplified. FIG. 46 shows an example of such configuration. As shown in FIG. 46, an optically encoded medium (e.g., a barcode, a QR code, or even a particular color or array of colors) may be presented within a field of view of an image sensor within a lighting fixture 14A. The image sensor in the lighting fixture 14A may read the information from the optically encoded medium and adjust one or more settings based thereon.

Figure 47:
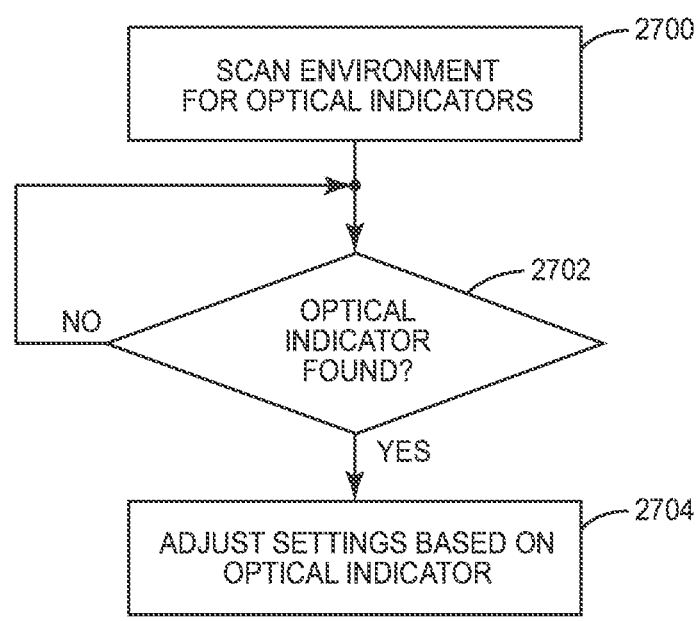
FIG. 47 is a flow diagram illustrating a process for detecting an optical indicator and adjusting settings based on the optical indicator according to one embodiment of the present disclosure.

FIG. 47 is a flow diagram illustrating a method for changing one or more settings of a device 14 based on one or more optical indicators. First, the environment is scanned for optical indicators (step 2700). As discussed above, this is likely performed by an image sensor, however, any suitable means for finding optical indicators in the surrounding environment may be used without departing from the principles of the present disclosure. A determination is then made whether an optical indicator has been found (step 2702). If an optical indicator has been found, one or more settings of the device 14 are adjusted based on the optical indicator (step 2704). If an optical indicator has not been found, the process returns to step 2700 where the environment is scanned for optical indicators. Using the process described above, settings for devices 14 that are otherwise inaccessible via wired or wireless communications means and difficult to physically access may be changed easily.

As discussed above, providing a number of different sensors on devices 14 that are distributed throughout a space has enumerable benefits. In general, the sensor data obtained from these devices is highly valuable because of the nature of a distributed lighting network 10. Lighting fixtures 14A enjoy a relatively widespread pre-existing infrastructure of power. Further, lighting fixtures 14A are generally distributed relatively evenly and consistently throughout a space. By providing lighting fixtures 14A and other devices 14 that capitalize on these attributes, a large network of sensors that are distributed throughout a space can be achieved. Such a network of sensors may provide an immense amount of information about a space, and may be used to provide significant advances in the functionality of a space.

Figure 48:
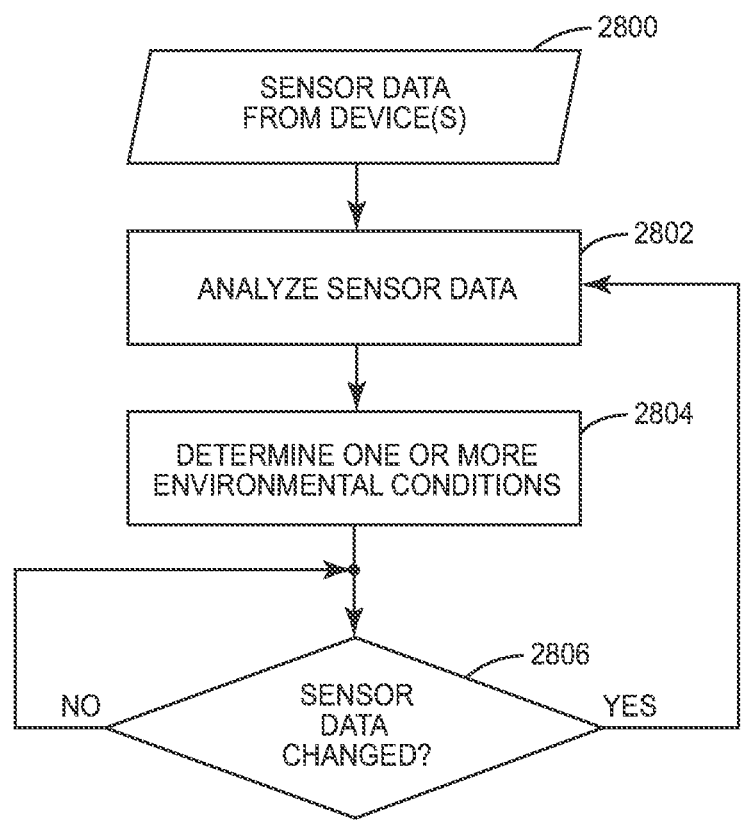
FIG. 48 is a flow diagram illustrating a process for determining one or more environmental conditions based on sensor data measured by devices in a distributed lighting network according to one embodiment of the present disclosure.

A general framework for utilizing the sensor data obtained in the distributed lighting network 10 is shown in FIG. 48. First, sensor data from one or more devices 14 in the network is obtained (step 2800). The sensor data is then analyzed (step 2802). This analysis may comprise any number of different signal processing and/or analysis techniques, some examples of which are provided below. One or more environmental conditions are then determined from the analyzed sensor data (step 2804). Some examples of these environmental conditions are discussed in detail below. A determination is then made whether the sensor data has changed (step 2806). If the sensor data has changed, the sensor data is analyzed again at step 2802 and one or more environmental conditions are determined again at step 2804. This process may repeat periodically or persistently, and the determined environmental conditions may be used in any number of ways to improve the management of a space or gain insights about the use thereof. If the sensor data has not changed, the process waits for the sensor data to change.

Figure 49:
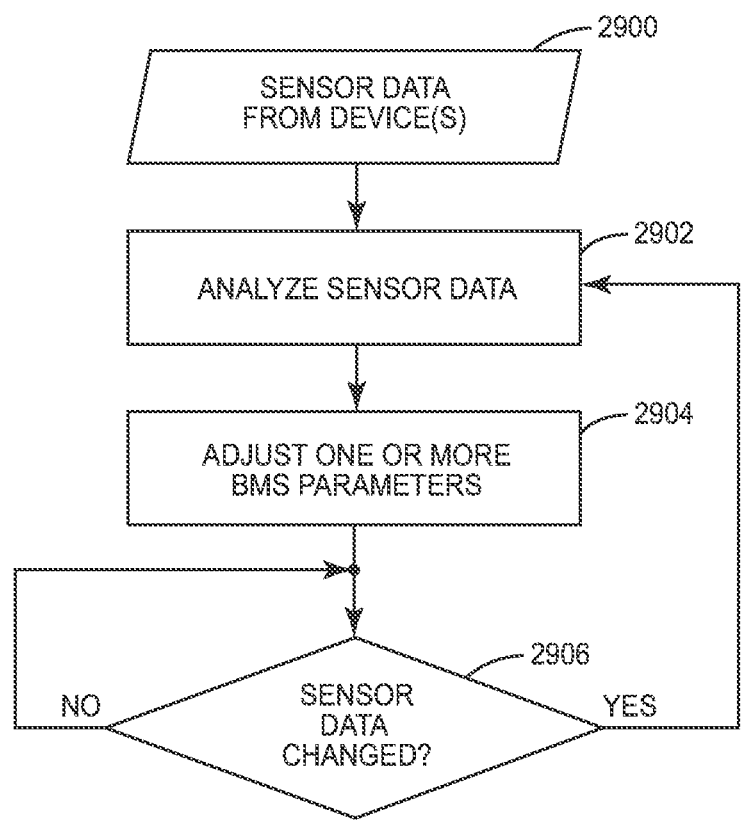
FIG. 49 is a flow diagram illustrating a process for adjusting one or more building management system (BMS) parameters based on sensor data measured by devices in a distributed lighting network according to one embodiment of the present disclosure.

For example, FIG. 49 shows a similar process to that shown in FIG. 48 wherein the sensor data is used to adjust one or more parameters of a building management system. First, sensor data from one or more devices 14 in the network is obtained (step 2900). The sensor data is then analyzed (step 2902), and the analyzed sensor data is used to adjust one or more parameters of a building management system (step 2904). For example, the sensor data may be used to adjust a temperature of a thermostat, the amount of fresh circulating air into a space, or the like. A determination is then made regarding whether the sensor data has changed (step 2906). If the sensor data has changed, the sensor data is analyzed again at step 2902 and the one or more building management system parameters are adjusted at step 2904. If the sensor data has not changed, the process waits for the sensor data to change.

Examples of environmental conditions and their uses are discussed below. With regards to an ALS, such a sensor may be used as discussed above to detect ambient light levels in a space. One or more lighting fixtures 14A may then change the light output thereof in order to maintain a consistent amount of light on a task surface below the lighting fixture(s) 14A. Further, an ALS may be used to detect a modulating light signal in order to participate in the automatic grouping process discussed above and/or to decode data in a modulated light signal. Additionally, ALS measurements obtained from multiple devices 14 in the distributed lighting network 10 may be used to determine a "sun load" of a space. That is, ALS measurements obtained from multiple devices 14 in the distributed lighting network 10 may detect the amount of sunlight in a given space. This information may be used to predictively adjust one or more heating or cooling parameters in order to more accurately heat and/or cool a space. Further, such information may be used to adjust automated blinds and/or smart windows in order to adjust the amount of sunlight entering a space. Since current methods of heating and/or cooling by taking temperature measurements at a number of different thermostats located throughout a space may result in a wide temperature swing within a given space, such information may allow the temperature of a space to be more accurately maintained and thus maintain a more comfortable environment.

Regarding an accelerometer or other motion sensor, this sensor data may be used to detect occupancy as discussed above. Further, an accelerometer or other motion sensor may be used to detect whether a device 14 is properly oriented (e.g., whether a pole-mounted device 14 is leaning or otherwise improperly mounted). The same orientation information may be used to determine if a device 14 is moving (e.g., swaying), and thus may be used, in the case of devices 14 that are outdoors, to detect wind speed, earthquakes, and structural stability. The sway of a device 14 that is located outside may be directly correlated with the wind speed, and thus such information may be obtained from an accelerometer or other motion sensor. Measuring seismic activity via a distributed network of devices 14 may prove immensely valuable, since the devices 14 are relatively close together and thus may provide valuable insights about the fine-grained distribution of seismic activity. Such information may be used to predict earthquakes or other seismic activity in the future. When placed on a structure such as a bridge, devices 14 may provide valuable insight regarding the structural integrity of the structure, for example, by examining resonant vibration patterns of the structure. Such information may be used to provide alerts if a structure becomes dangerously unstable or may be used to dictate required maintenance of a structure over time.

Regarding an image sensor, such a sensor may be used to detect occupancy events and ambient light levels as discussed above. Further, the flexibility of an image sensor may be used to analyze traffic (e.g., human traffic in an indoor space, automobile traffic in an outdoor space, and high-traffic lanes on a factory floor), may be used to determine empty parking spots in a parking garage, may be used to determine waiting times (e.g., length of register lines), and may be used to differentiate between customers and associates in a retail establishment in order to match associates with customers that need assistance. As image processing techniques continue to improve, the information about a space that may be obtained is virtually endless. Examples of using an image sensor to analyze a space are included in U.S. patent application Ser. No. 14/827,007, published as U.S. Patent Application Publication No. 2017/0048952 A1, the disclosure of which is hereby incorporated by reference in its entirety.

Other types of image sensors may provide additional data that may be used in the distributed lighting network 10. For example, low-resolution IR imaging (e.g., forward looking infrared imaging sensors) may be used to increase the efficacy of occupancy detection, may be used to detect fires, may be used to detect hot-spots in a space for HVAC control purposes, may be used to predict maintenance on machines in a factory (e.g., by detecting changes in the normal temperature signatures thereof), and the like. Further, time of flight (TOF) imaging sensors may be used to construct three-dimensional representations of a space, which may be used for building reconstruction and/or modeling.

Regarding temperature and humidity sensors, such sensors may be used to provide more fine-grained information to an HVAC system controlled by a BMS, which may use the information to better control the environmental conditions in a space. In outdoor applications, temperature and humidity sensors may provide fine-grained temperature measurements that may not only give an accurate representation of the weather, but may also be used to predict future weather conditions. Additional sensors such as wind speed sensors and the like may be used to further increase the information available to outdoor devices 14. Since outdoor devices 14 may be distributed in large numbers throughout a space, weather patterns that were previously undetectable may become apparent and increase the accuracy of weather forecasting.

Regarding barometers or other atmospheric pressure sensors, such sensors may be used to differentiate between floors of a building as discussed above in order to facilitate network formation, may be used to detect occupancy either alone or in combination with one or more other sensors, and may be used to determine or predict the weather as discussed above.

Regarding air quality sensors such as carbon dioxide sensors, carbon monoxide sensors, VOC sensors, and smoke sensors, such sensors may be used to provide an accurate representation of the air quality in a space. This information may be used to circulate fresh air into a space via a building management system, or may be used to identify dangerous conditions that require evacuation or other corrective measures. Alarms and alerts may be provided as necessary based on the sensor measurements.

Regarding spatial sensors such as GPS sensors and magnetometers, measurements from these sensors may be used for georegistration of devices 14 and/or the images therefrom, may provide a synchronized clock (GPS), and may provide an orientation of a device. In general, spatial sensors may be used to identify the precise location of a device 14. This location information may be shared with other devices 14, including remote devices 16. Since devices 14 in the distributed lighting network 10 will generally remain stationary, a very accurate location may be obtained based on measurements from spatial sensors. This location information may be much more accurate, for example, than location information obtained from a mobile remote device 16, and thus may be shared with said remote device 16. In other cases, one or more remote devices 16 may not have access to location information and thus may obtain it from one or more devices 14 in the distributed lighting network 10.

Regarding ultrasonic sensors, such sensors may be used to "image" an environment in a three-dimensional manner, and further may assist in object detection and occupancy event detection.

Regarding microphones and/or speakers, measurements from these devices may be used to detect occupancy events as described above. Further, measurements from these devices may be used to detect auditory events (e.g., clapping), which may be used to control one or more devices 14 in the distributed lighting network 10, and may be used to identify events (e.g., shots fired, screaming, shouting, or the like). Event classification based on detected sound may be performed by each device 14 in a lightweight manner or analyzed in detail by a remote device 16. Providing a microphone and speaker in each device 14 in the distributed lighting network 10 also allows for the detection and analysis of voice commands, which may simplify the control and operation of the distributed lighting network 10, and may allow for the delivery of audio media (e.g., music, radio, podcasts, or the like) to devices 14 throughout the distributed lighting network 10 as desired.

In some embodiments, the communications circuitry of a device 14 may include Bluetooth communications circuitry. Such communications circuitry may allow the device 14 to pair with one or more mobile devices, for example, to make calls, play music, or simply detect when a mobile device is nearby. Further, the communications circuitry may include radio frequency identification (RFID) receiver and/or transmitter circuitry. Accordingly, one or more devices 14 may detect, for example, an RFID tag in a badge or key fob and grant or deny access to a particular space based thereon.

The analysis discussed above with respect to the various sensor measurements may be performed locally by each device 14 in the distributed lighting network 10, may be performed in a distributed manner throughout the distributed lighting network 10, may be performed by a single device 14 such as a border router 14D, or may be performed by a remote device 16. Using a remote device 16 to analyze sensor data from the various devices 14 in the distributed lighting network 10 may allow for extensive analysis using techniques such as deep machine learning, artificial intelligence, and the like. As discussed above, one or more border routers 14D may facilitate the retrieval of sensor data from each device 14, for example, via an API with which a remote device 16 interfaces.

Figure 50:
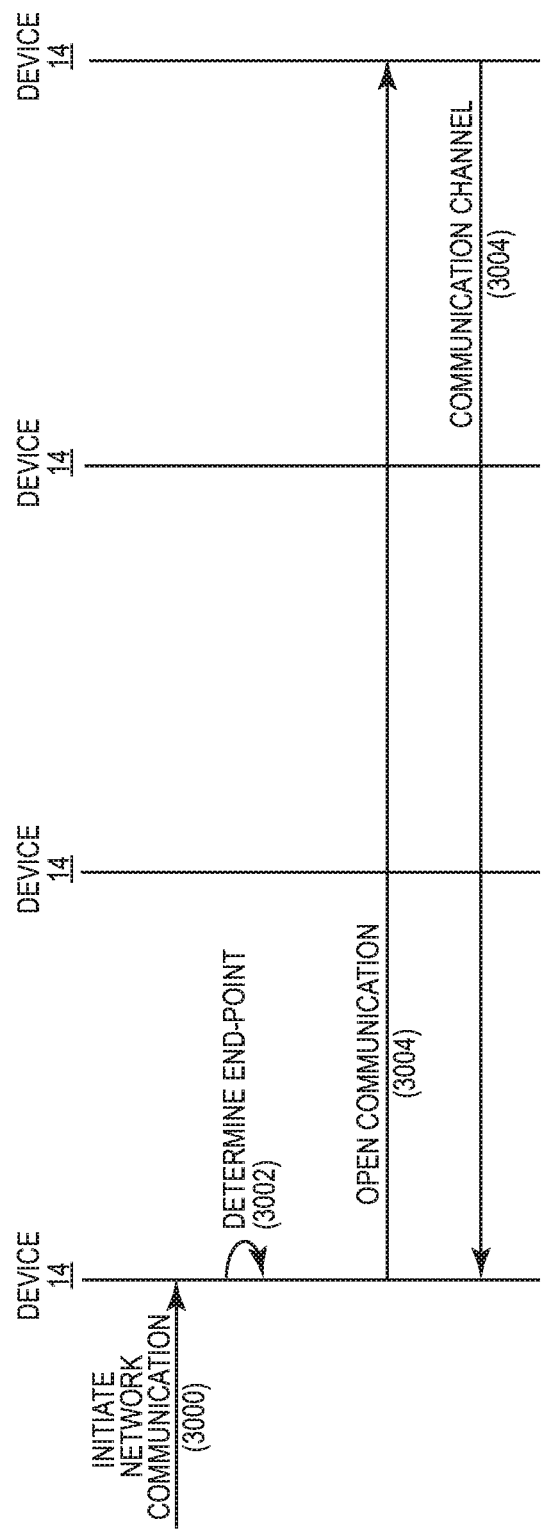
FIG. 50 is a call flow diagram illustrating a process for communication between devices in a distributed lighting network according to one embodiment of the present disclosure.
Figure 51:
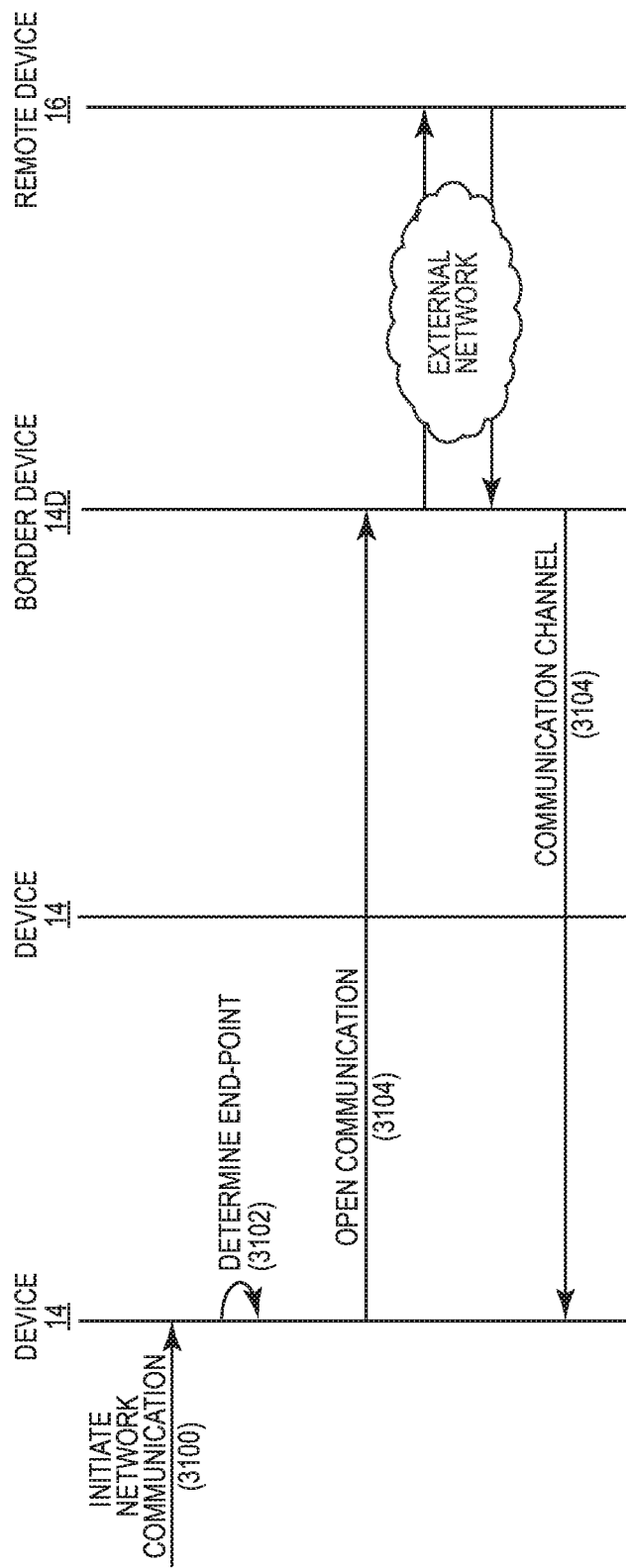
FIG. 51 is a call flow diagram illustrating a process for communication between a remote device and the devices in a distributed lighting network according to one embodiment of the present disclosure.

One notable feature that may be facilitated by the inclusion of microphones and speakers in the devices 14 of the distributed lighting network 10 is discussed with respect to FIGS. 50 and 42. Specifically, FIG. 50 illustrates an intra-network communication process, while FIG. 51 illustrates an inter-network communication process. First, network communication is initiated (step 3000). Such communication may be initiated, for example, by a voice command (e.g., "Call John"), or by any other suitable means. A network end point is then determined for the communication (step 3002). This may be accomplished, for example, by a look-up table regarding the location of the individual with whom communication was requested, may involve the use of one or more sensors to locate an individual, or may be accomplished by any other suitable means. A communication channel is then opened with the end point (step 3004). For example, bidirectional voice communication may be initiated with the network end point and the initiating device 14.

FIG. 51 illustrates a similar process for inter-network communication. First, network communication is initiated (step 3100). A network end point is then determined for the communication (step 3102). A communication channel is then opened with the end point, which is a remote device 16 (step 3104). Notably, this communication is routed through an external network, which is facilitated by a border router 14D. In one embodiment, the remote device 16 is a wireless communications device, and thus communication is initiated through a cellular network. Using the processes outlined above, communication may be initiated with individuals in or outside the distributed lighting network 10 in a convenient manner.

Figure 52:
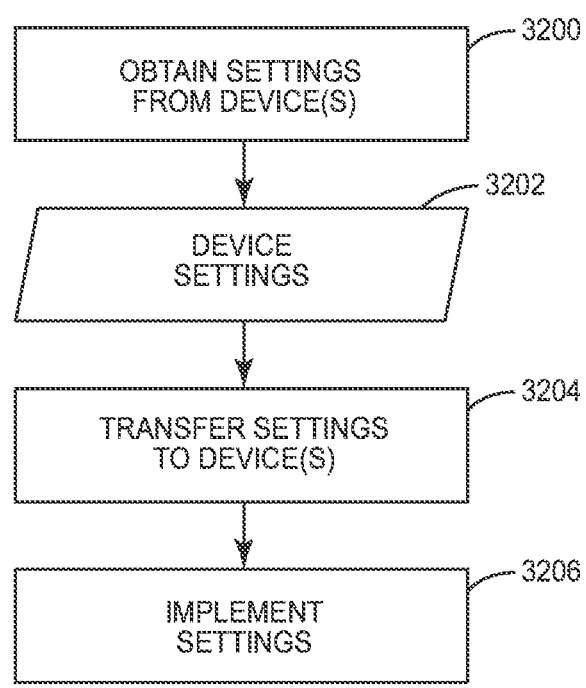
FIG. 52 is a flow diagram illustrating a process for transferring settings between devices in a distributed lighting network according to one embodiment of the present disclosure.

As discussed above, devices 14 in the distributed lighting network 10 may use sensor data to calibrate or otherwise change their behavior over time. For example, devices 14 in the distributed lighting network 10 may automatically group with one another, or may adjust calibration thresholds based on historical data in order to increase the accuracy of event detection and response. Accordingly, it may be desirable in some circumstances to leverage the calibration that has been accomplished by a set of devices 14 for a different set of devices 14 in the distributed lighting network 10. For example, devices 14 that have been installed and running for a period of time may include calibration information that is useful for newly installed devices 14. Accordingly, FIG. 52 is a flow diagram illustrating a method of copying device settings from one device 14 or group of devices 14 to another device 14 or group of devices 14 in the distributed lighting network 10. First, device settings are obtained from a desired set of devices 14 (step 3200) and stored (step 3202). The device settings are then transferred to a set of different desired devices 14 (step 3204). These settings are then implemented on the different desired devices 14 (step 3206). Copying settings in this manner may allow newly installed devices 14 the benefit of the automatic calibration performed by devices 14 that have been up and running for a period of time, and thus may reduce the period of time newly installed devices 14 need for calibration.

Figure 53A:
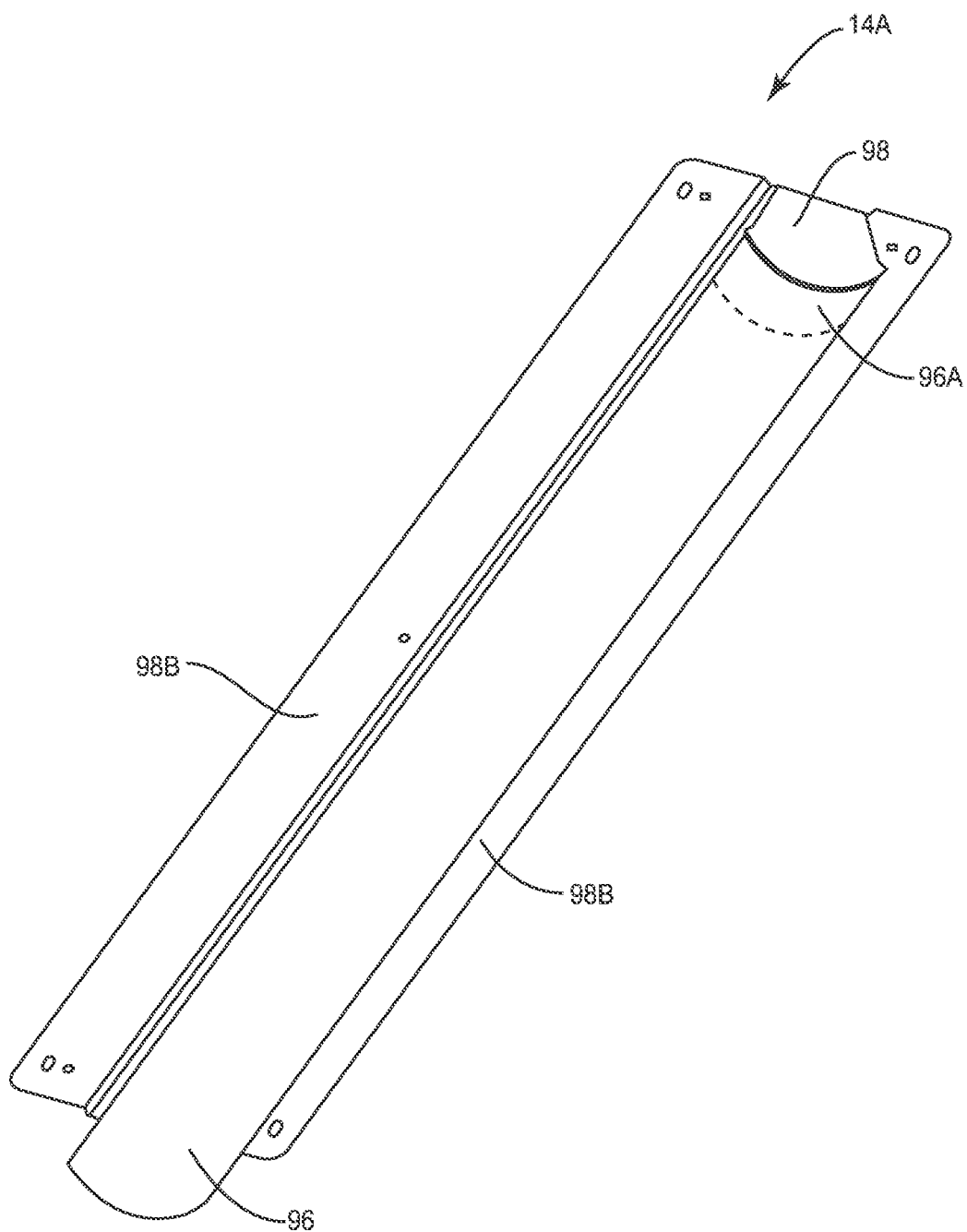
FIGS. 53A and 53B illustrate a lighting fixture according to one embodiment of the present disclosure.
Figure 53B:
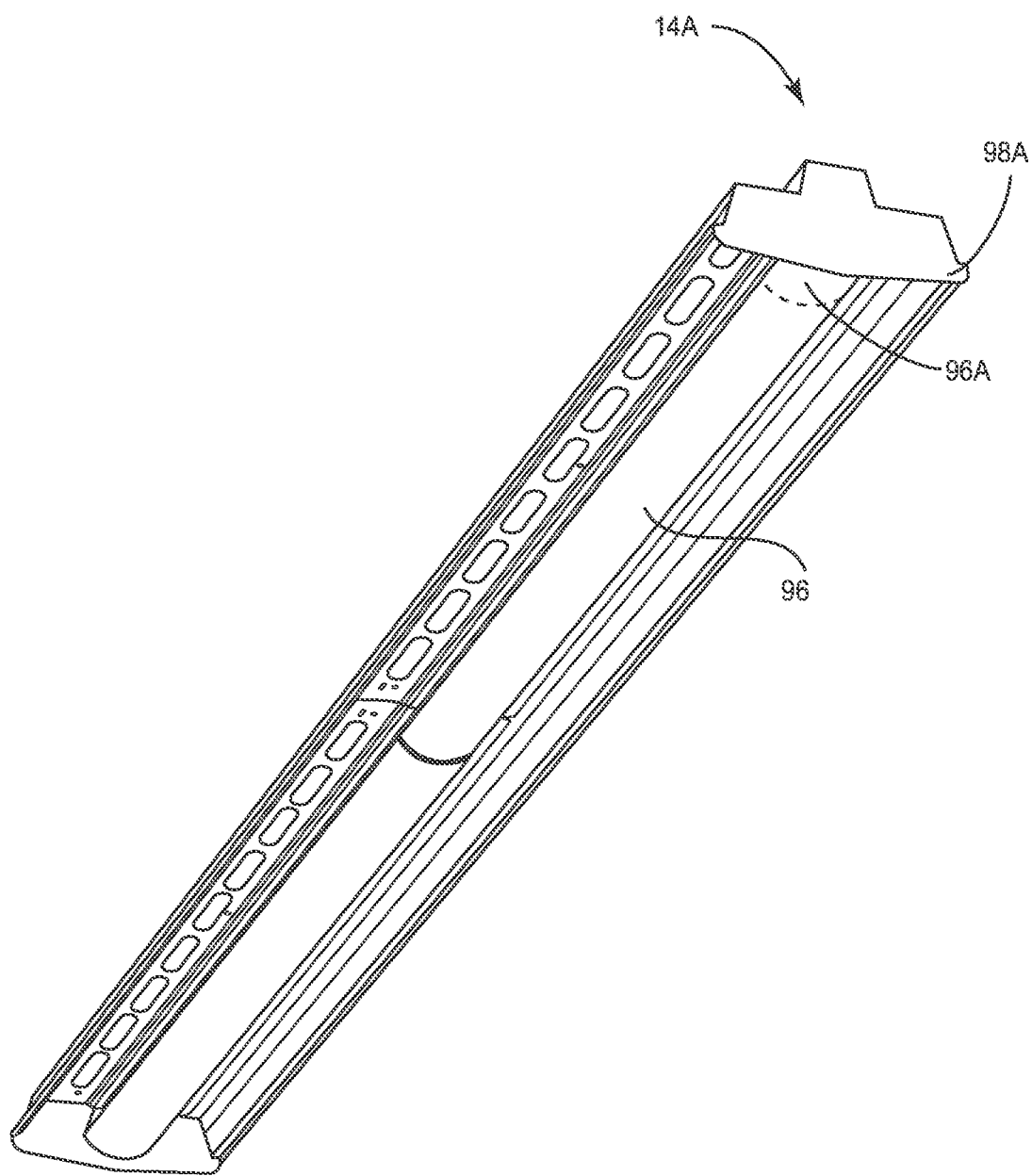

FIGS. 53A and 53B illustrate an exemplary lighting fixture 14A that may be used in an indoor setting according to one embodiment of the present disclosure. The lighting fixture 14A includes a lens 96 and a square or rectangular outer frame 98. The lens 96 is coupled to and extends between opposite sides of the outer frame 98, and may be substantially arc-shaped, such that an outer surface of the lighting fixture 14A appears as a half-circle. Further, the lens 96 may include a sensor module cover 96A, which is a portion of the lens 96 that is removable in order to provide access to a sensor module connector and space for a sensor module 14B to be connected to the lighting fixture 14A. The outer frame may optionally be surrounded by a shroud 98A, which gives the light a troffer-style appearance and may provide additional mounting options for the lighting fixture 14A, as shown in FIG. 53B. Further, the outer frame 98 may include a number of flat mounting surfaces 98B, which extend outwards and include one or more mounting holes for mounting the lighting fixture 14A, for example, to a ceiling.

Those skilled in the art will recognize improvements and modifications to the preferred embodiments of the present disclosure. All such improvements and modifications are considered within the scope of the concepts disclosed herein and the claims that follow.

What is claimed is:

1. A lighting fixture comprising:
a solid-state light source;
communications circuitry; a memory storing pre-installed common security credentials, wherein the pre-installed common security credentials are pre-installed during a factory calibration process; and
processing circuitry coupled to the solid-state light source, the communications circuitry, and the memory and configured to:
cause the solid-state light source to provide a desired light output;
create a common lighting network using the pre-installed common security credentials, wherein only devices identified by light modulation sent from the first light fixture and with pre-installed common security credentials identical to the pre-installed common security credentials stored in the memory of the lighting fixture are permitted to join the common lighting network; and
communicate with devices of the common lighting network by modulating light from the solid-state light source.

2. The lighting fixture of claim 1 wherein creating the common lighting network comprises authenticating lighting devices wishing to join the common lighting network based on the pre-installed common security credentials.

3. The lighting fixture of claim 2 wherein creating the common network further comprises assigning an address to the lighting devices wishing to join the common lighting network that are authenticated based on the pre-installed common security credentials.

4. The lighting fixture of claim 1 wherein the processing circuitry is further configured to:
receive a command to create the common lighting network from a lighting device; and
create the common lighting network in response to the command.

5. The lighting fixture of claim 4 wherein the command is provided via the common lighting network.

6. The lighting fixture of claim 4 further comprising a light sensor, wherein the command is provided via the light sensor.

7. The lighting fixture of claim 1 wherein:
the processing circuitry is further configured to:
communicate with lighting devices in the common lighting network via the communications circuitry;
receive updated security credentials from a first lighting device via the communications circuitry and store the updated security credentials in the memory; and
in response to receiving the updated security credentials, cause the updated security credentials to be forwarded to a second lighting device in the common lighting network;
the second lighting device is configured to store the updated security credentials and in response to receiving the updated security credentials, cause the updated security credentials to be forwarded to an additional lighting device in the common lighting network; and
each additional lighting device in the common lighting network is configured to receive the updated security credentials from a first respective lighting device in the common lighting network, store the updated security credentials, and in response to receiving the updated security credentials, forward the updated security credentials to a second respective lighting device in the common lighting network in order to propagate the updated security credentials across the common lighting network.

8. The lighting fixture of claim 1 wherein:
the common lighting network is a first common lighting network; and
the processing circuitry is further configured to:
attempt to join a second common lighting network using the pre-installed common security credentials; and
create the first common lighting network using the pre-installed common security credentials when the attempt to join the second common lighting network is unsuccessful.

9. The lighting fixture of claim 8 wherein:
the processing circuitry is further configured to:
communicate with a first lighting device in the second common lighting network via the communications circuitry when the attempt to join the second common lighting network is successful;
receive updated security credentials from the first lighting device via the communications circuitry and store the updated security credentials in the memory; and
in response to receiving the updated security credentials, cause the updated security credentials to be forwarded to a second lighting device in the second common lighting network;
the second lighting device is configured to store the updated security credentials and in response to receiving the updated security credentials, cause the updated security credentials to be forwarded to an additional lighting device in the second common lighting network; and
each additional lighting device in the first common lighting network is configured to receive the updated security credentials from a first respective lighting device in the first common lighting network, store the updated security credentials, and in response to receiving the updated security credentials, forward the updated security credentials to a second respective lighting device in the first common lighting network in order to propagate the updated security credentials across the first common lighting network.

10. The lighting fixture of claim 9 wherein the processing circuitry is further configured to use the updated security credentials to communicate over the first common lighting network.

11. The lighting fixture of claim 9 wherein the first lighting device authenticates the lighting fixture to allow the lighting fixture to join the second common lighting network.

12. The lighting fixture of claim 9 wherein the updated security credentials are generated by the first lighting device.

13. The lighting fixture of claim 9 wherein the lighting fixture and the first lighting device form a Thread network.

14. The lighting fixture of claim 8 wherein the processing circuitry is further configured to attempt to join the second common lighting network using the pre-installed common security credentials by attempting to join the second common lighting network on each one of a number of different channels.

15. The lighting fixture of claim 8 wherein the processing circuitry is further configured to:
   attempt to join the second common lighting network using the pre-installed common security credentials by sending a request join message and waiting for a response; and
   determine, prior to creating the first common lighting network, that the attempt to join the second common lighting network is unsuccessful by waiting a predetermined amount of time after sending the request join message.

16. The lighting fixture of claim 1 wherein the processing circuitry is further configured to:
   communicate with a lighting device in the common lighting network; and
   adjust the light output of the solid-state light source in response to communicating with the lighting device.

17. The lighting fixture of claim 16 wherein the lighting device indicates occurrence of an occupancy event.

18. The lighting fixture of claim 1 wherein creation of the common lighting network by the lighting fixture using the pre-installed common security credentials comprises:
   modulating the light at a particular frequency;
   each device that is added to the common lighting network detecting a given relative light intensity that is equal to or above a threshold value; and
   the lighting fixture verifying the pre-installed common security credentials of each device that is added to the common lighting network.

19. A distributed lighting network, comprising:
   a plurality of common lighting networks, the plurality of common lighting networks comprising a first common lighting network and a second common lighting network;
   a first lighting fixture comprising:
      a solid-state light source;
      communications circuitry;
      a memory storing common security credentials; and
      processing circuitry coupled to the solid-state light source, the communications circuitry, and the memory and configured to:
         cause a network join message to be transmitted to the first common lighting network and to the second common lighting network; and
         create a third common lighting network based on a lack of responses from the first common lighting network and the second common lighting network, wherein only devices identified by light modulation sent from the first lighting fixture and with common security credentials identical to the common security credentials stored in the memory of the lighting fixture are permitted to join the third common lighting network.

20. The distributed lighting network of claim 19 wherein the common security credentials are pre-installed in the lighting fixture and the devices.

21. A method of operating a lighting fixture, the method comprising:
   transmitting a network join message to a distributed lighting network, the distributed lighting network comprising a first common lighting network and a second common lighting network;
   waiting a predetermined amount of time to receive a response from the first common lighting network and the second common lighting network; and
   after the predetermined amount of time has passed, and based on not receiving responses from the first common lighting network and the second common lighting network, creating a third common lighting network, the creating comprising:
      designating, by the lighting fixture, the lighting fixture as a network leader;
      receiving a network join message from a device that is identified by light modulation sent from the lighting fixture; and
      adding the device to the third common lighting network based on the lighting fixture and the device sharing a same common security credentials.

* * * * *